United States Patent
Miyachi et al.

(10) Patent No.: US 8,045,117 B2
(45) Date of Patent: *Oct. 25, 2011

(54) DISPLAY ELEMENT AND DISPLAY DEVICE

(75) Inventors: Koichi Miyachi, Soraku-gun (JP); Seiji Shibahara, Tenri (JP); Iichiro Inoue, Tenri (JP); Shoichi Ishihara, Katano (JP); Takako Koide, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 35 days.

This patent is subject to a terminal disclaimer.

(21) Appl. No.: 12/585,699

(22) Filed: Sep. 22, 2009

(65) Prior Publication Data

US 2010/0014040 A1    Jan. 21, 2010

Related U.S. Application Data

(60) Continuation of application No. 12/327,229, filed on Dec. 3, 2008, now Pat. No. 7,616,280, which is a division of application No. 11/017,235, filed on Dec. 21, 2004, now Pat. No. 7,474,373.

(30) Foreign Application Priority Data

Dec. 22, 2003 (JP) .............................. 2003-425160
Dec. 20, 2004 (JP) .............................. 2004-368406

(51) Int. Cl.
    *G02F 1/1339* (2006.01)
(52) U.S. Cl. ...................... 349/141; 349/129; 349/142
(58) Field of Classification Search .................. 349/129
    See application file for complete search history.

(56) References Cited

U.S. PATENT DOCUMENTS

| 4,869,847 | A  | 9/1989  | Leslie et al. |
| 5,886,762 | A  | 3/1999  | Lee et al. |
| 6,104,448 | A  | 8/2000  | Doane et al. ................. 349/12 |
| 6,266,109 | B1 | 7/2001  | Yamaguchi et al. |
| 6,522,379 | B1 | 2/2003  | Ishihara et al. ............. 349/139 |
| 6,636,289 | B2 | 10/2003 | Yoo et al. .................... 349/141 |
| 6,816,220 | B2 | 11/2004 | Baek et al. .................. 349/139 |
| 7,023,516 | B2 | 4/2006  | Yoshida et al. ............. 349/143 |
| 7,307,682 | B2 | 12/2007 | Miyachi et al. ............. 349/128 |

(Continued)

FOREIGN PATENT DOCUMENTS

JP    63-253334 A    10/1988

(Continued)

OTHER PUBLICATIONS

Matsumoto et al, "Fine Droplets of Liquid Crystals in a Transparent Polymer and Their Response to an Electric Field", Appl. Phys., Lett 69, 1996, pp. 1044-1046.

(Continued)

*Primary Examiner* — Phu Vu

(74) *Attorney, Agent, or Firm* — Nixon & Vanderhye P.C.

(57) ABSTRACT

A display element has an arrangement that allows the pixel to have at least two domains in which the medium shows optical anisotropies of different directions when a force (for example, an electric field) is applied or when no force is applied. It is preferable that directions of the optical anisotropies occurred in the respective domains when the electric field is applied respectively have 45 degrees±10 degrees with absorption axes of polarizers, and that the directions of the optical anisotropies occurred in the respective domains when the electric field is applied make 90 degrees±20 degrees.

4 Claims, 22 Drawing Sheets

U.S. PATENT DOCUMENTS

| | | | |
|---|---|---|---|
| 7,307,685 | B2 | 12/2007 | Miyachi et al. ............... 349/170 |
| 7,474,373 | B2 * | 1/2009 | Miyachi et al. ............... 349/129 |
| 2003/0081163 | A1 | 5/2003 | Suzuki et al. |
| 2003/0133068 | A1 | 7/2003 | Suzuki et al. |
| 2005/0162607 | A1 | 7/2005 | Miyachi et al. ............... 349/179 |
| 2005/0168663 | A1 | 8/2005 | Miyachi et al. ................ 349/24 |
| 2005/0179847 | A1 | 8/2005 | Miyachi et al. ............... 349/141 |
| 2005/0185105 | A1 | 8/2005 | Miyachi et al. ................ 349/24 |
| 2005/0185125 | A1 | 8/2005 | Miyachi et al. ............... 349/128 |
| 2005/0185131 | A1 | 8/2005 | Miyachi et al. ............... 349/167 |
| 2005/0237472 | A1 | 10/2005 | Shibahara et al. ............. 349/167 |
| 2005/0264743 | A1 | 12/2005 | Suzuki et al. |
| 2007/0070282 | A1 | 3/2007 | Shibahara et al. ............. 349/141 |

FOREIGN PATENT DOCUMENTS

| | | |
|---|---|---|
| JP | 10-307295 A | 11/1998 |
| JP | 11-183937 A | 7/1999 |
| JP | 2001-249363 A | 9/2001 |
| JP | 2001-337303 A | 12/2001 |

OTHER PUBLICATIONS

Mizoshita et al, "Fast and High-Contrast Electro-Optical Switching of Liquid-Crystalline Physical Gels: Formation of Oriented Microphase-Separated Structures", Adv. Funct. Matter, vol. 13, No. 4, Apr. 2003, pp. 313-317.

Saito et al, "Thermodynamics of a Unique Thermo-Tropic Liquid Crystal Having Optical Isotropy", Ekisho, vol. 5, No. 1, 2001, pp. 20-27.

Yamamoto, "Liquid Crystal Micro Emulsion", Ekisho, vol. 4, No. 3, 2000, pp. 248-254.

Shiraishi et al, "Palladium Nanoparticles Covered with Liquid-Crystalline Molecules—Preparation and Electro-Optic Properties of Liquid Crystal Displays Doped with Palladium Nanoparticles", Kobunshi Ronbunshu, vol. 59, No. 12, Dec. 2002, pp. 753-759.

Kikunchi et al, "Polymer-Stabilized Liquid Crystal Blue Phases", Nature Materials, vol. 1, Sep. 2002, pp. 64-68.

Diele et al, "Chapter XIII Thermotropic Cubic Phases", Handbook of Liquid Crystals Low Molecular Weight Liquid Crystal (edited by D. Demus et al Wiley-VCH), vol. 2B, 1998, pp. 887-900.

"Behavior of Liquid Crystals in Electric and Magnetic Fields", Handbook of Liquid Crystals Low Molecular Weight Liquid Crystal (edited by D. Demus et al Wiley-VCH), vol. 2B, 1998, pp. 484-485 and 530.

Grelet et al, "Structural Investigations on Smectic Blue Phases", Physical Review Letters, vol. 86, No. 17, Apr. 23, 2001, pp. 3791-3794.

Yamamoto, "First Lecture of Liquid Crystal Science Experiment: Identification of Liquid Crystal Phase", (4) Lyotropic Liquid Crystal, Ekisho, vol. 6, No. 1, 2002, pp. 72-82.

Yamamoto et al, "Organic Electrooptic Materials", National Technical Report, vol. 22, No. 6, Dec. 1976, pp. 826-834.

Yoneya, "Examining Nano-Structured Liquid Crystal Phase by Molecule Simulator", Ekisho, vol. 7, No. 3, 2003, pp. 238-245.

* cited by examiner

FIG. 9
GENERAL VIEW OF AGGLOMERATIONS | PACKING PARAMETER | SPATIAL PACKING AND PHASE
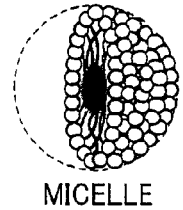 MICELLE  <1/3
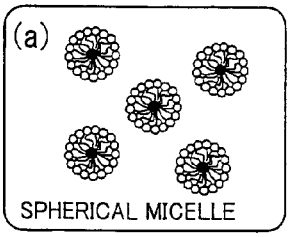 (a) SPHERICAL MICELLE
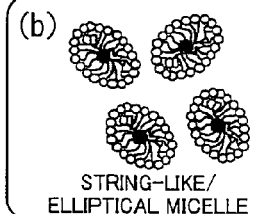 (b) STRING-LIKE/ELLIPTICAL MICELLE
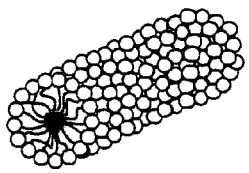 ROD-LIKE MICELLE  <1/2
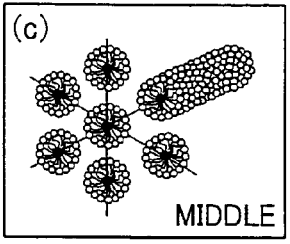 (c) MIDDLE
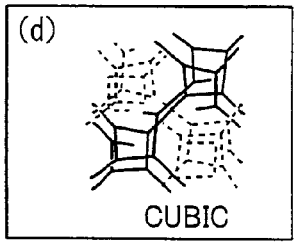 (d) CUBIC
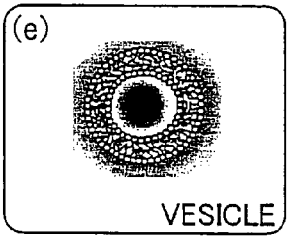 (e) VESICLE
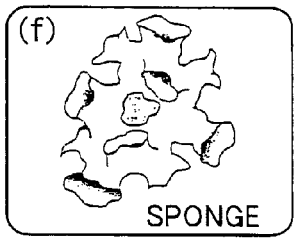 (f) SPONGE
 BILAYER MEMBRANE  ~1
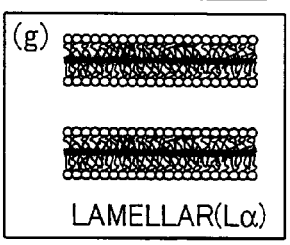 (g) LAMELLAR(Lα)
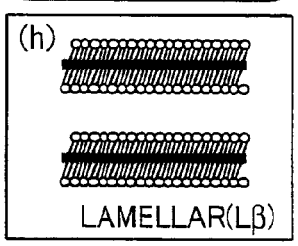 (h) LAMELLAR(Lβ)
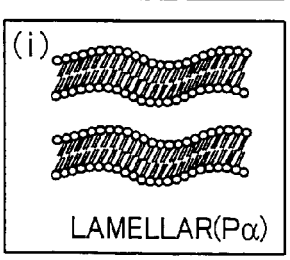 (i) LAMELLAR(Pα)
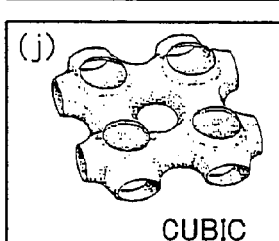 (j) CUBIC
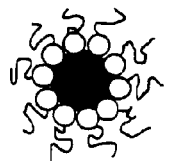 REVERSE MICELLE 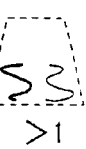 >1
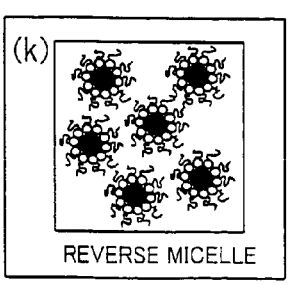 (k) REVERSE MICELLE
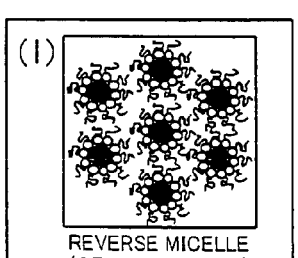 (l) REVERSE MICELLE (ORDERLY PHASE)

DISPLAY ELEMENT AND DISPLAY DEVICE

This application is a continuation of U.S. patent application Ser. No. 12/327,229 filed Dec. 3, 2008, now U.S. Pat. No. 7,616,280 which is a divisional of U.S. patent application Ser. No. 11/017,235, filed Dec. 21, 2004, now U.S. Pat. No. 7,474,373 which is incorporated herein by reference in its entirety. This application claims priority under 35 U.S.C. §119(a) on Patent Applications Nos. 2003/425160 and 2004/368406 filed in Japan respectively on Dec. 22, 2003 and on Dec. 20, 2004, the entire contents of which are hereby incorporated by reference.

FIELD OF THE INVENTION

The present invention relates to a display element and display device having such excellent display properties, such as high-speed response and a wide-view.

BACKGROUND

Liquid crystal display elements are advantaged over other display elements in terms of its thin thickness, light weight, and low power consumption. The liquid crystal display elements are widely used in image display apparatuses such as televisions, video cassette recorders, and the like, and OA (Office Automation) apparatuses such as monitors, word processors, personal computers, and the like.

Conventionally known liquid crystal display methods of the liquid crystal display elements are, for example, the TN (Twisted Nematic) mode in which a nematic liquid crystal is used, display modes in which FLC (Ferroelectric Liquid crystal) or AFLC (Antiferroelectric Liquid crystal) is used, a polymer dispersion type liquid crystal display mode, and the like mode.

Among the liquid crystal display methods, for example, the TN (Twisted Nematic) mode in which the nematic liquid crystal is used is conventionally adopted in the liquid crystal display elements in practical use. The liquid crystal display elements using the TN mode have disadvantages of slow response, narrow viewing angle, and similar drawbacks. Those disadvantages are large hindrances for the TN mode to overtake the CRT (Cathode Ray Tube).

Moreover, the display modes in which the FLC or AFLC is used, are advantageous in their fast response and wide viewing angles, but significantly poor in anti-shock property and temperature characteristics. Therefore, the display modes in which the FLC or AFLC is used, have not been widely used practically.

Further, the polymer dispersion type liquid crystal display mode, which utilizes scattering of light, does not need polarization and is capable of performing highly bright display. However, in principle, the polymer dispersion type liquid crystal display mode cannot control the viewing angle by using a phase plate (retardation film). Further, the polymer dispersion type liquid crystal display mode has a problem in terms of its response property. Thus, the polymer dispersion type liquid crystal display mode is not so advantageous over the TN mode.

In all those display methods, liquid crystal molecules are oriented in a certain direction and thus a displayed image looks differently depending on an angle between a line of vision and the liquid crystal molecules. On this account, all those display methods have viewing angle limits. Moreover, all the display methods utilize rotation of the liquid crystal molecules, the rotation caused by application of an electric field on the liquid crystal molecules. Because the liquid crystal molecules are rotated in alignment all together, responses take time in all the display method. Note that the display modes in which the FLC and the AFLC are used, are advantageous in the response speed and the viewing angle, but have such a problem that their alignment would be irreversibly destroyed by an external force.

In contrast to those display methods in which the rotation of the molecules by the application of the electric field is utilized, a display method in which the secondary electro-optical effect is utilized.

The electro-optical effect is a phenomenon in which a refractive index of a material is changed by an external electric field. There are two types of electro-optical effect: one is an effect proportional to the electric field and the other is proportional to the square of the electric field. The former is called the Pockels effect and the latter is called the Kerr effect. Especially the Kerr effect has been adopted in high-speed optical shutters early on, and has been practically used in a special measurement instruments. The Kerr effect was discovered by J. Kerr in 1875. So far, organic liquid such as nitrobenzene, carbon disulfide, and the like, are known as material showing the Kerr effect. Those materials are used, for example, in the aforementioned optical shutters, and similar devices. Further, those materials are used for measurement of strength of high electric fields for power cables and the like.

Later on, it was found that liquid crystal materials have a large Kerr constant. Research has been performed using the large Kerr constant of the liquid crystal materials for use in light modulation devices, light deflection devices, and further optical integrated circuit. It was reported that some liquid crystal compounds have a Kerr constant more than 200 times higher than that of nitrobenzene.

Under those circumstances, studies for utilization of the Kerr effect in display apparatuses has been started. It is expected that the utilization of the Kerr effect attains a relatively low voltage driving because the Kerr effect is proportional to the square of the electric field. Further, it is expected that the utilization of the Kerr effect attains a high-response display apparatus because the Kerr effect shows a response property of several μ seconds to several m seconds, as its basic nature.

Under there circumstances, for instance, Patent publication 1 (Publication of Japanese Patent Application, publication No. 2001-249363 (Tokukai 2001-249363; published on Sep. 14, 2001)), Patent publication 2 (Publication of Japanese Patent Application, publication No. 11-183937 (Tokukaihei 11-183937; published on Jul. 9, 1999); corresponding to U.S. Pat. No. 6,266,109), and non-Patent publication 1 (Shiro MATSUMOTO et al "Fine droplets of liquid crystals in a transparent polymer and their response to an electric field", Appl. Phys. Lett., 1996, Vol. 69, p. 1044-1046) suggest display elements in which a medium made from a liquid crystalline material is sealed between a pair of substrates and the Kerr effect is induced by application of an electric field parallel or perpendicular to the substrates.

Such display elements are provided with polarizers on respective outer sides of the substrates, the polarizers having absorption axes cross each other perpendicularly. When no electric field (voltage) is applied, the medium is optically isotropic and thus the display element displays black. When a electric field (voltage) is applied, birefringence occurs thereby changing transmissivity to perform gray scale display. With this arrangement, it is possible to realize very high contrast along a normal direction of the substrates.

However, the detailed studies by the inventors of the present invention proved that, when viewed diagonally, these conventional display elements have a certain viewing direction at which their display appears in blue or yellow. When viewed from such direction, the display quality of the display elements are significantly low. This indicates that these display elements are narrow in viewing angle. For example, the display elements are at a particular disadvantage when used as televisions or monitors of personal computers.

Moreover, in the Patent publication 1, it is described that an L-shaped (chevron shaped) electrode is used in order to improve the viewing angle property. However, the inventors of the present invention revealed that this arrangement described in the Patent publication 1 causes reduction in transmissivity and makes almost no improvement in viewing angle property.

SUMMARY

A display element and a display device have a viewing angle property which is improved compared with a conventional arrangement by compensating coloring phenomenon for a diagonal viewing angle. Moreover, a display element and a display device are provided in which a better viewing angle property is attained without deteriorating transmissivity by compensating the coloring phenomenon occurring at diagonal viewing angles without deteriorating the transmissivity.

A display element is provided with: a pair of substrates, at least one of which is transparent; a medium, between the substrates, the medium being changeable in an optical anisotropy magnitude by and according to electric field application; and pixels having at least two domains in which the medium shows optical anisotropies of different directions by the electric field application.

A display element is provided with: a pair of substrates, at least one of which is transparent; a medium, between the substrates, the medium being changeable in an optical anisotropy magnitude by and according to electric field application; and pixels having at least two domains in which the medium shows optical anisotropies of different directions by the electric field application.

As used herein, the wording "changeable in an optical anisotropy magnitude by and according to electric field application" indicates that the magnitude of the optical anisotropy is changeable by and according to the electric field applied. More specifically, a shape of a refractive index ellipsoid is changeable by and according to the electric field applied. That is, in the display element according to the present invention, it is possible to realize different display states by utilizing change in the shape of the refractive index ellipsoid depending whether the electric field is applied or not.

The refractive index in materials is not isotropic in general and differs depending on directions. This anisotropy in the refractive index, that is, optical anisotropy of the material is generally due to the refractive index ellipsoid. In general, it is considered that a plane passing the original point and perpendicular to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction. When the optical anisotropy is discussed in terms of the refractive index ellipsoid, the different display states are realized in a conventional liquid crystal device by changing (rotating) a direction of a major axial direction of the refractive index ellipsoid of a liquid crystal molecule by application of electric field. Here, the shape (shape of cross section of the refractive index ellipsoid) of the refractive index ellipsoid is not changed (constantly ellipsoidal). On the other hand, in the present invention, the different display states are realized by changing the shape (shape of cross section of the refractive index ellipsoid) of the refractive index ellipsoid formed from molecules constituting the medium.

As described above, in the conventional liquid crystal display element, the display operation is carried out by utilizing only the change in the orientational direction of the liquid crystal molecules due to rotation thereof caused by the electric field application. The liquid crystal molecules in alignment are rotated together in one direction. Thus, inherent viscosity of the liquid crystal largely affects responding speed. On the other hand, the present invention, in which the display is carried out by utilizing the change in the modulation of the optical anisotropy in the medium, is free from the problem that the inherent viscosity of the liquid crystal largely affects responding speed, unlike the conventional liquid crystal display element. Thus, it is possible to realize high-speed responding. Moreover, the high-speed responding allows the display element to be used, for example, in a display device of the field sequential color mode.

Moreover, the conventional liquid crystal display element has such a problem that its driving temperature range is limited to temperatures near a phase transition point of a liquid crystal phase, and thus it requires a highly accurate temperature control. On the other hand, the present technology is only required that the medium be kept at temperatures at which the magnitude of the optical anisotropy is changeable by the application of the electric field. Thus, it is possible to easily perform the temperature control in the technology disclosed herein.

Moreover, according to the present technology, it is possible to realize a wider viewing angle property than in the conventional liquid crystal display element, because the present technology utilizes, for performing the display operation, the change in the magnitude of the optical anisotropy of the medium, whereas the conventional liquid crystal display element utilizes, for performing the display operation, the change in the orientational direction of the liquid crystal.

The present technology is so arranged that each pixel has at least two regions (domains) in which the medium shows optical anisotropies of different directions when the electric field is applied or when no electric field is applied. Thus, according to the present technology, for example, it is possible to suppress the color change in the display within polar angle of 60±degrees. Thus, it is possible to cause the coloring phenomenon occurring at diagonal viewing angles caused in the respective domains to compensate for each other (cancel out each other). Thus, it is possible to attain better viewing angle property than the conventional art.

Regarding how to change the magnitude of the optical anisotropy of the medium, the present technology is not limited to the application of the electric field. For example, a magnetic field, light, or the like force may be applied in lieu of the electric field.

More specifically, in order to attain the object, a display element according to the present technology may be so arranged as to include a pair of substrates, at least one of which is transparent, and a medium, between the substrates, the medium being changeable in an optical anisotropy magnitude by and according to a force applied thereon, pixels having at least two domains in which the medium shows optical anisotropies of different directions when the force is applied or when no force is applied.

Moreover, in order to attain the object, a display device is provided with any one of the display elements.

Therefore, according to the present technology, it is possible to provide a display device which has a wide driving temperature range, a wide viewing angle property, and a high-speed responding property, and in which coloring phenomenon occurring at diagonal viewing angles occurred in the respective regions can be compensated for each other. The display device is applicable as, for example, a display device of field sequential color mode.

For a fuller understanding of the nature and advantages of the invention, reference should be made to the ensuing detailed description taken in conjunction with the accompanying drawings.

BRIEF DESCRIPTION OF THE DRAWINGS

FIG. 5(a) schematically illustrates shapes and major axial directions of average refractive ellipsoid in the medium when no electric field is applied.

FIG. 5(b) schematically illustrates shapes and major axial directions of average refractive ellipsoid when the electric field is applied.

FIG. 5(c) schematically illustrates shapes and major axial directions of average refractive ellipsoid when no electric field is applied.

FIG. 5(d) schematically illustrates shapes and major axial directions of average refractive ellipsoid when the electric field is applied.

FIG. 5(e) schematically illustrates shapes and major axial directions of average refractive ellipsoid when no electric field is applied.

FIG. 5(f) schematically illustrates shapes and major axial directions of average refractive ellipsoid when the electric field is applied.

FIG. 5(g) schematically illustrates shapes and major axial directions of average refractive ellipsoid when no electric field is applied.

FIG. 5(h) schematically illustrates shapes and major axial directions of average refractive ellipsoid when the electric field is applied.

FIG. 9 is a view illustrating classification of lyotropic liquid phase.

DETAILED DESCRIPTION

Figure 1:
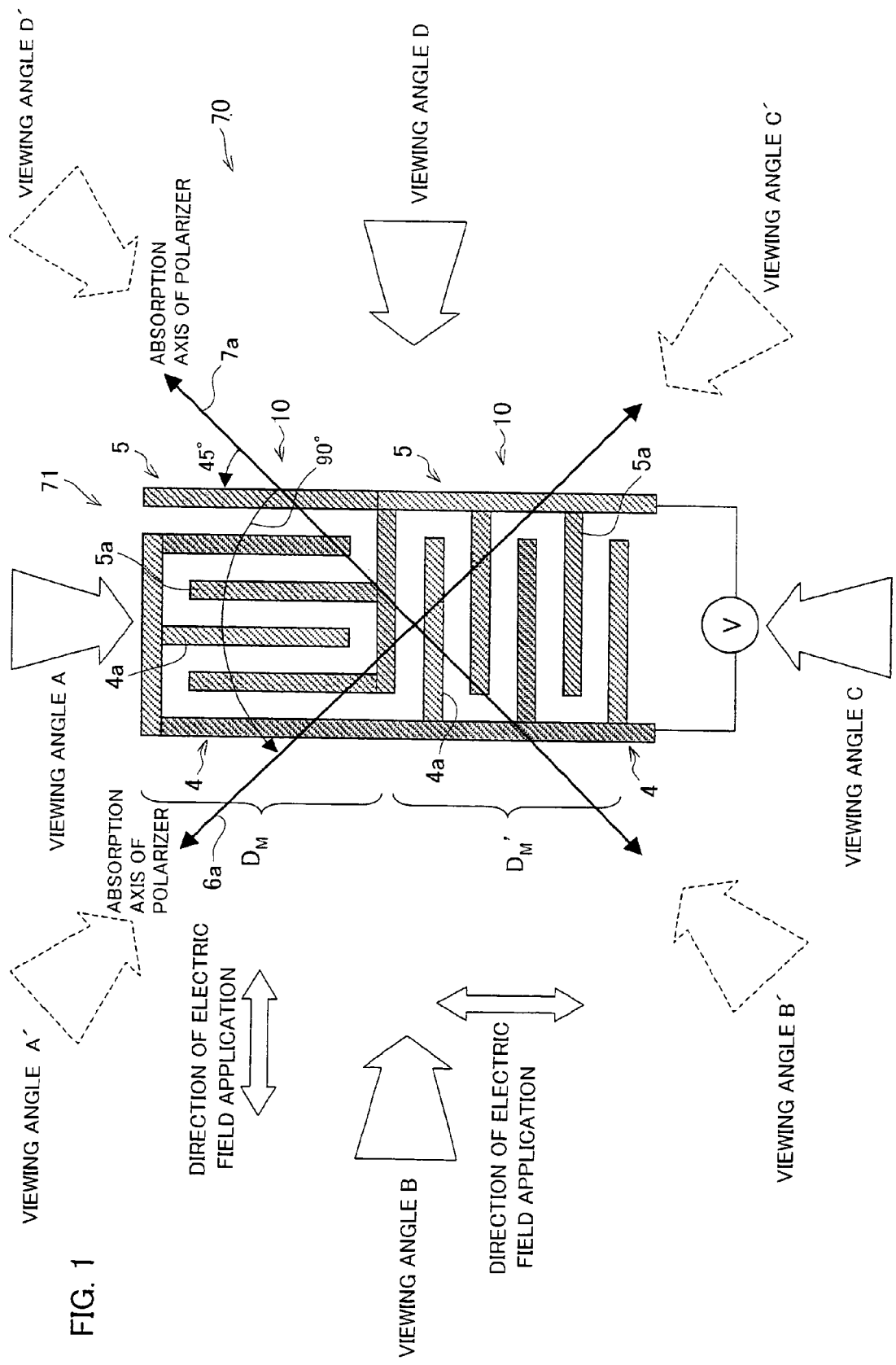
FIG. 1 is a view for explaining relationship between electric field application directions in respective domains in a display element according to an embodiment of the present technology, and absorption axial directions of polarizers.
Figure 23:
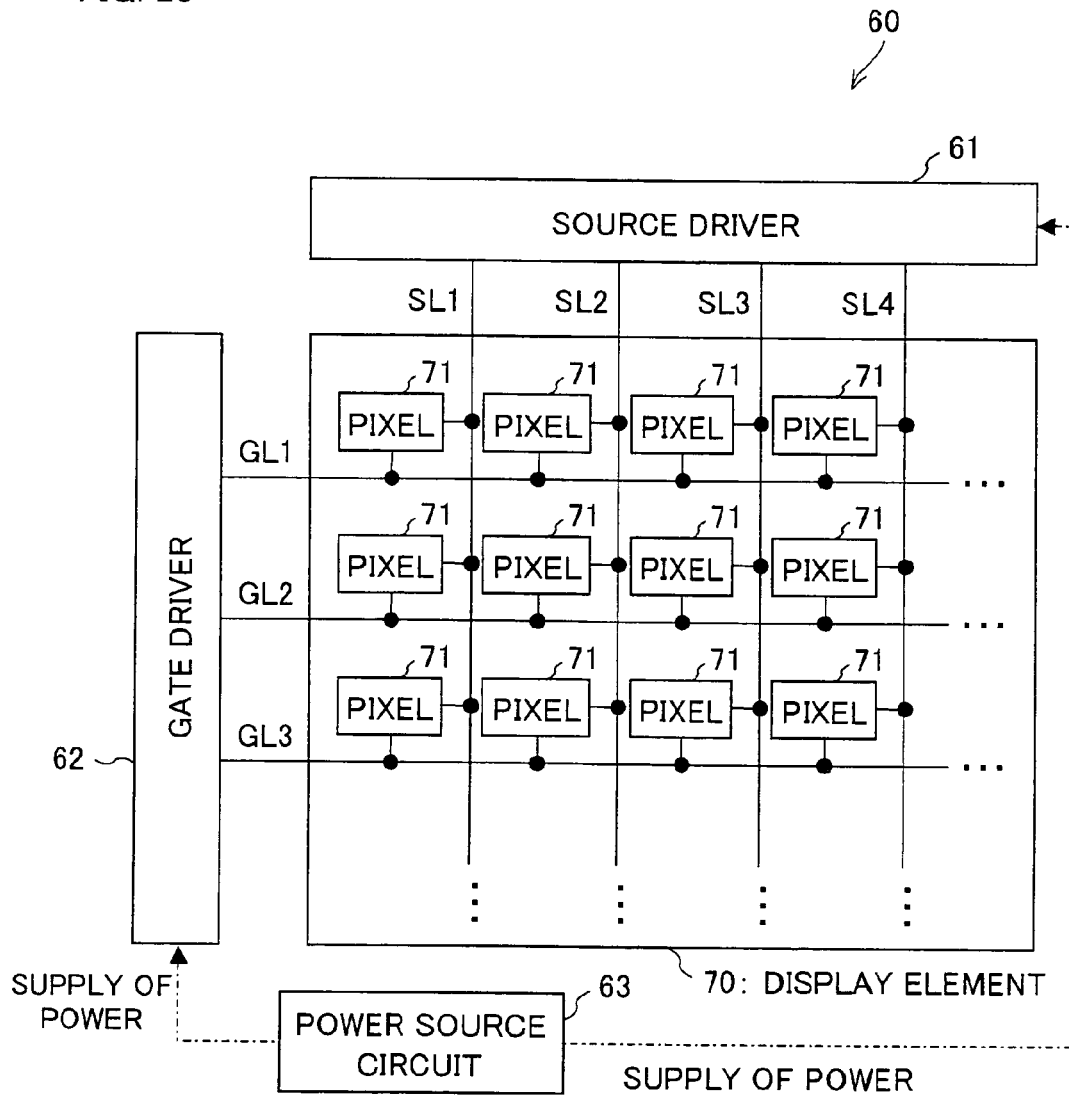
FIG. 23 is a block diagram schematically illustrating essential portions of a display device in which the display element according to the present embodiment is used.

FIG. 1 is a view explaining a relationship between a direction of electric field application (electric field application direction) and a direction of an absorption axis (absorption axial direction) of a polarizer in each domain in a display element. FIG. 2(a) is a cross-sectional view schematically illustrating an arrangement of essential portions of the display element according to the present embodiment when no electric field is applied (in OFF state). FIG. 2(b) is a cross-sectional view schematically illustrating an arrangement of the essential portions of the display element according to the present embodiment when electric field is applied (in ON state). Moreover, FIG. 23 is a block diagram schematically illustrating an arrangement of a display device according to an example embodiment. In the display device the display element according to the present embodiment is used. The display element according to the present embodiment and a driving circuit are provided in the display device.

As illustrated in FIG. 23, the display device 60 according to the present embodiment is provided with a display element 70, a source driver 61, a gate driver 62, and a power source circuit 63, and the like. The display element 70 is provided with a plurality of pixels 71 arranged in matrix. The source driver 61 and the gate driver 62 function as driving circuits.

Moreover, the display element 70 is provided with a plurality of data signal lines SL1 to SLv (v is an arbitrary integer not less than 2), and a plurality of scanning signal lines GL1 to GLw (w is an arbitrary integer not less than 2), which cross with the data signal lines SL1 to SLv. The pixels 71 are provided corresponding to respective intersections of the data signal lines SL1 to SLv and scanning signal lines GL1 to GLw.

The power source circuit 63 supplies a voltage to the source driver 61 and the gate driver 62 in order to cause the display element 70 to perform display operation. By using the voltage, the source driver 61 drives (address) the data signal lines SL1 to SLv in the display element 70. Meanwhile, by using the voltage, the gate driver 62 drives (address) the scanning signal lines GL1 to GLw in the display element 70.

In each pixel 71, a switching element (not illustrated) is provided. The switching element may be, for example, an FET (Field Effect Transistor), a TFT (Thin Film Transistor) or the like. The switching element is connected to the scanning signal line GLw via its gate electrode, and to the data signal line SLv via its source electrode. Further, the switching element is connected with a pixel electrode (not illustrated) via its drain electrode. With this arrangement, the pixels 71 work as follows: the switching element is turned ON in a pixel 71 when a scanning signal line GLu (u is an arbitrary integer not less than 1) is selected. Then, a signal voltage determined in accordance with the a display data signal inputted from a controller (display-use control section, display-use control device; not illustrated) is applied on the display element 70 via the data signal line SLu (u is an arbitrary integer not less than 1) from the source driver 61. While the switching element is OFF after the period in which the scanning signal line GLu is selected is ended, the display element 70 ideally keeps holding the voltage that it has when the switching element 71 is turned OFF.

In the present embodiment, the display element 70 performs the display operation by using a medium (liquid crystalline medium (liquid crystal material), dielectric material) which is optically isotropic (at least macroscopically optically isotropic) when no electric field (voltage) is applied or when the electric field (voltage) is applied. Here, specifically, the medium (liquid crystalline medium (liquid crystal material), dielectric material) is isotropic in the visible light wavelength range, that is, in a wavelength scale of the visible light, or in a larger scale, when no electric field (voltage) is applied or when the electric field (voltage) is applied.

An example of configuration of the display element 70 according to the present embodiment is described below in detail.

As shown in FIGS. 2(a) and 2(b), the display element 70 according to the present embodiment is provided with, as medium holding means (optical modulation layer holding means) a pair of substrates 1 and 2, which are faced to each other. Between the substrates 1 and 2, a medium layer 3 is sandwiched. The medium layer 3 is made from a medium (hereinafter medium A), which can be optically modulated (changeable) by application of an electric field, and is provided as the optical modulation layer. On external surfaces of the substrates 1 and 2, that is, their surfaces that are the opposite sides of their facing surfaces, a polarizers 6 and 7 are provided.

At least one of the substrates 1 and 2 is a transparent substrate, such as a glass substrate or the like. Of the substrates 1 and 2, the substrate 1 has the facing surface (facing to the substrate 2) on which interleave electrodes (comb electrode) 4 and 5 are provided. The interleave electrodes 4 and 5, which have a comb-like configuration that has tooth portions 4a and 5a, face each other in such a manner that tooth portions 4a and 5a are interleaved with each other as shown in FIG. 1. The interleave electrodes 4 and 5 are electric field applying means (electric field applying member) for applying, onto the medium layer 3, an electric field (directed along the substrate 1) substantially parallel to the substrate 1 as illustrated in FIG. 2(b).

The interleave electrodes 4 and 5 are made of an electrode material, such as transparent electrode material or the like, for example, ITO (Indium Tin Oxide) or the like. In the present embodiment, the interleave electrodes 4 and 5 are 5 μm in line width and 0.3 μm in thickness, and arranged with a electrode-electrode distance (electrode interval) of 5 μm therebetween, for example. It should be noted that the electrode material, line width, thickness, and the electrode-electrode distance mentioned above are merely examples and the present invention is not limited to these.

For example, the display element 70 is formed as follows: The substrate 1 on which the interleave electrodes 4 and 5 are provided is bonded together with the substrate 2 by using a sealing agent (not shown). If necessary, a spacer (not shown)

such as a plastic beads, glass fiber spacer, or the like, is provided between the substrates 1 and 2. In a gap formed between the substrates 1 and 2, the medium A is sealed in.

The medium A used in the present embodiment is a medium, a magnitude of whose optical anisotropy is changeable by and according to the electric field applied thereon. An electric displacement $D_{ij}=\epsilon_{ij}\cdot E_j$ is formed by applying an electric field Ej onto a material from outside. When applying the electric field Ej as such, a slight change is also caused in dielectric constant $\epsilon_{ij}$. Within the light wavelength, the square of refraction index (n) is equivalent to the dielectric constant. Thus, it can be said that the medium A is such a material that its refraction index is changeable by and according to the application of the electric field. Note that the medium A may be in any phase such as a liquid, a gas, a solid phase or the like.

As described above, the display element 70 according to the present embodiment performs display operation by utilizing such a phenomenon that the magnitude of the optical anisotropy of a material is changeable by and according to the electric field application, for example, a phenomenon (electro-optical effect) in which refraction index of the material is changeable by and according to external electric field. Whereas conventional liquid crystals display elements in which the aligned molecules (direction of orientation of the molecules) are rotated together in one direction by application of the electric field, the application of the electric field causes almost no change in the direction of the optical anisotropy in this display element according to the present embodiment. The display element according to the present embodiment performs the display operation by changing magnitude of the optical anisotropy (mainly, electronic polarization or orientation polarization) by and according to the application of the electric field.

As described above, the conventional liquid crystal display elements perform the display operation by utilizing only the change in the orientational directions as a result of the rotation of the liquid crystal molecules due to the application of the electric field. In the conventional liquid crystal display elements, therefore, the aligned liquid crystal molecules are rotated together in one direction in order to perform the display operation. Thus, inherent viscosity of the liquid crystal largely affects response speed. On the other hand, the display element 70 according to the present embodiment performs the display operation by utilizing the magnitude of the optical anisotropy in the medium A, as described above. Therefore, according to the display element 70 of the present embodiment, it is possible to realize high-speed response because the display element 70 is free from such a problem that the inherent viscosity of a medium largely affects the responding speed, unlike the conventional display elements. Moreover, the display element 70 according to the present embodiment can be adopted, for example, in a display device of field sequential color mode, because the display element applies the display mode described above and thus a high speed response is realized in the display element 70.

Moreover, the conventional liquid crystal display element has a problem that a driving temperature range (operable temperature range) of the conventional liquid crystal display element is limited to be near a phase transition point of its liquid crystal phase. The conventional liquid crystal display element can be driven at temperatures near the transition point of its liquid crystal phase. Therefore, the conventional liquid crystal display element needs very highly accurate temperature control. On the other hand, temperature control of the display element 70 according to the present embodiment is to keep the medium A merely at temperatures which allow that the magnitude of the optical anisotropy to be changed by the electric field application. Thus, it is easy to control the temperature in the display element 70 according to the present embodiment.

Moreover, according to the display element 70 of the present embodiment, it is possible to realize a wider viewing angle property than in the conventional liquid crystal display element, because the display element 70 performs the display operation by utilizing the change in the magnitude of the optical anisotropy in the medium A. The conventional liquid crystal display element performs the display operation by changing the orientational directions of the liquid crystal molecules.

The medium A used in the present embodiment may be a material which is optically isotropic (at least macroscopically optically isotropic) when no electric field is applied but becomes optically anisotropic when the electric field is applied. On the other hand, the medium A may be a material which is optically isotropic (at least macroscopically optically isotropic) when the electric field is applied but becomes optically anisotropic when no electric field is applied. Examples of such materials are materials showing the Pockels effect, materials showing the Kerr effect, or the like material. Moreover, the medium A may be such a material that is optically anisotropic when no electric field is applied, and a magnitude of whose optical anisotropy is changeable by and according to the electric field applied thereon. Typically, the medium A is a material which is optically isotropic (at least macroscopically optically isotropic) when no electric field is applied but shows optical modulation when the electric field is applied (especially, it is preferable that birefringence of the medium A be increased by the application of the electric field).

The Pockels effect and the Kerr effect (which themselves are observed in isotropic states) are an electro-optical effect proportional to the electric field and an electro-optical effect proportional to square of the electric field, respectively. When no electric field is applied, the material of the Pockels effect or the Kerr effect is in an isotropic phase, and thus optically isotropic. When a electric field is applied, however, major axial directions of molecules of a compound are oriented along the direction of the electric field in a region (part of the material) in which the electric field is applied, whereby birefringence occurs in the region (part of the material). The occurrence of birefringence changes (modulates) transmissivity of the material. For example, a display mode using a material showing the Kerr effect is such that localization of electrons within one molecules is controlled by the application of the electric field. By doing this, individual molecules randomly oriented are rotated individually to change their directions. Thus, the display mode using the material The Kerr effect is very fast in responding speed. Moreover, because the molecules are randomly oriented, this display mode has such an advantage that it has no viewing angle limitation. Among materials that may be the medium A, materials whose property is roughly proportional to the electric field or the square of the electric field may be considered as the materials showing the Pockels effect or the Kerr effect.

Examples of the materials showing the Pockels effect include organic solid materials and the like such as hexamine and the like. However, the present invention is not limited to this. Various organic or inorganic materials showing the Pockels effect may be applicable as the medium A.

Moreover, examples of the materials showing The Kerr effect includes PLZT (a metal oxide which is a mixture of lanthanum and a solid solution of lead zirconate and lead titanate; Lead Zirconium Titanate, doped with a little lanthanum; La-modified lead zirconate titanate) a metal oxide which is a mixture of lanthanum and a solid solution of lead zirconate and lead titanate), liquid crystalline materials (material that can have a liquid crystal phase) represented by the following structural Formulae (1) to (4), and the like materials:

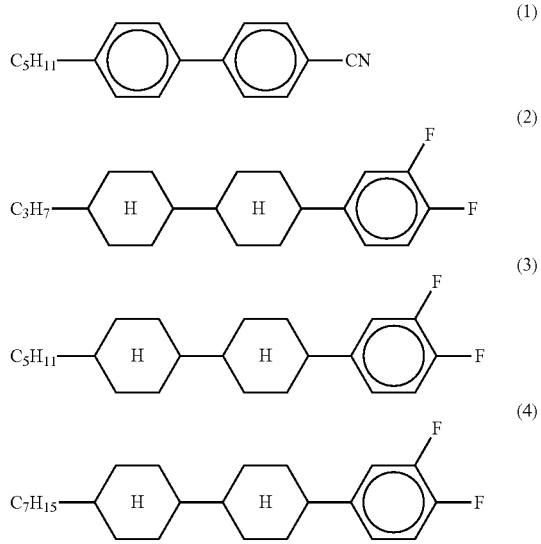

However, the present invention is not limited to these.

The Kerr effect is observed in a material transparent to incident light. Therefore, the material showing the Kerr effect is used as a transparent medium. In general, temperature increase causes the liquid crystalline material to transit from a liquid phase having a short distance order to an isotropic phase having a random orientation at a molecular level (the isotropic phase in which the molecules are randomly oriented). That is, the Kerr effect of the liquid crystalline material is a phenomenon that is observed not in a nematic phase but in a liquid that is at its liquid phase-isotropic phase transition temperature or at a higher temperature (that is, the Kerr effect is observed in a material in the isotropic state). The liquid crystalline material is used as a transparent dielectric liquid.

Dielectric liquids of the liquid crystalline materials and the like are more isotropic at a higher operating environmental temperature (heating temperature) attained by heating. Thus, in case where the medium A is a dielectric liquid of a liquid crystalline material or the like, the following arrangements, for example, may be adopted in order to use the dielectric liquid while it is transparent, that is, to use the dielectric liquid in the liquid state transparent to the visible light: (1) to provide heating means (not shown) such a heater or the like in a periphery of the medium layer 3 in order that the dielectric liquid heated to its transparent point or higher by using the heating means may be used; (2) to utilize heat radiation from a back light or heat conduction from the back light and/or a peripheral driving circuit in order that the dielectric liquid heated to its transparent point or higher may be used (in this case, the back light and/or the peripheral driving circuit act as heating means); or the like arrangement. Moreover, it may be arranged that (3) as the heater, a sheet heater (heating means) is attached to at least one of the substrates 1 and 2 in order that the dielectric liquid heated to a designated transparent may be used. Further, in order that the dielectric liquid may be used in the transparent state, the dielectric liquid may be made of a material whose transparent point is lower than a lower limit of the operating temperature of the display element 70.

The medium A preferably contains a liquid crystalline material. In case where the medium A is a liquid crystalline material, it is preferable that the liquid crystalline material be macroscopically a transparent liquid in the isotropic phase but microscopically containing clusters, which are agglomerations of molecules oriented in a certain direction in a short distance order. This is because, when used, the liquid crystalline material is arranged to be transparent with respect to the visible light, the clusters are also arranged to be transparent with respect to the visible light (that is, as being optically isotropic) when used.

In order to cause the liquid crystalline material containing the clusters to be transparent as such, the following arrangements may be adopted, for example: the display element 70 may be controlled in terms of temperature by using heating means such as a heater as described above; the medium layer 3 may be segmented into small regions by using a polymer material or the like as described in Patent publication 2; the liquid crystalline material may be minute droplets having a diameter smaller than the wavelength of the visible light (for example by arranging such that the liquid crystalline material has a diameter of, for example, 0.1 μm or less, thereby restraining scattering of the light in order to cause such liquid crystalline material to be transparent); the liquid crystalline material may be made of a liquid crystalline compound that is in the transparent isotropic phase at the operating environment temperature (room temperature). The scattering of light is negligible when the diameter of the liquid crystalline material and a diameter (major axis) of the clusters is 0.1 μm or less, that is, smaller than the wavelength of the visible light (wavelength of incident light). Thus, for example, if the diameter of the cluster is 0.1 μm or less, the clusters are also transparent with respect to visible light.

Note that, as described above, the medium A is not limited to the materials showing the Pockels effect or the Kerr effect. Therefore, the medium A may have an orderly molecular structure having a cubic symmetry in a scale (for example, nano scale) less than the light wavelength of the visible light, and thus may have a cubic phase that appears isotropic optically (see Non-Patent publication 3, 6 to 8: [Non-Patent publication 3] Ichiyo SAITO et al., "Thermodynamics of unique optically isotropic thermotropic liquid crystal", EKISHO, 2001, Vol. 5, No. 1, p. 20-27; [Non-Patent publication 6] Hirotsugu KIKUCHI et al., "Polymer-stabilized liquid crystal blue phases", p 64-68, [online], Sep. 2, 2002, Nature Materials, vol. 1, (searched on Jul. 10, 2003; the Internet <URL: http://www.nature.com/naturematerials>; [Non-Patent publication 7] Makoto YONEYA, "Study on Nano Structure of Liquid Crystal Phase by Molecular Simulation", EKISHO, 2003, Vol. 7, No. 3, p. 238-245; and [Non-Patent publication 8] D. Demus et al., "Handbook of Liquid Crystals: Low Molecular Weight Liquid Crystal", Wiley-VCH, 1998, Vol. 2B, p 887-900). The cubic phase is one of those liquid crystal phases of the liquid crystalline material which can be used as the medium A. Examples of the liquid crystalline materials showing the cubic phase include BABH8 and the like. BABH8 is represented by the following Structural Formula (5):

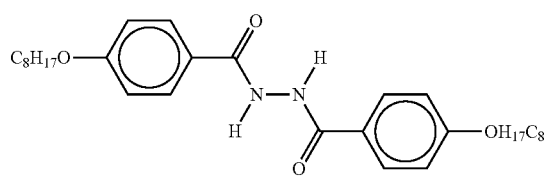

(5)

The application of electric field slightly distorts the structure of the liquid crystalline material, thereby inducing optical modulation.

At temperatures not less than 136.7° C. but not more than 161° C., BABH8 is in the cubic phase having an orderly structure having a cubic symmetry (a symmetric cubic system) and being smaller in scale than the wavelength of the visible light. The orderly structure (cubic symmetric orderly structure) of the cubic phase has a lattice constant about 6 nm, that is, smaller than the light wavelength by more than 1 digit. BABH8 allows good black display under crossed nicols because, as described above, BABH8 has the orderly structure smaller than the light wavelength within the aforementioned temperature range and shows optical isotropy (at least macroscopically isotropic) within the temperature range when no electric field is applied thereon.

On the other hand, when an electric field is applied between the interleave electrodes 4 and 5 while the temperature of BABH8 is controlled to be not less than 136.7° C. but not more than 161° C. by using, for example, the aforementioned heating means or the like, the structure (orderly structure) having the cubic symmetry is distorted. That is, within the temperature range, BABH 8 is isotropic when no electric field is applied thereon but becomes optically anisotropic when the electric field (voltage) is applied.

As a result, birefringence occurs in the medium 3. Therefore, the display element 70 can perform good white display. Note that the birefringence occurs in a certain direction but a magnitude of the birefringence is changeable by and according to the applied electric field (voltage). Moreover, a voltage-transmissivity curve (depicting a relationship between (a) transmissivity and (b) the voltage to be applied between the interleave electrodes 4 and 5) is a stable curve in the temperature of range not less 136.7° C. but not more than 161° C., that is, in such a wide temperature range of about 20K. Therefore, the use of BABH8 as the medium A allows very easy temperature control. That is, the medium layer 3 made of BABH8 is in a thermally stable phase and thus does not have such temperature dependency that its property is suddenly changed by thermal change. Therefore, temperature control for the medium layer 3 made of BABH8 is very easy.

Moreover, the medium A may be a system that appears optically isotropic, the system filled with agglomerations of radically oriented liquid crystal molecules and of a size smaller than the wavelength of the visible light. Such system may be a liquid crystal micro emulsion as described in non-Patent publication 4 (Jun YAMAMOTO, "Liquid Crystal Micro emulsion", EKISHO, 2000, Vol. 4, No. 3, p. 248-254), a liquid crystal-particle dispersion system (a mixture system in which particulates are dispersed in a solvent (liquid crystal) as described in non-Patent publication 5 Yukihide SHIRAISHI and four others, "Palladium nano particle protected with liquid crystal molecules: its Production and Application to a guest-host mode liquid crystal element", Collected Papers on Macromolecule, December 2002, Vol. 59, No. 12, p 753-759), or the like. The agglomerations having the radical orientation is distorted by application of the electric field, thereby inducing the optical modulation.

Note that the liquid crystalline material may be a simple substance that solely shows its liquid crystalline property, or a mixture that shows its liquid crystalline property when a plurality of substance are mixed together. Further, the liquid crystalline material may be a mixture of (a) such liquid crystalline simple substance or such liquid crystalline mixture, and (b) a non-liquid crystalline material. Further, the liquid crystalline material may be a material in which a polymer and liquid crystal are dispersed (this material is described in non-Patented Publication 1. Moreover, a gelling agent as described in non-Patent Publication 2 (Yukihide SHIRAISHI and four others, "Palladium nano particle protected with liquid crystal molecules: its Production and Application to a guest-host mode liquid crystal element", Collected Papers on Macromolecule, December 2002, Vol. 59, No. 12, p 753-759) may be added in the liquid crystalline material.

Moreover, the medium A preferably contains a polar molecule. For example, nitrobenzene or the like is preferable as the medium A. Note that nitrobenzene is a medium showing the Kerr effect.

In the following, examples of the materials that can be used as the medium A, and an example of forms of the materials are provided. It should be noted that the present invention is not limited to the following examples.

[Smectic D Phase (SmD)]

Smectic D phase (SmD) is one of liquid crystal phases of the liquid crystalline materials that can be used as the medium A. Smectic D phase has a 3-dimensional lattice structure and a lattice constant smaller than the wavelength of the visible light. Therefore, smectic D phase is optically isotropic.

Examples of liquid crystalline materials showing smectic D phase are ANBC16 and the like, which are described in non-patent publications 3 and 8. ANDC16 is represented by Formulae (6) and (7):

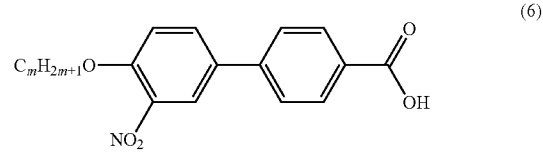

(6)

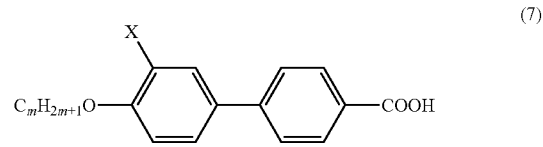

(7)

where m is an arbitrary integer but specifically m=16 in Formula (6) and m=15 in Formula (7), and X is $NO_2$ group.

ANBC16 shows smectic D phase in a temperature range of from 171.0° C. to 197.2° C. In the smectic D phase, a plurality of molecules form a 3-dimentional lattice like a jungle gym (Registered Trademark). The lattice has a lattice constant of several ten nm or less, which is less than the wavelength of visible light. That is, the smectic D phase has a cubic symmetry and orderly orientation (orderly structure) smaller than the wavelength of the visible light. Note that the lattice constant of ANBC16 described in the present embodiment is about 6 nm. Because of this, the smectic D phase is optically isotropic. However, by applying the electric field on ANBC16 within the temperature range in which it shows smectic D phase, molecules of ANBC change their directions to be oriented along the electric field direction, thereby causing distortion in the lattice structure. That is, the optical anisotropy occurs in ANBC16. The present invention is not limited to ANBC16: any material showing smectic D phase is applicable as the medium A for the display element 70 according to the present embodiment, because the magnitude of the optical anisotropy is changeable according to whether or not the electric field is applied (that is, between when the electric field is applied and when no electric field is applied).

[Liquid Crystal Micro Emulsion]

Liquid crystal micro emulsion is a generic term for a system (mixture system) in which thermotropic liquid crystal molecules in a droplet form are dispersed in an oil continuous phase as in a O/W micro emulsion (water droplets are dispersed in an oil continuous phase by the aid of a surfactant) whose oil molecules are dispersed in lieu of the thermotropic liquid crystal molecules. Non-patent publication 4 proposes the liquid crystal micro emulsion.

Figure 7:
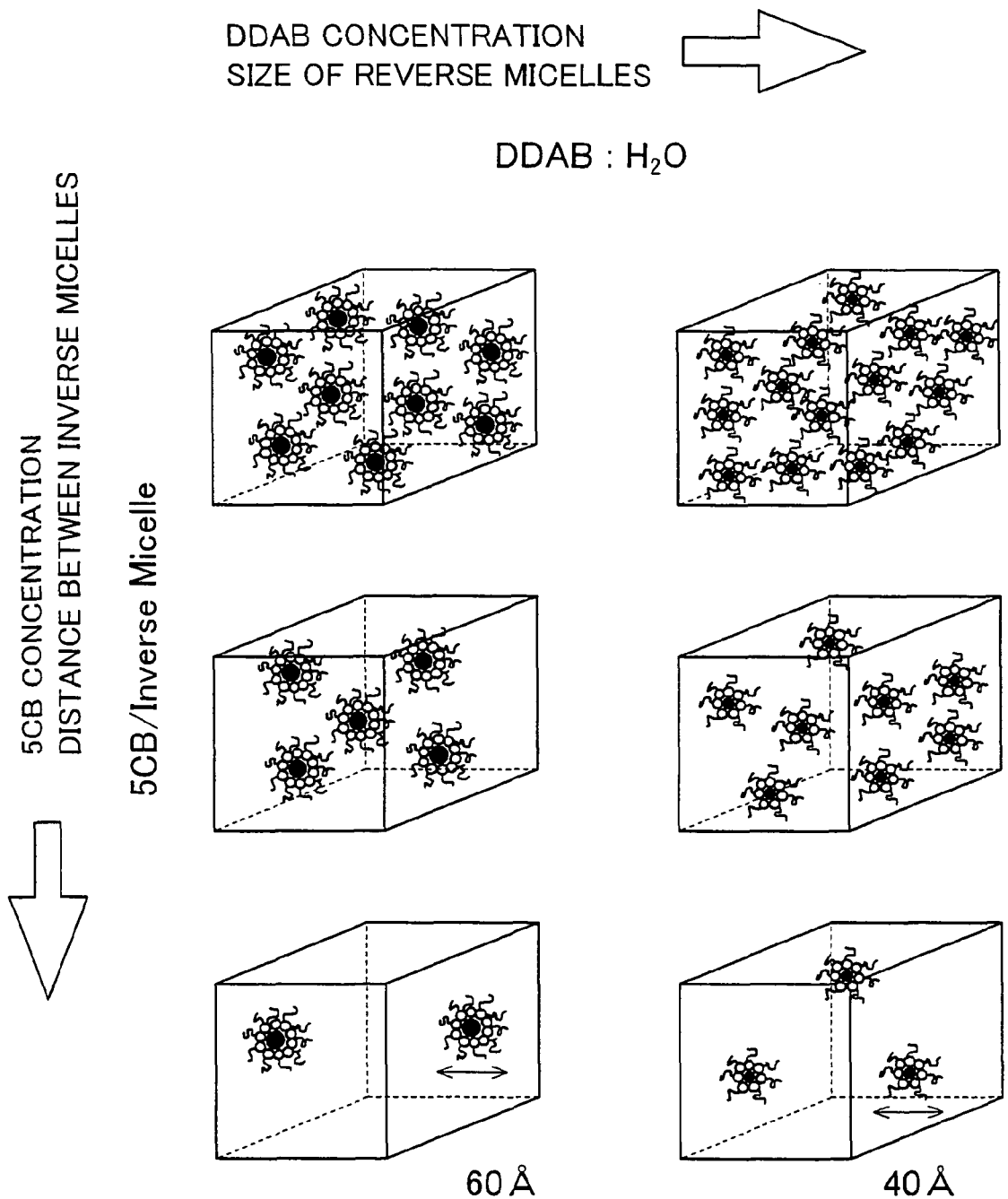
FIG. 7 is a schematic view illustrating an example of a reverse micelle phase mixture system of a liquid crystal micro emulsion.
Figure 8:
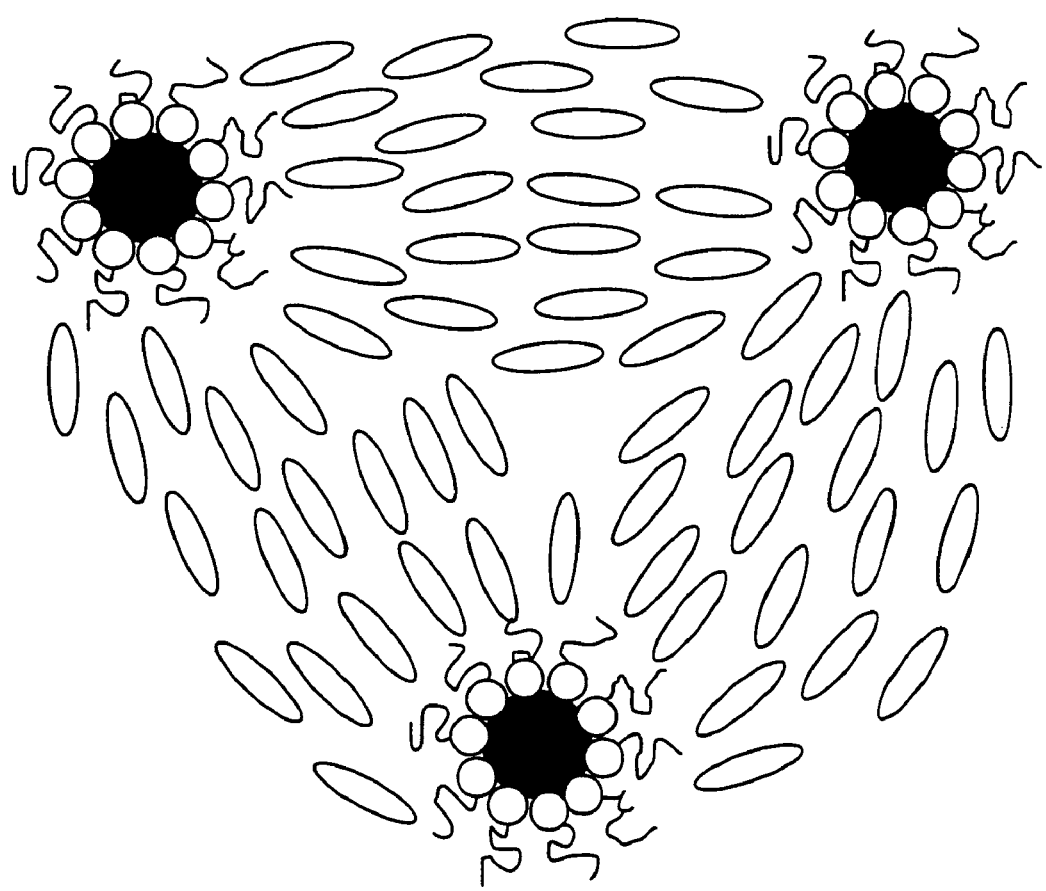
FIG. 8 is a schematic view illustrating another example of a reverse micelle phase mixture system of a liquid crystal micro emulsion.

Specific examples of the liquid crystal micro emulsion include a mixture of pentylcyanobiphenyl (5CB) and an aqueous solution of didodecylammonium bromide (DDAB). Pentylcyanobiphenyl (5CB) is a thermotropic liquid crystal that shows nematic liquid phase. Didodecylammonium bromide (DDAB) is a lyotropic liquid crystal that shows reverse micelle phase. This mixture system has a structure as schematically depicted in FIGS. 7 and 8.

Moreover, the mixture system is typically such that its reverse micelles have a diameter of about 50 Å, and distances between the reverse micelles are about 200 Å. These scales are smaller than the wavelength of visible light roughly by one digit. That is, the mixture system (liquid crystal micro emulsion) has an orientational order (orderly structure) smaller than the wavelength of the visible light. Moreover, the reverse micelles are randomly dispersed 3-dimentionally. Centered with respect to each reverse micelle, 5CB are aligned in a radial manner. Accordingly, the mixture system is optically isotropic.

By applying the electric field onto a medium made of the mixture system, the molecules are oriented along the electric field direction because 5CB is dielectrically anisotropic. That is, orientational anisotropy occurs the system that has been optically isotropic due to the radial orientation centered with respect to the reverse micelles. This results in optical anisotropy. The present invention is not limited to the mixture system: the medium A of the display element according to the present embodiment may be any liquid crystal emulsion that is optically isotropic when no electric field is applied thereon but becomes optically anisotropic when the electric field is applied thereon.

[Lyotropic Liquid Crystal]

Lyotropic liquid crystal is a liquid crystal that is a mixture in which liquid crystal molecules are dissolved in a solvent (water, an organic solvent or the like) that has other property. In the present embodiment, lyotropic liquid crystal having particular phases can be used as the lyotropic liquid crystal. The particular phases are phases whose optical anisotropy is changeable in magnitude depending on whether or not the electric field is applied (that is, between when the electric field is applied and when no electric field is applied). An example of the particular phases is a phase that is optically isotropic when no electric field is applied but becomes optically anisotropic when the electric field is applied. Examples of the particular phases include a micelle phase, a sponge phase, a cubic phase, and a reverse micelle phase, which are described in non-Patent publication 11 (Jun YAMAMOTO, "Lecture on Liquid Crystal Science: Lecture 1, Identification of Liquid Crystal Phase: (4) Lyotropic Liquid Crystal", EKISHO, 2002, Vol. 6, No. 1, p 72-83). In FIG. 9, classification of the lyotropic liquid crystal phase is illustrated.

There is a surfactant (which is an amphiphile) that shows a micelle phase. For example, an aqueous solution of dodecyl sodium sulfate, an aqueous solution of potassium palmitate, or the like forms spherical micelles. Moreover, in a mixture solution of polyoxyethylenenonylphenylether (which is a non-ionic surfactant) and water, a nonylphenyl group acts as a hydrophobic group whereas oxyethylene chain acts as a hydrophilic group, thereby forming micelles. Besides these, micelles are formed in an aqueous solution of styrene-ethyleneoxide block copolymer.

For example, in the spherical micelles, the molecules are packed in such a manner that they are oriented respectively toward the all directions 3-dimentionally (thereby forming molecule agglomerations). In this way, the micelles are in the spherical shape. Moreover, the spherical micelles have a size smaller than the wavelength of the visible light. Thus, the spherical micelles show no optical anisotropy but appear isotropic. That is, the spherical micelle has an orderly structure (orientational order) not smaller than the wavelength of visible light. However, when an electric field is applied on the spherical micelles, the spherical micelles are distorted thereby showing the optical anisotropy. Therefore, the lyotropic liquid crystal having the spherical micelles phase is also applicable as the medium A of the display element according to the present embodiment. The present embodiment is not limited to the spherical micelles. Micelle phases having other shapes, that is, string-like micelle phase, an elliptical micelle phase, rod-like micelle phase, and the like are similarly effective as the medium A.

Moreover, it is generally known that reverse micelles are formed depending on concentration, temperature, and surfactant. Compared with the micelles, the reverse micelles are such that the molecules are located upside down in such a matter that the hydrophilic group and the hydrophobic group exchanges their positions. Such reverse micelles show a similar optical effect as the micelles. Therefore, by using the reverse micelle phase as the medium A, an effect equivalent to that in the use of the micelle phase is attained. Note that the aforementioned liquid crystal micro emulsion is an example of a lyotropic liquid crystal having the reverse micelle phase (reverse micelle structure).

Moreover, an aqueous solution of pentaethylene glycoldodecylether, which is a non-ionic surfactant, has concentration and temperature ranges in which it shows the sponge phase or cubic phase as shown in FIG. 9. Materials in the sponge phase and the cubic phase are transparent because the sponge phase and the cubic phase have an order (orientational order, orderly structure) smaller than the wavelength of the visible light. That is, media having these phases show optical isotropy, however, they show optical anisotropy when a electric field is applied thereon, because their orientational order (orderly structure) is changed by (and according to) the application of the electric field (voltage). Thus, the lyotropic liquid crystal having the sponge phase or the cubic phase is also applicable as the medium A of the display element 70 according to the present embodiment.

[Liquid Crystal Particulate Dispersed System]

Moreover, the medium A may be a liquid crystal particulate dispersed system in which latex particulates are mixed in the aqueous solution of pentaethyleneglycol-dodecylether (a non-ionic surfactant), the latex particulates having a surface modified with sulfate group and a diameter of about 100 Å. The aforementioned liquid crystal particulate dispersed system shows the sponge phase, However, the present embodiment is not limited to this: liquid-crystal-particulate-dispersed systems that show micelle phase, cubic phase, reverse micelle phase or the like may be applicable as the medium A used in the present embodiment. That is, the medium A may be a liquid-crystal-particulate-dispersed system which shows a phase in which the magnitude of the optical anisotropy is changeable according to whether or not the electric field is applied (that is, between when the electric field is applied and when no electric field is applied). Note that it is possible to have an orientational structure similar to that of the liquid crystal emulsion by using aforementioned DDAB in lieu of the latex particulates.

[Dendrimer]

Dendrimer is a 3-dimentionally highly-branched polymer in which every monomer unit is branched. Because it is high branched, dendrimer has a spherical structure when it has a molecular weight larger than a certain molecular weight. The spherical structure is a transparent because it has an order (orderly structure, orientational order) smaller than the wavelength of the visible light. However, application of electric field (voltage) changes an orientational order in dendrimer, thereby causing dendrimer to have an optical anisotropy (and/or thereby changing the magnitude of the optical anisotropy of the dendrimer). Therefore, dendrimer is also applicable as the medium A of the display element 70 according to the present embodiment. Moreover, it is possible to attain an orientational structure similar to that of the liquid crystal micro emulsion by using dendrimer in lieu of DDAB in the liquid crystal micro emulsion.

[Cholesteric Blue Phase]

It is known that screw axes form 3-dimensional periodic structures in a cholesteric blue phase and the structure of the cholesteric blue phase is highly symmetric (for example, see non-Patent Publications 6 and 7). Materials in the cholesteric blue phase are substantially transparent because the cholesteric blue phase has an order (orderly structure, orientational order) smaller than the wavelength of the visible light. However, the application of electric field (voltage) changes a magnitude of an orientational order in the cholesteric blue phase, thereby causing the cholesteric blue phase to show optical anisotropy. That is, the cholesteric blue phase, which is optically isotropic generally, shows optical anisotropy (and/or changes the magnitude of its optical anisotropy) when the electric field is applied, because the liquid crystal molecules are oriented along the electric field direction thereby distorting the lattice.

One of Examples of the materials showing the cholesteric blue phase is a compound prepared by mixing 48.2 molt % of "JC1041" (product name: a liquid crystal mixture made by Chisso Corporation), 47.4 mol % of "5CB" (4-ciano-4'-pentylbiphenyl; a nematic liquid crystal), and 4.4 mol % of "ZLI-4572" (product name: a chiral dopant made by Merck Ltd.). This compound shows a cholesteric blue phase in a temperature range of from 330.7K to 331.8K.

[Smectic Blue Phase]

A smectic blue (BPSm) phase has a highly symmetric structure (for example, see non-Patent Publications 7 and 10: [non-Patent Publication 10] Eric Grelet and three others, "Structural Investigations on Smectic Blue Phase", PHYSICAL REVIEW LETTERS, The American Physical Society, Apr. 24, 2001, vol. 86, No. 17, p 3791-3794), similarly to the cholesteric blue phase. Because it has an order (orderly structure, orientational order) smaller than the wavelength of the visible light, a material in the smectic blue phase is transparent. However the application of electric field changes the magnitude of an orientational order in the smectic blue phase, thereby causing the smectic blue phase to show the optical anisotropy (and/or changing the magnitude of the optical anisotropy). That is, the smectic blue phase, which is optically isotropic generally, shows optical anisotropy when the electric field is applied, because the liquid crystal molecules are oriented along the electric field direction thereby distorting the lattice.

One of examples of the materials that show the smectic blue phase is FH/FH/HH-14BTMHC or the like. This material shows BPSm 3 phase at temperatures from 74.4° C. to 72.3° C., BPSm 2 phase at temperatures from 73.2° C. to 72.3° C., and BPSm1 phase at temperatures from 72.3° C. to 72.1° C. The BPSm phase has a highly symmetric structure as described in non-Patent Publication 7, thus being optically isotropic generally. Moreover, when the electric field is applied on the material FH/FH/HH-14BTMHC, the liquid crystal molecules are oriented along the electric field direction, thereby distorting the lattice. As a result the material shows optical anisotropy. Therefore, this material is applicable as the medium A of the display element 70 according to the present embodiment.

As described above, as long as their optical anisotropy (refraction index, magnitude of orientational order) is changed (changeable) when the electric field is applied, the medium A may be any material such as the materials showing the Pockels effect or the materials showing the Kerr effect; the materials made from molecules that show any one of the cubic phase, smectic D phase, cholesteric blue phase, and smectic blue phase; or the lyotropic liquid crystal or liquid crystal particulates dispersed system that show any one of the micelle phase, reverse phase, and cubic phase. Moreover, the medium A may be the liquid crystal micro emulsion, dendrimer (dendrimer molecules) amphiphilic molecules, copolymer, other polar molecules or the like material.

Moreover, the medium A is not limited to the liquid crystalline material. It is preferable that the medium A have a orderly structure (orientational order) smaller than the wavelength of the visible light. If it has such orderly structure smaller than the light wavelength, the medium A is optically isotropic. Therefore, by using the medium which has the orderly structure smaller than the wavelength of the visible light when the electric field is applied or when no electric field is applied, it is possible to surely change the display state between when the electric field is applied on the medium and when no electric field is applied on the medium.

Hereinafter, it is assumed that in the present embodiment the medium A is pentylcyanobiphenyl (5CB) represented by structural Formula (1). The medium A is not limited to this may be appropriately any one of the aforementioned materials in lieu of 5CB.

According to the present embodiment, it was possible to change the transmissivity by applying the electric field (voltage), in an arrangement where the interleave electrodes 4 and 5 made of ITO had a line width of 5 μm and an electrode-electrode distance of 5 μm, a medium layer 3 had a layer thickness of 10 μm, 5CB was used as the medium A and kept at temperatures above but near phase transition temperature for the nematic isotropic phase (temperatures slightly higher than the phase transition temperature, for example, +0.1K). Note that 5CB is nematic at temperatures less than 33.3° C., but is isotropic at temperatures not less than 33.3° C.

In the present embodiment, a dielectric thin film (alignment film) (not shown) may be provided on one or both of the facing surfaces of the substrates 1 and 2. The dielectric thin films have been subjected to such alignment process that causes the domains $D_M$ and $D_M'$ (minute regions) to have optical anisotropies of different directions when the electric field is applied. By providing the dielectric thin film to the inner surface of at least one of the substrates 1 and 2, it is possible to attain better orientational order (orientational structure, orientational order). Thus, it is possible to attain larger electro-optical effect, for example, a larger the Kerr effect.

There is no particular limitation in terms of the dielectric thin film, provided that it can improve the orientational effect. The dielectric thin film may be an organic film or an inorganic film. Further, an organic film and an inorganic film may be provided respectively on the inner surfaces of the substrates 1 and 2. Because the organic thin film shows good orientational effect as the dielectric thin film, it is preferable that the dielectric thin film be the organic thin film. Among organic thin films, polyimide is highly stable and reliable, and shows significantly excellent orientational effect. Therefore, by using polyimide as dielectric thin film material, it is possible to provide a display element 70 having good display performance.

The dielectric thin film is provided on the inner surface of at least one of the substrates 1 and 2 (for example, on the inner surface of the substrate 1 in such a manner that the dielectric thin film covers the interleave electrodes 4 and 5). There is no particular limitation in film thickness of the dielectric thin film. Moreover, the dielectric thin film provided on the substrate 1 and the dielectric thin film provided on the substrate 2 are, for example, subjected to alignment process to have alignment along the tooth portion 4a and 5a of the interleave electrodes 4 and 5 in opposite directions respectively.

Next, display principle of the display element (display element 70) according to the present embodiment are described below referring to FIGS. 3(a) and 3(b) to 5(a) and 5(h), and FIG. 24.

The following description mainly discuses an arrangement in which the display element 70 according to the present embodiment is a transmissive type of display element and is substantially optically isotropic or preferably optically isotropic when no electric field is applied but becomes optically anisotropic when the electric field is applied. However, it should be noted that present invention is not limited to this arrangement.

Figure 4:
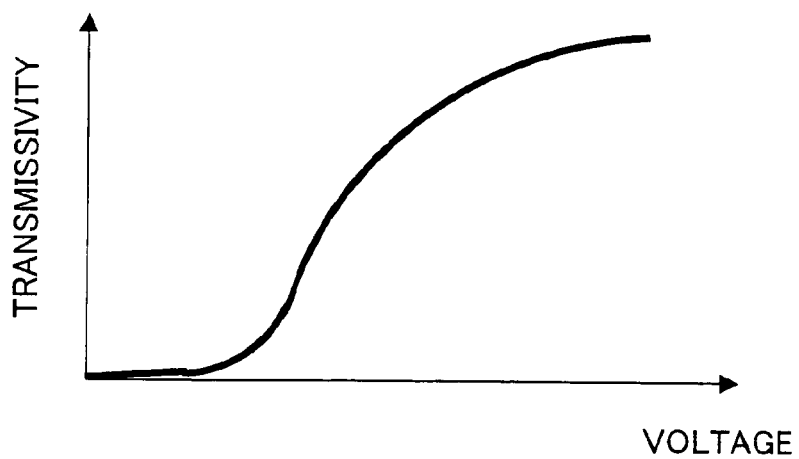
FIG. 4 is a graph illustrating relationship between voltage applied on the display element and transmissivity of the display element.
Figure 5:
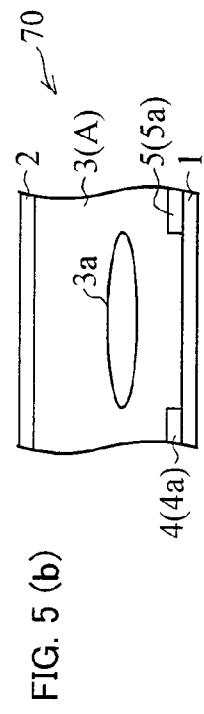
FIG. 5(a) is a cross sectional view of the display element according to the present embodiment.
FIG. 5(b) is a cross sectional view of the display element according to the present embodiment.
FIG. 5(c) is a cross sectional view of a conventional display element of TN mode.
FIG. 5(d) is a cross sectional view of the conventional display element of TN mode.
FIG. 5(e) is a cross sectional view of a conventional display element of VA mode.
FIG. 5(f) is a cross sectional view of the conventional display element of VA mode.
FIG. 5(g) is a cross sectional view of a conventional display element of IPS mode.
FIG. 5(h) is a cross sectional view of the conventional display element of IPS mode.
Figure 5:
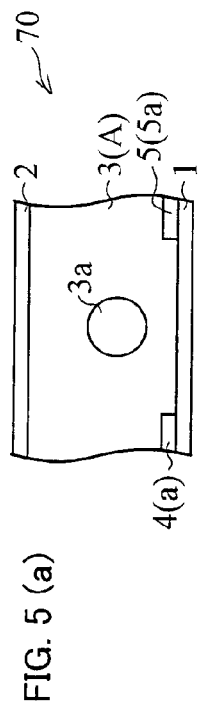
Figure 5:
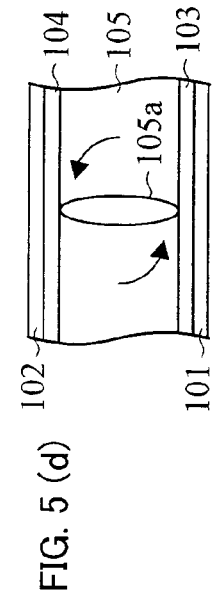
Figure 5:
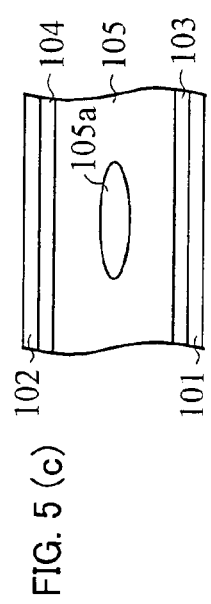
Figure 5:
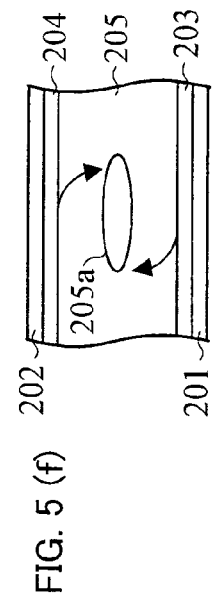
Figure 5:
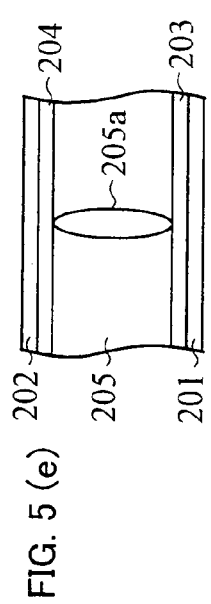
Figure 5:
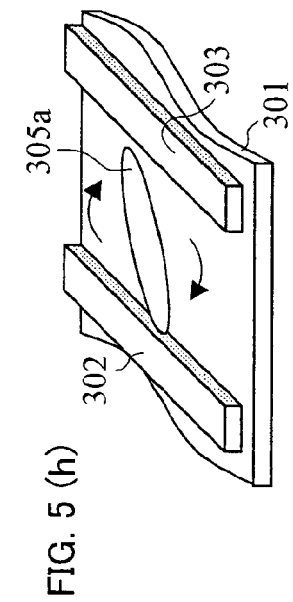
Figure 5:
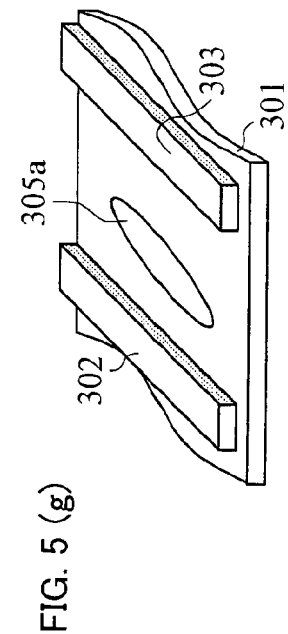

FIG. 3(a) is a cross sectional view schematically illustrating the medium of the display element 70 when no electric field is applied thereon (OFF state), whereas FIG. 3(b) is a cross sectional view schematically illustrating the medium of the display element 70 when the electric field is applied thereon (ON state). FIG. 4 is a graph illustrating relationship between the transmissivity of the display element 70 and the electric field (voltage) applied thereon. FIGS. 5(a) to 5(h) are cross sectional views explaining difference between the display element (display element 70) of the present embodiment and conventional liquid crystal display elements in terms of display principle, by schematically illustrating an average shape and a major axial direction of refractive index ellipsoid in the medium (note that the shape of the refractive index ellipsoid is indicated by a shape of cross section when no electric field is applied (OFF state) and when the electric field is applied (ON state). FIGS. 5(a) to 5(h) are respectively a cross sectional view of the display element (display element 70) of the present embodiment when no electric field is applied (OFF state), a cross sectional view of the display element (display element 70) when the electric field is applied (ON state), a cross sectional view of a conventional liquid crystal display element of TN (Twisted Nematic) mode when no electric field is applied, a cross sectional view of the liquid crystal display element of TN mode when the electric field is applied, a cross sectional view of a conventional liquid crystal display element of VA (Vertical Alignment) mode when no electric field is applied, a cross sectional view of the liquid crystal display element of VA mode when the electric field is applied, a cross sectional view of a conventional liquid crystal display element of IPS (In Plane Switching) mode when no electric field is applied, and a cross sectional view of the liquid crystal display element of IPS mode when the electric field is applied.

Refractive index in a material is generally not isotropic and differs directionally (that is, it is anisotropic). The anisotropy of the refractive index (one example of optical anisotropy) is indicated by an ellipsoid (refractive index ellipsoid) represented in an arbitrary orthogonal coordinate system ($X_1$, $X_2$, $X_3$) by the following Equation (1):

$$\sum_{ij}\left(\frac{1}{n_{ij}^2}\right)X_iX_j = 1 \qquad (1)$$

$$(n_{ji} = n_{ij}, i, j = 1, 2, 3)$$

where x is a direction parallel to the surfaces of the substrates (substrate in-plane direction) and along a direction in which the interleave electrodes 4 and 5 face each other, y is a direction parallel to the surfaces of the substrates (substrate in-plane direction) and perpendicular to the direction in which the interleave electrodes 4 and 5 face each other, and z is a direction perpendicular to the surface of the substrates (substrate normal direction). For example, see non-Patent publication 12 (Ryoichi YAMAMOTO and one other, "Organic Electro-optical Material", National Technical Report, December 1976, vol. 22, No. 6, p 826-834") Here, Equation (1) is rewritten by using coordinate system ($Y_1, Y_2, Y_3$) of the major axial direction of the ellipsoid, thereby giving Equation (2):

$$\frac{Y_1^2}{n_1^2} + \frac{Y_2^2}{n_2^2} + \frac{Y_3^3}{n_3^2} = 1 \qquad (2)$$

$n_1$, $n_2$, $n_3$ (hereinafter referred to as nx, ny, nz) are called principal refractive indexes and respectively correspond to half lengths of three axes of the ellipsoid. Here, let us exemplify a light wave traveling (propagating) from an original point in a direction perpendicular to a surface of $Y_3$=0. The light wave has polarization components in directions of $Y_1$ and $Y_2$. The respective polarization components has refractive indexes of nx and ny. In general, it is considered that a plane passing the original point and perpendicular to the traveling direction of the light wave is the cross section of the refractive index ellipsoid with respect to the light traveling in a certain direction. The major axial direction of the ellipsoid is the polarization component direction of the polarized light of the light wave. The half length of the major axis corresponds to the refractive index of that polarization component direction.

To begin with, the difference in terms of the display principle between the display element 70 of the present embodiment and the conventional liquid crystal display elements is discussed. The conventional liquid crystal display elements exemplified here are TN mode, VA mode, and IPS mode.

As illustrated in FIGS. 5(c) and 5(d), the conventional liquid crystal display element of the TN mode is arranged as follows: a liquid crystal layer 105 is sandwiched between a pair of substrates 101 and 102 that face each other. On the substrates 101 and 102, transparent electrodes (electrodes) 103 and 104 are respective provided. When no electric field is applied, major axial directions of liquid crystal molecules are in a helical orientation in the liquid crystal layer 105. When the electric field is applied, the major axial directions of the liquid crystal molecules are oriented along an electric field direction. In this case, when no electric field is applied an average refractive index ellipsoid 105a is oriented in such a manner that its major axial direction is parallel to the substrate surface (substrate in-plane direction), as illustrated in FIG. 5(c). When the electric field is applied, the major axial direction is oriented along the substrate normal direction, as illustrated in FIG. 5(d). That is, the refractive index ellipsoid 105a has an ellipsoidal shape regardless of whether the electric field is applied or not. However, the refractive index ellipsoid 105a changes its major axial direction (principal axial direction, direction in which the refractive index ellipsoid 105a is headed) depending on whether the electric field is applied or not. That is, the refractive index ellipsoid 105a is rotated depending on whether the electric field is applied or not. It should be noted that the shape and size of the refractive index ellipsoid 105a is not changed substantially regardless of whether or the electric field is applied.

As illustrated in FIGS. 5(e) and 5(f), the conventional liquid crystal display element of VA mode is arranged as follows: a liquid crystal layer 205 is sandwiched between a pair of substrates 201 and 202 that face each other. On the substrates 201 and 202, transparent electrodes (electrodes) 203 and 204 are sandwiched respectively. When no electric field is applied, major axial directions of liquid crystal molecules are oriented substantially perpendicular to a substrate surface. When a electric field is applied, the major axial directions of the liquid crystals directions are oriented along a direction perpendicular to an electric field. In this case, when no electric field is applied an average refractive index ellipsoid 205a is oriented in such a manner that its major axial direction is along a substrate normal direction, as illustrated in FIG. 5(e). When the electric field is applied, the refractive index ellipsoid 205a is oriented in such a manner that its major axial direction is parallel to the substrate surface (substrate in-plane direction). That is, again in the case of the liquid crystal display element of VA mode as in the liquid crystal display element of TN mode, the refractive index ellipsoid 205a has an ellipsoidal shape regardless of whether the electric field is applied or not, whereas the refractive index ellipsoid 205a changes its major axial direction (the refractive index ellipsoid 205a is rotated) depending on whether the electric field is applied or not. It should be noted that the shape and the size of the refractive index ellipsoid 205a is not changed substantially regardless of whether the electric field is applied or not.

Moreover, as illustrated in FIGS. 5(g) and 5(h), the conventional liquid crystal display element of IPS mode is arranged as follows: On a substrate 301, a pair of electrodes 302 and 303 are provided in such a manner that they face each other. A liquid crystal layer is sandwiched between the substrate 301 and a substrate that is not illustrated here. A electric field (voltage) is applied across the liquid crystal layer by using the electrodes 302 and 303, thereby changing orientational directions of liquid crystal molecules (major axial direction of a refractive index ellipsoid 305a) in the liquid crystal layer. In this way, display state is changed over between when no electric field is applied and when the electric field is applied. That is, again in the case of the liquid crystal display element of IPS mode as in the liquid crystal display elements of TN mode and VA mode, the refractive index ellipsoid 305a does not substantially change its shape and size depending on whether the electric field is applied (as illustrated in FIG. 5(g)) or not (as illustrated in FIG. 5(h)) (that is, the refractive index ellipsoid 305a has the ellipsoidal shape regardless of whether the electric field is applied or not), whereas the refractive index ellipsoid 305a changes its major axial direction (the refractive index ellipsoid 305a is rotated) depending on whether the electric field is applied or not.

As described above, the conventional liquid crystal display elements are arranged such that the liquid crystal molecules are oriented along certain directions (one certain direction typically) even when no electric field is applied, and that display operation (modulation in transmissivity) is carried out by changing the orientational directions of the molecules together by applying the electric field (voltage). That is, in the conventional liquid crystal display element, display operation is carried out by utilizing rotation (change) of only the major axial direction (principal axial direction) of the refractive index ellipsoid, while the shape and size of the refractive index ellipsoid is not changed substantially (that is, the refractive index ellipsoid is kept ellipsoidal). Therefore, it is not limited in the conventional liquid crystal display elements that the major axial direction of the refractive index ellipsoid is perpendicular or parallel to the electric field application direction. In other words, the conventional liquid crystal display element is so arranged that a magnitude of the orientational order of the liquid crystal molecules is constant, and that the display operation (modulation in transmissivity) is carried out by changing the orientational direction. That is, the conventional liquid crystal display elements are such that the application of the electric field changes the axial direction in which the molecules tend to be oriented, while the orientational order parameter is kept constant.

On the other hand, as illustrated in FIGS. 5(a) and 5(b) the display element 70 of the present embodiment is arranged as follows: a refractive index ellipsoid 3a has a spherical shape when no electric field is applied, that is, the refractive index ellipsoid 3a is optically isotropic (nx=ny=nz; orientational order parameter in the scale not smaller than the wavelength of the visible light≈0 (substantially 0)), whereas the refractive index ellipsoid 3a becomes optically anisotropic (nx>ny; orientational order parameter>0 in the scale not smaller than the wavelength of the visible light) when the electric field is applied. When the optical anisotropy appears, the refractive index ellipsoid 3a has a ellipsoidal shape (causing the optical anisotropy). Moreover the major axial direction of the refractive index ellipsoid 3a becomes perpendicular to the electric field application direction. That is, when the dielectric anisotropy of the dielectric material is negative (negative type liquid crystal), the major axial direction of the refractive index ellipsoid 3a is perpendicular to the electric field direction (perpendicular state) regardless of how much electric field is applied. When the dielectric anisotropy of the dielectric material is positive (positive type liquid crystal), the major axial direction of the refractive index ellipsoid 3a is parallel to the electric field direction (parallel state) regardless of how much electric field is applied. In the present embodiment, the electric field application direction and at least one of the major axial directions of the refractive index ellipsoid 3a are parallel or perpendicular to each other always. Note that, in the present embodiment, the orientational order parameter≈0 in the scale not less than the wavelength of visible light indicates that the orientational order parameter is such a state: when the orientational order parameter≈0 in the scale not less than the wavelength of visible light, a majority of the liquid crystal molecules or the like are oriented in a certain direction (there is an orientational order) when observed in a scale smaller than the wavelength of the visible light, whereas, in the scale larger than the wavelength of the visible light, the orientational directions of the molecules are averaged (that is, random) and there is no orientational order. Therefore, when the orientational order parameter≈0 in the scale not less than the wavelength of visible light, the orientational order parameter is so small that it causes no effect on the light in the wavelength range of visible light and the light larger than the wavelength of visible light. For example, when the orientational order parameter≈0 in the scale equal to or greater than the wavelength of the visible light, the black display is realized under crossed nicols. Furthermore, in the present embodiment, "the orientational order parameter>0 in the scale equal to or greater than the wavelength of the visible light" indicates that the orientational order parameter in the scale equal to or greater than the wavelength of the visible light is greater than the orientational order parameter of substantially 0. For example, when the orientational order parameter>0 in the scale equal to or greater than the wavelength of the visible light, the white display (and/or gray display, which is a gradation display) is realized under crossed nicols.

That is, the display element 70 according to the present embodiment is such that the molecules 8 are directed randomly in any directions when no electric field is applied. However, the molecules 8 are oriented in an order (orderly structure, orientational order) smaller than the wavelength of the visible light (the orientational order parameter in the scale not smaller than the wavelength of the visible light≈0) and thus no optical anisotropy is caused. Therefore, the shape of the refractive index ellipsoid 3a is spherical as illustrated 5(a). When the electric field is applied, the orientational state of the respective molecules 8 is changed because the respective molecules 8 are directed along the in-plane direction of the substrates because the molecules 8 have the negative dielectric anisotropy. Moreover, when the orientation state is changed, the optical anisotropy is caused (the orientational order parameter in the scale not smaller than the wavelength of the visible light>0) as a result of distortion occurred in the orderly structure smaller than the wavelength of the visible light. As described above, the display element 70 according to the present embodiment is arranged such that, when no electric field is applied, the refractive index ellipsoid 3a has such a shape (nx=ny=nz) that causes the optical isotropy, and when the electric field is applied, the refractive index ellipsoid 3a has such a shape (nx>ny in the vicinity of the surface of the lower substrate (in FIG. 5(b), the substrate 1 located lower); and ny>nx in the vicinity of the surface of the upper substrate (in FIG. 5(b), the substrate 2 located upper)) that causes the optical anisotropy, for example, as illustrated in FIG. 5(b). That is, the display element 70 according to the present embodiment is arranged such that the shape and the size of the refractive index ellipsoid 3a is changeable by and according to the electric field applied thereon. Note that nx, ny, and nz are the principal refractive index of the direction parallel to the substrate surface (substrate in-plane direction) and along the direction in which the interleave electrodes 4 and 5 face each other, the refractive index of the direction parallel to the substrate surface (substrate in-plane direction) and perpendicular to the direction in which the interleave electrodes 4 and 5 face each other, and the principal index of the direction perpendicular to the substrate surface (substrate normal direction).

Figure 24:
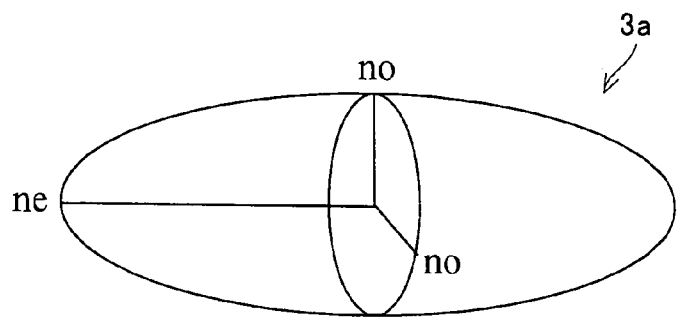
FIG. 24 is a schematic view illustrating a shape of a refractive index ellipsoid of a molecule in the display element illustrated in FIG. 1 when an electric field is applied.

Moreover, FIG. 24 is a schematic view illustrating the shape of the refractive index ellipsoid 3a of one molecule (molecule 8) in the medium A when the electric field is applied, in the display element 70 illustrated in FIG. 1. As illustrated in FIG. 24, the shape of the refractive index ellipsoid 3a is indicated as a cross section of the refractive index ellipsoid (ellipsoid) taken along a plane passing through an original point and perpendicular to a propagation (traveling) direction of light wave. As described above, the major axial direction of the ellipsoid is a component direction of the polarized light of the light wave, and a half of the length of the major axis corresponds to a refractive index along that direction.

The medium A according to the present embodiment is optically isotropic (in isotropic phase) when no electric field is applied, and becomes optically anisotropic when the electric field is applied thereon.

Where ne is the refractive index along the major axial direction of the ellipsoid (that is, the component direction of the polarized light of the light wave) due to the occurrence of the optical anisotropy when the electric field is applied, that is, the refractive index (extraordinary light refractive index) along the major axial direction of the molecule 8, and no is the refractive index along the direction perpendicular to the major axial direction of the ellipsoid, that is, the refractive index (ordinary light refractive index) along the minor axial direction of the molecule 8, the refractive index anisotropy (Δn) (change in birefringence) is expressed as follows:

$$\Delta n = ne - no.$$

That is, in the present embodiment, the refractive index anisotropy (Δn) indicates the change in the birefringence expressed as Δn=ne−no (ne: extraordinary light refractive index, no: ordinary light refractive index). ne and no are changed in the present embodiment, but not in the conventional liquid crystal display element/device.

The major axial direction of the refractive index ellipsoid 3a is parallel to the electric field application direction when the electric field is applied (in case of the medium having the positive dielectric anisotropy), or the major axial direction of the refractive index ellipsoid 3a is perpendicular to the electric field application direction when the electric field is applied (in case of the medium having the negative dielectric anisotropy).

On the other hand, in the conventional liquid crystal display element, the display operation is carried out by utilizing the rotation of the major axial direction of the refractive index ellipsoid by the electric field application. Thus, in the conventional liquid crystal display element the major axial direction of the refractive index ellipsoid is not always parallel or perpendicular to the electric field application direction.

As described above, the display element 70 according to the present embodiment carries out its display operation by modulating/changing, for example, the orientational order parameter in the scale not smaller than the wavelength of the visible light. In the display operation of the display element according to the present embodiment, the optical anisotropy is kept constant (the direction of electric field (voltage) application is not changed). That is, in the display element 70 according to the present embodiment, the display operation is carried out by changing the magnitude of the optical anisotropy (for example, orientational order in the scale not smaller than the wavelength of visible light) of the medium A per se. Therefore, the display element according to the present embodiment is significantly different from the conventional liquid crystal display element in terms of the display principle.

The medium A sealed between the substrates 1 and 2 may be any medium provided that the magnitude of the optical anisotropy thereof is changeable by and according to the electric field applied thereon. For example, the medium A may be such a medium that is substantially optically isotropic (the orientational order parameter in the scale not smaller than the wavelength of the visible light≈0) when the electric field is applied or when no electric field is applied, and in which optical modulation is induced by the electric field application (that is, the medium becomes optically anisotropic or isotropic by the electric field application). Moreover, the medium A may be such a material (medium) in which the orientational order parameter in the scale not smaller than the wavelength of the visible light is increased among the molecules 8 or molecular agglomerations (clusters) by and according to the application of the electric field (it is further increased from a value of the orientational order parameter in a state where the optical modulation is already induced (the orientational order parameter in the scale not smaller than the wavelength of the visible light>0)). Moreover, the medium A may be a medium in which the orientational order parameter in the scale not smaller than the wavelength of the visible light (magnitude of the optical anisotropy) is decreased among the molecules 8 or the molecular agglomerations by and according to the application of electric field, compared with the orientational order parameter before the application of the electric field. For example, the medium A may be a medium which is changed from an optical anisotropic state (where the orientational order parameter in the scale not smaller than the wavelength of the visible light>0) to an optical isotropic state (where the orientational order parameter in the scale not smaller than the wavelength of the visible light≈0).

In the present embodiment, to change the magnitude of the optical anisotropy of the medium A by and according to electric field applied on the medium A, as described above, is to change the refractive index ellipsoid 3a by and according to the electric field applied on the medium A. In the aforementioned arrangement in which the medium A is optically isotropic when no electric field is applied and the magnitude of its optical anisotropy is changeable by and according to the electric field applied thereon, that is, in the arrangement in which the optical anisotropy of the medium A is generated when the electric field is applied, the shape of the refractive index ellipsoid 3a is changed from the spherical shape to the ellipsoidal shape by and according to the electric field applied thereon. On the other hand, in the arrangement in which the medium A is optically isotropic when no electric field is applied thereon, but becomes optically isotropic when the electric field is applied, the shape of the refractive index ellipsoid 3a is changed from the ellipsoidal shape to the spherical shape by and according to the electric field applied thereon. Moreover, in the arrangement in which the medium A is optical anisotropic when no electric field is applied and the magnitude of its optical anisotropy becomes higher or lower by and according to the electric field application, compared with the magnitude of its optical anisotropy attained when no electric field is applied, a major axial length or a minor axial length of the refractive index ellipsoid is changed (extended or shortened) whereby a ratio between the major axial length and the minor axial length of the refractive index ellipsoid is changed between before and after the electric field application (as a result, or example, curvature is changed). For example, in case where the magnitude of the optical anisotropy becomes higher when the electric field is applied, the electric field application causes the ellipsoid to have a larger ratio of its major axial length over its minor axial direction compared with the ratio attained when no electric field is applied. In case where the magnitude of the optical anisotropy becomes lower when the electric field is applied, the electric field application causes the ellipsoid to have a smaller ratio of its major axial length over its minor axial direction compared with the ratio attained when no electric field is applied (that is, the ratio gets closer to 1; the ratio in this case may be such a ratio with which the ellipsoid becomes substantially spherical).

In the display element 70 according to the present embodiment, the medium A sealed between the substrates 1 and 2 is in the isotropic phase and optically isotropic when no electric field is applied across the interleave electrodes 4 and 5, as illustrated in FIG. 3(a). Therefore, when no electric field is applied, the display element according to the present embodiment is in a black display state.

On the other hand, as illustrated in FIG. 3(b), when the electric field is applied across the interleave electrodes 4 and 5, each molecule 8 of the medium A is oriented such that the major axial direction is along the electric field formed on the interleave electrodes 4 and 5. As a result, birefringence phenomenon occurs. By using this birefringence phenomenon, it is possible to modulate the transmissivity of the display element 70 in accordance with the voltage applied across the interleave electrodes 4 and 5 as illustrated in FIG. 4.

At temperatures sufficiently far from the phase transition temperature (transition point), a large voltage is necessary to modulate the transmissivity of the display element 70. However, at the temperatures right above the transition point, it is possible to modulate the transmissivity sufficiently by applying a voltage approximately in a range of from 0V to 100V.

For example, according to non-Patent Publication 9 ("D. Demus et al., "Handbook of Liquid Crystals Low Molecular Weight Liquid Crystal", Wiley-VCH, 1998, vol. 1, p. 484-485") and non-Patent Publication 12, a change in birefringence ($\Delta n = n// - n\perp$) and the external electric field (an electric field E (V/m)) are related as $\Delta n = \lambda \cdot B_k \cdot E^2$ where n// is a refractive index along the electric field direction and $n\perp$ is a refractive index along the direction perpendicular the electric field direction. Note that $\lambda$ (m) is a wavelength of incident light in vacuum, $B_k$ is the Kerr constant ($m/V^2$), E is strength of the applied electric field (electric field strength)(V/m).

It is known that, as temperature (T) increases, the Kerr constant $B_k$ decreases as a function proportional to $1/(T-Tni)$. Even though driving can be performed with a weak electric field near the transition point (Tni), the electric field strength necessary to performing the driving abruptly increases as the temperature (T) increases. Therefore, at the temperatures sufficiently far from the transition point (that is, at the temperatures well above the transition point), larger voltage is necessary to modulate the transmissivity, whereas the transmissivity can be modulated sufficiently with a voltage of about 100V or less at the temperatures right above the transition point.

As illustrated in FIG. 1, the display element 70 according to the present embodiment, at least two electrode pairs 10 respectively including the interleave electrodes 4 and 5 are provided in each pixel 71. The at least two electrode pairs 10 constitute an electrode pair group. In other words, each pixel 71 is provided with one electrode pair group. The electrode pairs 10 are so arranged that the tooth portions of each electrode pair 10 are not parallel with the tooth portions of the adjacent electrode pair 10 in the same pixel 71, so as to apply electric fields in different directions on respective difference portions of the medium A in the same pixel 71. More specifically, in the display element 70 according to the present embodiment, each electrode pair group is so arranged that the tooth portions 4a and 5a of one of the electrode pair 10 make the right angle with the tooth portions 4a and 5a of the adjacent electrode pair 10 in each pixel 71. In this way, the electrode pairs 10 are respectively arranged to apply electric fields perpendicular to each other. With this arrangement, the display element 70 according to the present embodiment has at least two domains $D_M$ and $D_M'$ (minutes regions) in each pixel 71. The domains $D_M$ and $D_M'$ have optical anisotropies when the electric fields is applied thereon. The optical anisotropies of the domains $D_M$ and $D_M'$ make the right angle (90 degrees) with each other.

The studies conducted by the inventors showed that it is possible to suppress color change in the display at angles of optical axis ±60° by the arrangement in which at least two domains $D_M$ and $D_M'$ where the medium A shows optical anisotropies of different directions respectively under an electric field are provided in each pixel 71. It should be noted that the angles of optical axis ±60° is far greater than the polar angles of 45°, which is regarded as "wide viewing angle" in general. Further, measurement with respect to the polar angles of 60° is quite reliable. The color change is suppressed by this arrangement because the coloring phenomenon occurred in the respective domains $D_M$ and $D_M'$ when viewed from oblique direction cancel out each other. As a result of the suppression of color change, it is possible to improve the viewing angle property largely without deteriorating the transmissivity.

Moreover, as illustrated in FIG. 1, the polarizers 6 and 7 respectively provided to the substrates 1 and 2 are so arranged that their absorption axes 6*a* and 7*a*, that is, their absorption axial directions cross each other orthogonally (perpendicularly). Moreover, the polarizers 6 and 7 are arranged that the absorption axes 6*a* and 7*a* of the respective polarizers 6 and 7 make 45 degrees with the direction along which the tooth portions 4*a* and 5*a* of the interleave electrodes 4 and 5 are extended. Therefore, the absorption axes 6*a* and 7*a* of the polarizers 6 and 7 make 45 degrees with the direction (electric field application direction) along which the electric field is applied by the interleave electrodes 4 and 5.

The medium layer 3 becomes optically anisotropic as a result of an increase in the magnitude of orientational order along the electric field application direction. In this way, the display element can functions as a shuttering type display element in which the transmissivity is changed. Therefore, maximum transmissivity is attained when the optical anisotropic direction makes 45 degrees with the absorption axial directions that orthogonally cross each other.

Figure 6:
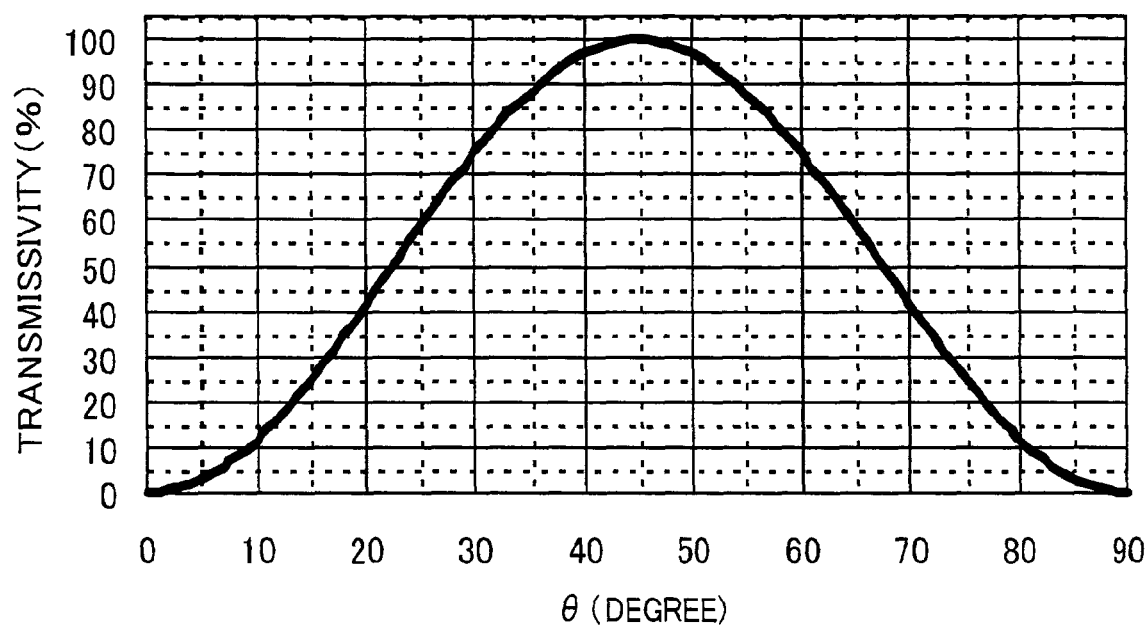
FIG. 6 is a graph illustrating transmissivity where directions along which optical anisotropy occur in the respective domains in the display element illustrated in FIG. 1 make angles of ±θ with respect to one of the axial directions of the polarizers.

FIG. 6 depicts the transmissivity where the optical anisotropies of the two domains $D_M$ and $D_M'$ occur respectively at ±θ degrees with respect to the absorption axis 6*a* of the polarizer 6, which is one of the polarizers 6 and 7.

FIG. 6 shows that the transmissivity (P) can be estimated by using an equation $P(\%)=\sin^2(2\theta)$ and that maximum brightness (luminance) is obtained at 45 degrees. Where it is put that the transmissivity at 45 degrees is 100%, the brightness appears as 100% to human eyes when the transmissivity is about 90% or higher (for the human eyes, brightness of about 90% transmissivity or higher seems to be equivalent to the maximum brightness). Therefore, if 35 degrees<θ<55 degrees, substantially maximum brightness for the human eyes is attained or the human eyes sense that the maximum brightness is attained.

Therefore, for forming the two domains that compensate for (cancel out) the coloring phenomenon occurring at diagonal viewing angles with respect to each other, it is preferable that the domains be formed such that the directions of the optical anisotropies occurred (generated) in the domains $D_M$ and $D_M'$ make ±45 degrees with respect to the absorption axial direction and domain directions of the domains make the right angle with respect to each other.

However, as described above, the difference in terms of brightness is not noticeable if, with respect to the absorption axis, θ is such that 35 degrees≦θ≦55 degrees especially 35 degrees<θ<55 degrees. Therefore, the difference in color would not be noticeable as long as if the difference in the brightness of the domain regions is not greater than about 10% in carrying out the compensation for the coloring phenomenon. Thus, as long as θ is within the aforementioned range, sufficient effect can be attained practically. In other words, FIG. 6 shows that it is preferable that the optical anisotropies of the respective domains make angles of 90 degrees±20 degrees (that is, not less than 70 degrees but not more than 110 degrees), and it is more preferable that the optical anisotropies of the respective domains make angles of 90 degrees±less than 20 degrees (that is, more than 70 degrees but less than 110 degrees). Further, it is further preferable that the optical anisotropies of the respective domains make angles of 90 degrees±less than 10 degrees (that is, more than 80 degrees but less than 100 degrees). The most desirable angle is the right angle (90 degrees).

Taking the errors in the human eyes in consideration, it is preferable to arrange such that the directions of the optical anisotropies generated in the respective domains $D_M$ and $D_M'$ when the electric field is applied thereon make about 45 degrees (angles of 45 degrees±10 degrees, preferably angles of 45 degrees±less than 10 degrees, more preferably angles of 45 degrees±less than 5 degrees, most preferably the angle of 45 degrees) with respect to the absorption axes 6*a* and 6*b* of the polarizers 6 and 7, and that the directions of the optical anisotropies generated by the electric field applied on the respective domains $D_M$ and $D_M'$ make, with each other, about 90 degrees (angles of 90 degrees±less than 20 degrees, preferably angles of 90 degrees±10 degrees, and most preferably the angle of 90 degrees).

Especially, if the absorption axes 6*a* and 6*b* of the polarizers 6 and 7 make 45 degrees±less than 10 degrees with each other, and/or if the directions of the optical anisotropies occurred in the respective domains $D_M$ and $D_M'$ when the electric field is applied make 90 degrees±less than 20 degrees with each other, the human eyes sense that the maximum brightness is attained. Moreover, if the absorption axes 6*a* and 6*b* of the polarizers 6 and 7 make 45 degrees±less than 5 degrees with each other, and/or if the directions of the optical anisotropies occurred in the respective domains $D_M$ and $D_M'$ when the electric field is applied make 90 degrees±less than 10 degrees with each other, it can be understood from, for example, the results illustrated in FIG. 6 that 97% brightness is attained by measurement. Further, if the absorption axes 6*a* and 6*b* of the polarizers 6 and 7 make 45 degrees with each other, that is, if the directions of the optical anisotropies occurred in the respective domains $D_M$ and $D_M'$ when the electric field is applied make 90 degrees with each other, it can be understood from, for example, the results illustrated in FIG. 6 that 100% brightness is attained by measurement.

Therefore, as illustrated in FIG. 1, a display element 70 was prepared such that the absorption axes of the polarizers 6 and 7 made 45 degrees with respect to the electric field application direction, and that the tooth portions 4*a* and 5*a* of each electrode pair 10 made the right angle with the tooth portions 4*a* and 5*a* of the adjacent electrode pair 10 in each pixel 71. In order to observe whether the coloring phenomenon occurs or not, this display element was observed from angles of 60 degrees when electric field was applied. In this observation, white was used as a standard color. For all viewing angles (viewing angles A', B', C', D', A, B, C, D) no coloring phenomenon was observed. Note that the viewing angles A', B', C', and D' are absorption axial directions, the viewing angles A and C are the electric field application directions, and the viewing angles B and D are directions perpendicular to the electric field application directions. Note that, in the display element 70 illustrated in FIG. 1, the electric field application directions associated with the viewing angles A and C were represented by the electric field application directions in the domain $D_M{'}$. Therefore, for domain $D_M$, the electric field application directions were associated with the viewing angles B and D, whereas the direction perpendicular to the electric field application directions were associated with the viewing angles A and C. However, this made no difference in the observation results.

Figure 10:
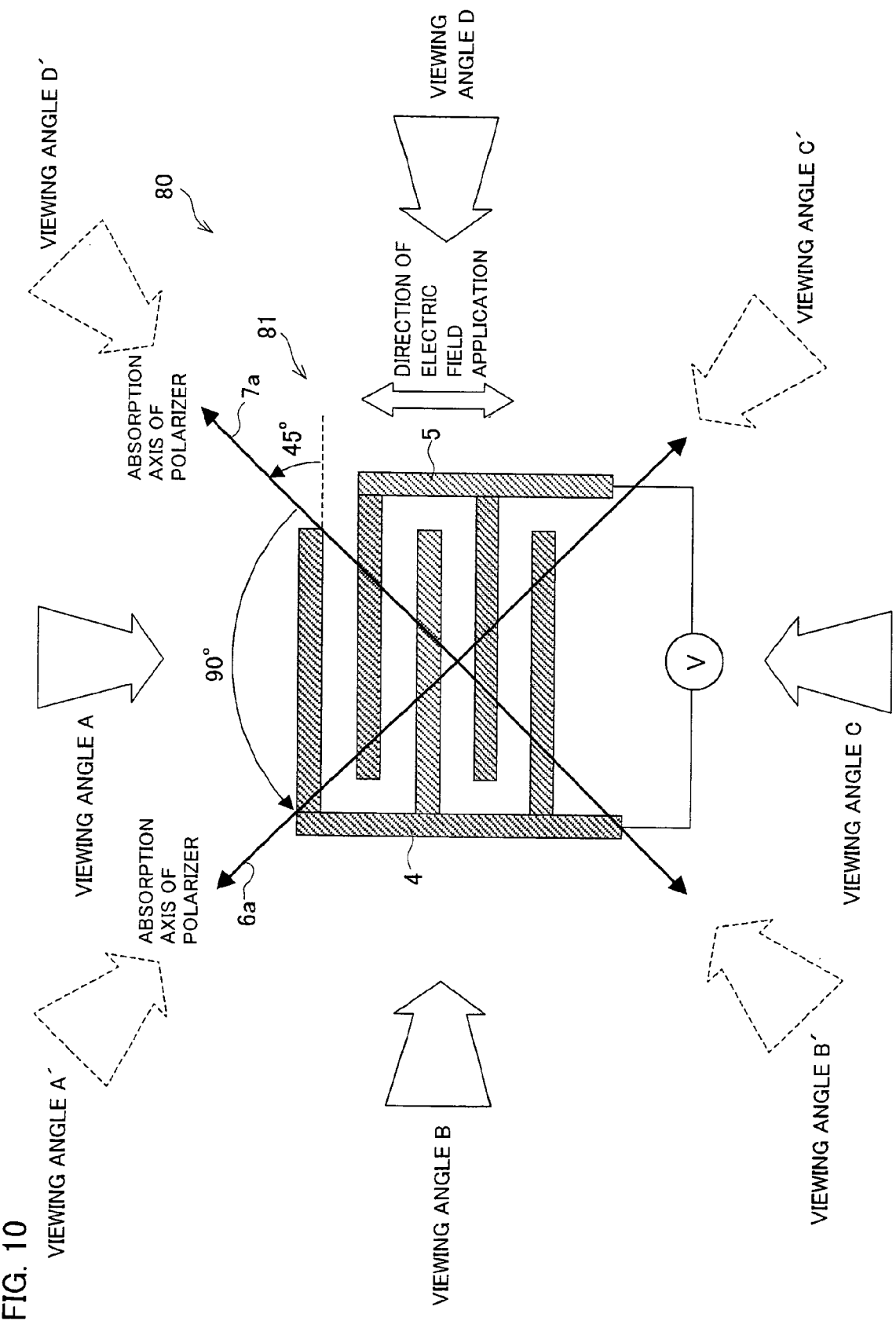
FIG. 10 is a view for explaining relationship between electric field application directions in respective domains in a display element used in Comparison Example.

Meanwhile, for making comparison, a comparative display element 80 as illustrated in FIG. 10 was prepared. This display element 80 of a Comparison Example was so arranged that tooth portions 4a and 5a of interleave electrodes 4 and 5 were parallel to each other in each pixel 81. That is, each pixel had one domain in this display element. The comparative display element 80 was observed in the aforementioned manner (observation of coloring phenomenon). Almost no coloring was observed at the viewing angles A', B', C', and D'. However, display quality deterioration was noted: bluish coloring was observed at the viewing angles A and C and the yellowing coloring was observed at the viewing angles B and D. Causes for this display quality deterioration has not found yet, but it is a hypothesis that optical anisotropy occurred in a medium A by the application of the electric field had wavelength scattering in the arrangement in which no domain segmentation is done unlike the aforementioned arrangement, and this wavelength scattering caused the display quality deterioration. Note that, again in the present comparison example, the viewing angles A', B', C', and D' are absorption axial directions, the viewing angles A and C are the electric field application directions, and the viewing angles B and D are directions perpendicular to the electric field application directions.

Figure 18:
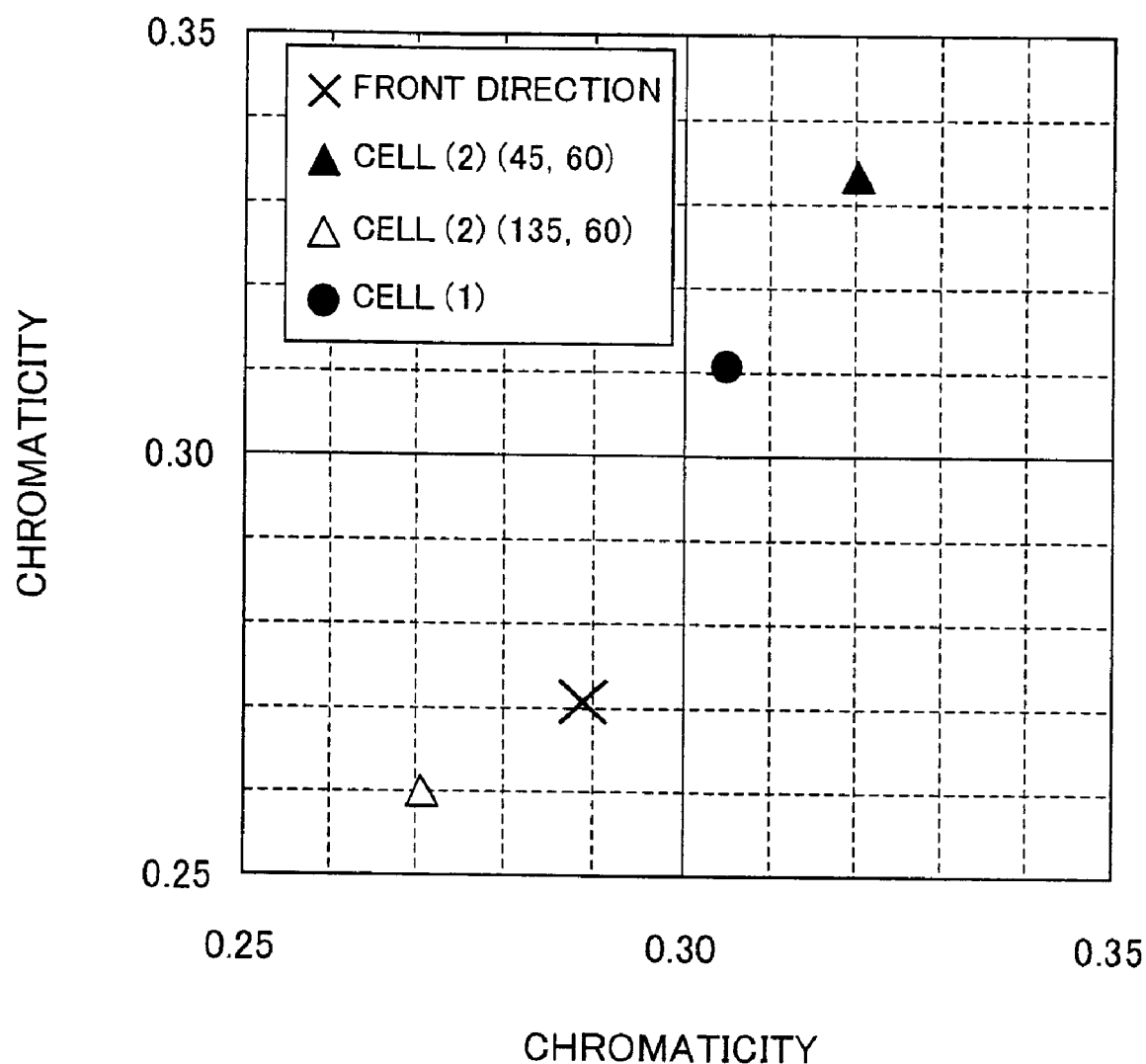
FIG. 18 is a graph illustrating results of measurement of chromaticity for diagonal viewing angles in an arrangement in which one pixel has two domains in which optical anisotropies having different directions occur by electric field application, and in an arrangement in which no domain segmentation is done.

FIG. 18 illustrates the results of chromaticity measurement for oblique viewing angles for (a) the display element 70 according to the present embodiment in which the domain segmentation is done as illustrated in FIG. 1 (that is, at least two domains $D_M$ and $D_M{'}$ in which the medium A shows optical anisotropies of different directions when the electric field is applied thereon are provided in each pixel, and for (b) the comparative display element 80 in which no domain segmentation is done as illustrated in FIG. 10.

FIG. 18 is a graph (xy chromaticity diagram) presenting chromaticity data of the display element 70 illustrated in FIG. 1, and the comparative display element 80 illustrated in FIG. 10. The horizontal axis (chromaticity coordinate) indicates chromaticity along the x axis direction, and the vertical axis indicates chromaticity along the y axis direction. Note that the chromaticity along the x axis direction in the display element 70 illustrated in FIG. 1 is chromaticity (chromaticity coordinate) along the aforementioned x direction, that is, the direction parallel to the surfaces of the substrates (in-plane direction of the substrate) and along the direction in which the tooth portions 4a and 5a of the interleave electrodes 4 and 5 face with each other, for example, in the domain $D_M$. The chromaticity along the x axis direction in the display element 80 illustrated in FIG. 10 is chromaticity (chromaticity coordinate) along a direction parallel to surfaces of the substrates (in-plane direction of the substrate) and along a direction in which the tooth portions 4a and 5a of the interleave electrodes 4 and 5 face with each other, in one pixel 81 of the display element 80. Moreover, the chromaticity along the y axis direction of the display element 70 illustrated in FIG. 1 is (chromaticity coordinate) along the aforementioned y direction, that is, the direction parallel to the surfaces of the substrates (in-plane direction of the substrate) and perpendicular to the direction in which the tooth portions 4a and 5a of the interleave electrodes 4 and 5 face with each other, for example, in the domain $D_M$. The chromaticity along the y axis direction in the display element 80 illustrated in FIG. 10 is chromaticity (chromaticity coordinate) along the direction parallel to surfaces of the substrates (in-plane direction of the substrate) and perpendicular the direction in which the tooth portions 4a and 5a of the interleave electrodes 4 and 5 face with each other, in one pixel 81 of the display element 80.

In the measurement of the chromaticity data, cells (1) and (2) were prepared respectively as the display elements 70 and 80. The cells (1) and (2) were so arranged that, for example as illustrated in FIGS. 2(a) and 2(b), a medium A made of the following mixture (I) was sandwiched as a medium layer 3 between the pair of substrates 1 and 2 made of glass and facing each other. Further, the cells (1) and (2) were provided with polarizers 6 and 7 respectively on outer sides of the respective substrates 1 and 2, and with interleave electrodes 4 and 5 on that surface (facing surface) of the substrates 1 which faced the substrate 2. The interleave electrodes 4 and 5 had tooth portions 4a and 5a respectively and arranged to face each other so that the tooth portions 4a and 5a interleave with each other.

The medium layer 3 was prepared by radiating ultraviolet rays, without electric field application, on the mixture (I) at temperatures controlled to be in a range in which the mixture showed a cholesteric blue phase always. The mixture (i) contained 44.7 mol % of "JC-1041xx" (product Name; made by Chisso Corporation" (which is a nematic liquid crystal mixture), 43.4 mol % of "5CB" (4-ciano-4'-pentylbiphenyl) which is a nematic liquid crystal), and 4.9 mol % of "ZLI-4572" (product name: a chiral dopant made by Merck Ltd.) (which is a chiral agent), 4.0 mol % of "EHA (2-ethylhexylacrylate; a monoacrylate made by Aldrich) (which is a photopolymerizable monomer for forming an orientation auxiliary agent via polymerization), 2.6 mol % of "RM257" (Product Name; diacrylate monomer made by Merck Ltd.), and 0.33 mol % of "DMPAP" (2,2-dimethoxy-2-pentylacetophenone, made by Aldrich).

Confirmation on whether or not the cholesteric blue phase occurred was carried out by polarization microscopic observation to see whether or not there was a particular texture of the cholesteric blue phase in the mixture (I) kept at temperatures within a temperature range of 260.0K to 326.4K by a temperature adjuster "FP90" (Product Name) made by Mettler-Toledo K. K.

The preparation of the cells (1) and (2) was carried out as follows: On the surface of the substrate 1, the interleave electrodes 4 and 5 having the patterns illustrated in FIG. 1 or 10 were formed with an electrode width of 9 μm and an electrode-electrode space of 10 μm. Then, the substrate 1 on which the interleave electrodes 4 and 5 were formed, and the substrate 2 were combined together with a gap therebetween. The gap was adjusted to be 5 μm (thickness of the medium layer 3) by using a spacer (not illustrated) such as a plastic bead or the like. The substrates 1 and 2 were stuck (bonded) together by sealing their edge portions with a sealing agent (not illustrated). In sealing the edge portions, an inlet for injection of the mixture (I) was kept open. After that, the mixture (I) was injected between the substrates 1 and 2 via the inlet. Then the inlet was closed. On the outer sides of the substrates 1 and 2, the polarizers 6 and 7 were provided so that the absorption axes 6a and 7a of the respective polarizers 6 and 7 cross each other perpendicularly. Thereafter, without electric field application, the ultraviolet rays was radiated on the mixture (I) kept to be in the cholesteric blue phase always by controlling its temperature within the temperature range. In this way, the cells (1) and (2) were prepared.

Moreover, the measurement of the chromaticity was carried out by using an optical measuring device "EZContrast"

made by ELDIM. The measurement was carried out at 20° C. and with applied voltage of 84.3V.

In FIG. 18, "x" indicates chromaticity observed from a front direction. For the comparative cell (2), "▲" indicates chromaticity observed when the polar angle was 60° and an azimuth angle was 45° with respect to any one of the absorption axes 6a and 7a of the polarizers 6 and 7 (for example the absorption axis 7a) (hereinafter, the condition of the azimuth angle of 45° and the polar angle 60° is referred to as (45, 60)). "Δ" indicates chromaticity observed when observed when the polar angle was 60° and an azimuth angle was 135° (45°+90°) (hereinafter, this condition is referred to as (135, 60). Moreover, for the cell (1) according to the present embodiment, "●" indicates chromaticity observed when the polar angle was 60° and an azimuth angle was 45° and when the polar angle was 60° and an azimuth angle was 135° (that is, in the conditions (45, 60) and (135, 60)). Note that the same chromaticity was observed for the azimuth angles 45° and 135° in the cell (1) according to the present embodiment.

From the results illustrated in FIG. 18, it is shown that, with a polar angle of ±60°, the color change was observed in the display element 80 without domain segmentation in a range from "▲" to "Δ". On the other hand, with the polar angle of ±60°, the color change was observed in the cell (1) with the domain segmentation (two domains per pixel in the cell (1)) in a range from "x" to "●", the cell (1) was observed in the same manner as the cell (2). It was proved that, as illustrated in FIG. 18, when the polar angle was ±60°, the domain segmentation could substantially half the color change (the range in which the change in the chromaticity coordinates occurred, the chromaticity coordinates expressed as the distance between chromaticity coordinates: $\sqrt{\{\Delta x^2 + \Delta y^2\}}$) compared with the arrangement in which no domain segmentation was done.

Moreover, chromaticity (chromaticity coordinates) and brightness (Y value) of the cells (1) and (2) were measured for various angles between the domains $D_M$ and DM' in each pixel 71, and various angles between (a) the directions of the optical anisotropies occurred in the respective domain DM and DM' and (b) the absorption axes 6a and 7a of the polarizers 6a and 7a. FIGS. 19 to 22 illustrate the results of the measurements of the chromaticity (chromaticity coordinates) and brightness (Y value) of the cells (1) and (2), respectively: chromaticity and brightness of the cells (1) and (2) along the x axis direction and the y axis direction when viewed from the front directions; and chromaticity and brightness of the cells (1) and (2) where the polar angle was 60° and the azimuth direction was 45° or 135° with respect to one of the absorption axes of the polarizers (for example, the absorption axis 7a) as the standard. The Y value (relative Y value) is brightness relative to a brightness attained for respective directions when the medium layer 3 is empty (only air is contained between the substrates 1 and 2). It is put that Y value is 1 (Y=1) when the medium layer 3 is empty.

In FIGS. 19 to 22, the arrows d1 and d2 indicate the directions of the optical anisotropies generated in the respective domains $D_M$ and $D_M'$ by the application of the electric field. The arrow d1 indicate the direction of the optical anisotropy generated in one of the domains (hereinafter, referred to as "Domain 1" for the sake of easy explanation) in the cell (1) of the present embodiment by the application of the electric field, and the direction of the direction of the optical anisotropy generated in the comparative cell (2) by the application of the electric field. The arrow d2 indicates the direction of the optical anisotropy generated in the other one of the domains (hereinafter, referred to as "Domain 2" for the sake of easy explanation) in the cell (1) of the present invention by the application of the electric field. The ratio between the domain 1 and domain 2 is 1:1 unless otherwise specified.

In FIGS. 19 to 22, the directions of the optical anisotropies indicated by the arrows d1 and d2 are so arranged that they are symmetric centered at one of the absorption axes of the polarizers or make the same angle with each absorption axes of the polarizers 6a and 7a. That is, the directions of the optical anisotropies indicated by the arrows d1 and d2 are so arranged that the angles made between (a1) the direction of the optical anisotropy indicated by the arrow d1 and (a2) the directions (absorption axial directions) of the absorption axes of the two polarizers, are identical with the angles made between (a3) the direction of the optical anisotropy indicated by the arrow d2 and (a2) the directions (absorption axial directions) of the absorption axes of the two polarizers.

Moreover, the measurement of the Y values was carried out by using an optical measuring device "EZContrast" made by ELDIM. The measurement was carried out at 20° C. and with applied voltage of 84.3V.

Figure 19:
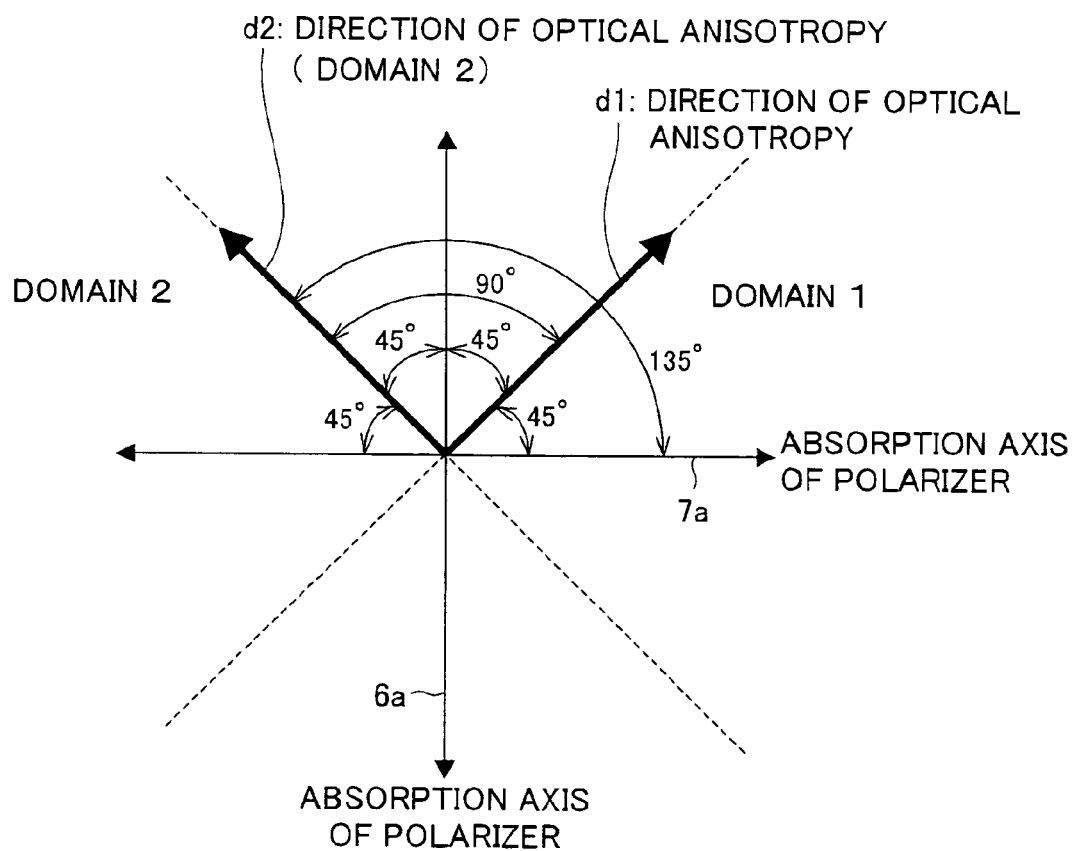
FIG. 19 is a view for explaining an angle between the directions of the optical anisotropies occurred, by the electric field application, in the respective domains of each cell used in the measurement of the chromaticity and Y value, and an angle between absorption axes of the polarizers and the directions of the optical anisotropies occurred in the respective domains.

In the measurement, as illustrated in FIG. 19, the cells (1) and (2) were arranged that: taking one of the absorption axes 6a and 7a as the standard (here, the absorption axis 7a), the angle made between the direction of the optical anisotropy indicated by the arrow d1 and the absorption axis (absorption axis 7a) as the standard (hereinafter, this angle is referred to as angle (1) for the sake of easy explanation) was 45 degrees; the angle made between the direction of the optical anisotropy indicated by the arrow d1 and the other absorption axis (absorption axis 6a) (hereinafter, this angle is referred to as angle (2) for the sake of easy explanation) was 45 degrees (angle (1)=45° and angle (2)=135°); and the angle made between the directions of the optical anisotropies generated in the respective domains DM and DM' ("domain 1" and "domain 2") by the application of the electric field (hereinafter, this angle is referred to as angle (3) for the sake of easy explanation) was 90 degrees. That is, the cell (1) was so arranged that, taking one of the absorption axes 6a and 7a as the standard (here, the absorption axis 7a), the angles between the standard absorption axis (absorption axis 7a) and the directions of the optical anisotropies indicated by the arrows d1 and d2 were respectively 45 degrees and 135 degrees (hereinafter, the angle between the standard absorption axis and the direction of the optical anisotropy indicated by the arrow d1, and the angle between the standard absorption axis and the direction of the optical anisotropy indicated by the arrow d2 are referred to as angle (4)).

Table 1 shows the chromaticity (chromaticity coordinates) along the x axis direction and the y axis direction of the cells (1) and (2) when viewed from the front direction, the chromaticity coordinates of the cells (1) and (2) where the polar angle was 60° and the azimuth direction were 45° and 135° with respect to one of the absorption axes of the polarizers (for example, the absorption axis 7a) as the standard (that is, the chromaticity coordinates (45, 60) and (135, 60)). Table 1 also shows Y values at the respective chromaticity coordinates.

TABLE 1

|  | Chromaticity along x axis | Chromaticity along y axis | Y Value |
| --- | --- | --- | --- |
| FRONT | 0.2889 | 0.2709 | 0.2865 |
| CELL (2) (45, 60) | 0.3201 | 0.3334 | 0.3159 |
| CELL (2) (135, 60) | 0.2707 | 0.2598 | 0.2057 |
| CELL (1) | 0.2976 | 0.2999 | 0.2608 |

Figure 20:
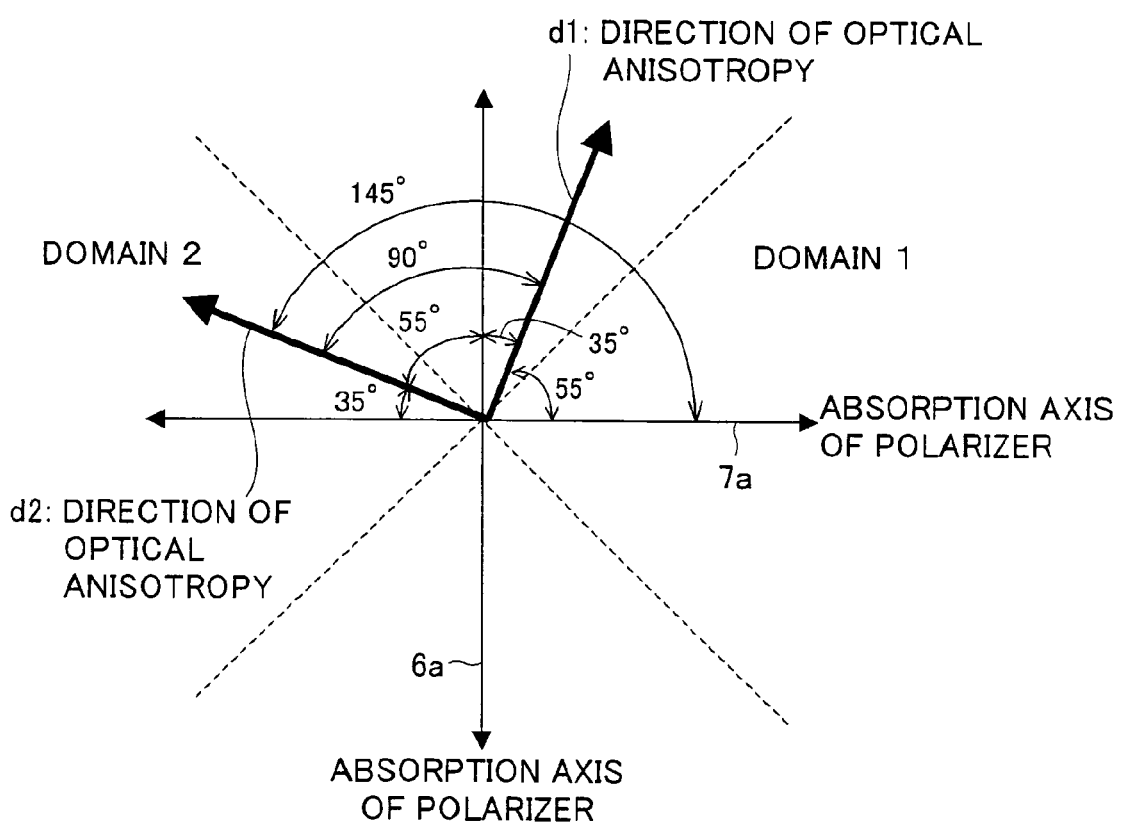
FIG. 20 is another view for explaining an angle between the directions of the optical anisotropies occurred, by the electric field application, in the respective domains of each cell used in the measurement of the chromaticity and Y value, and an angle between absorption axes of the polarizers and the directions of the optical anisotropies occurred in the respective domains.

Note that the above measurement obtained the same chromaticity for the azimuth angles of 45° and 135° in the cell (1) of the present invention. Therefore, in Table 1, the chromaticity coordinates for (45, 60) and (135, 60) for the cell (1) are illustrated in the same row. Moreover, in the measurement, the chromaticity coordinate distances were 0.0317 in the cell (1) of the present embodiment, and 0.0862 in the comparative cell (2). Moreover, Table 2 shows (a) the chromaticity (chromaticity coordinates) of the cells (1) and (2) along the x axis direction and the y axis direction when viewed from the front direction (b) the chromaticity where (45, 60) and (135, 60), and (c) the brightness at the respective chromaticity coordinates. In the measurement, it was arranged that the angle (1) was 55 degrees, the angle (2) was 35 degrees (that is, the angles between the directions (which are indicated by d1 and d2) of the optical anisotropy in the respective domains and the absorption axes of the polarizers were 35 degrees and 55 degrees respectively), and the angle (3) was 90 degrees, that is, the angle (1)=55 degrees and the angle (4)=145 degrees, as illustrated in FIG. 20. Table 2 also shows Y values at the respective chromaticity coordinates.

TABLE 2

|  | Chromaticity along x axis | Chromaticity along y axis | Y Value |
| --- | --- | --- | --- |
| FRONT | 0.2888 | 0.2708 | 0.2531 |
| CELL (2) (45, 60) | 0.3193 | 0.3325 | 0.2883 |
| CELL (2) (135, 60) | 0.2716 | 0.2607 | 0.1758 |
| CELL (1) | 0.2984 | 0.3011 | 0.2321 |

Note that the above measurement obtained the same chromaticity for the azimuth angles of 45° and 135° in the cell (1) of the present embodiment. Therefore, in Table 1, the chromaticity coordinates for (45, 60) and (135, 60) for the cell (1) are illustrated in the same row. Moreover, in the measurement, the chromaticity coordinate distances were 0.0318 in the cell (1) of the present embodiment, and 0.0862 in the comparative cell (2).

Further, the cells (1) and (2) were measured in the following arrangements in terms of chromaticity (chromaticity coordinates) when viewed from the front direction, chromaticity for (45, 60) and (135, 60), and Y values at the respective chromaticity coordinates: Arrangement illustrated in FIG. 21: angle (1) was 35 degrees, angle (2) was 55 degrees, (that is, the angles made between the directions (which are indicated by d1 and d2) of the optical anisotropy in the respective domains and the absorption axes of the respective polarizors were 35 degrees and 55 degrees respectively), and the angle (3) was 110 degrees, that is, the angle (1)=35 degrees, and the angle (4)=145 degrees; and Arrangement illustrated in FIG. 22: angle (1) was 35 degrees, angle (2) was 55 degrees, (that is, the angles made between the directions (which are indicated by d1 and d2) of the optical anisotropy in the respective domains and the absorption axes of the respective polarizors were 35 degrees and 55 degrees respectively), and the angle (3) was 70 degrees, that is, the angle (1)=55 degrees, and the angle (4)=125 degrees. In these arrangements, the same results as that illustrated in FIG. 19 were obtained. That is, in the arrangements illustrated in FIGS. 21 and 22, the chromaticity coordinate distances were 0.0318 in the cell (1) of the present embodiment, and 0.0862 in the comparative cell (2).

From the results of the measurements, it was proved that, according to the present embodiment, the domain segmentation attained a shorter distance between chromaticity coordinates than the arrangement in which no domain segmentation was done, for various angles between the directions of the optical anisotropies occurred in the respective domains $D_M$ and $D_M'$ of the respective pixels 71 by the electric field application (the angle is the angle between the arrows d1 and d2 in the respective domains $D_M$ and $D_M'$), and for various angles between the directions of the optical anisotropies occurred in the respective domains $D_M$ and $D_M'$ of the respective pixels 71 by the electric field application, and the absorption axes 6a and 7a of the polarizers 6 and 7. Therefore, it was proved that according to the present invention, the color change caused when the same image is viewed from different viewing angles can be reduced by the domain segmentation than in the conventional arrangement (that is, it is possible to attain improvement in the chromaticity coordinates).

Moreover, from the measurement results, it was shown that among the Y values (relative value) for the front direction in the arrangements 19 to 22, the one in the arrangement 19 is the largest (brightest). That is, it was shown that the best result is attained when the angles between the absorption axis of the polarizer and the directions of the optical anisotropies generated in the respective domains by the electric field application are 45 degrees, and the angle between the directions of the optical anisotropies generated in the respective domains by the electric field application is 90 degrees.

Figure 21:
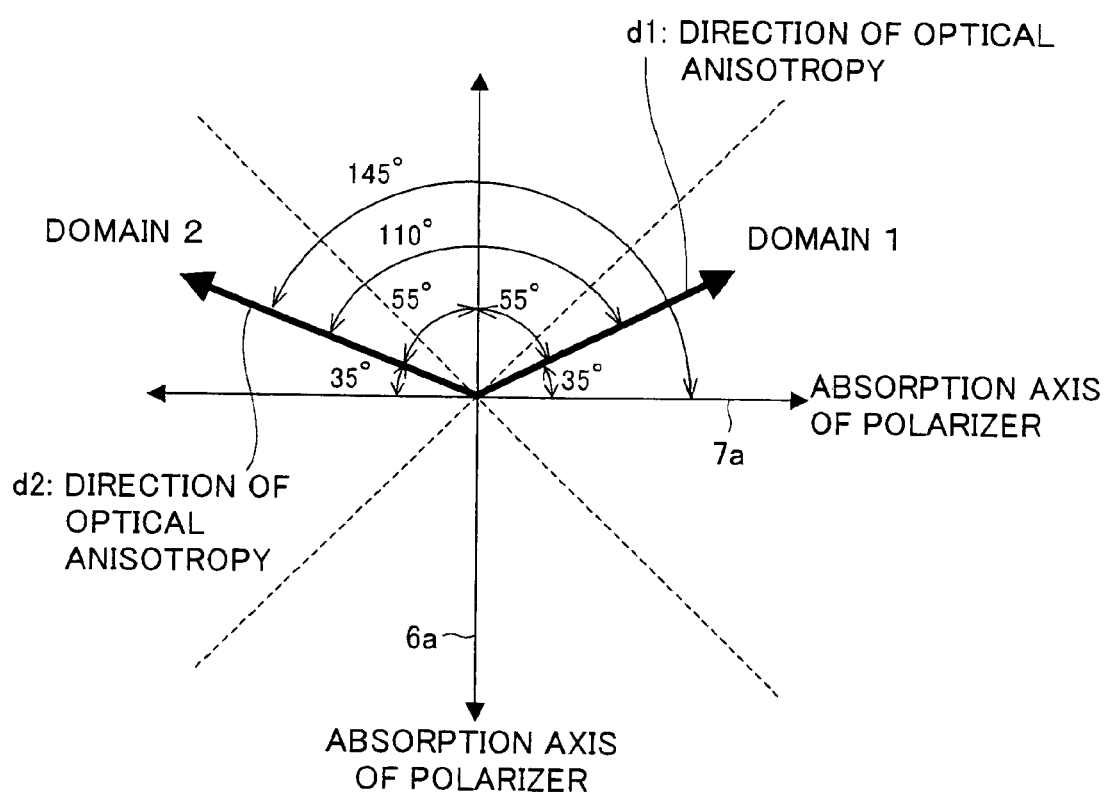
FIG. 21 is a yet another view for explaining an angle between the directions of the optical anisotropies occurred, by the electric field application, in the respective domains of each cell used in the measurement of the chromaticity and Y value, and an angle between absorption axes of the polarizers and the directions of the optical anisotropies occurred in the respective domains.
Figure 22:
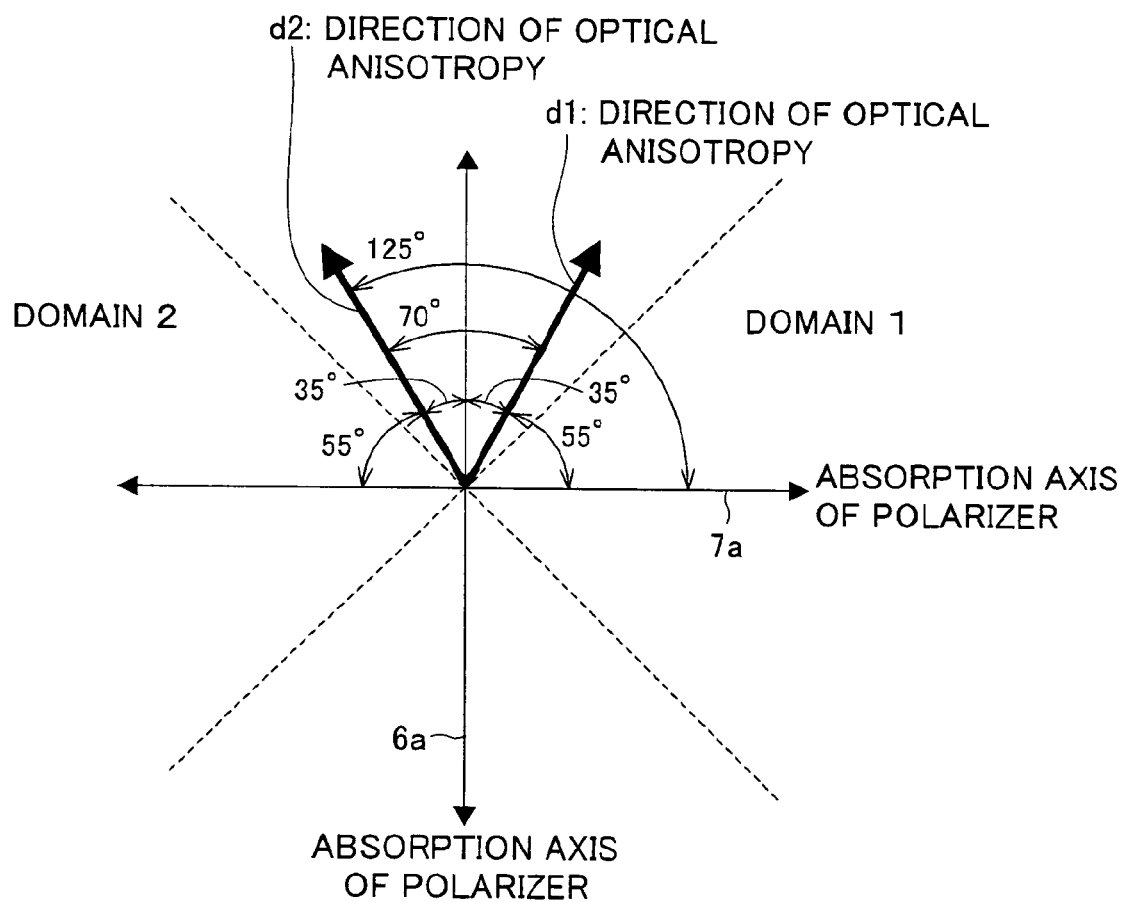
FIG. 22 is a still another view for explaining an angle between the directions of the optical anisotropies occurred, by the electric field application, in the respective domains of each cell used in the measurement of the chromaticity and Y value, and an angle between absorption axes of the polarizers and the directions of the optical anisotropies occurred in the respective domains.

In the arrangements illustrated in FIGS. 20 to 22, the directions (d1, d2) of the optical anisotropy in the domains 1 and 2 with respect to the absorption axes 6a and 7a were rotated by ±10 degrees from the direction in the arrangement illustrated in FIG. 19. However, because the respective angles between (a) the directions d1 and d2 and (b) the respective absorption axes 6a and 7a are symmetric as illustrated in FIGS. 20 to 22, the same result would be obtained if the directions (d1 and d2) of the optical anisotropy were rotated with respect to the absorption axes 6a and 7a.

Figure 2:
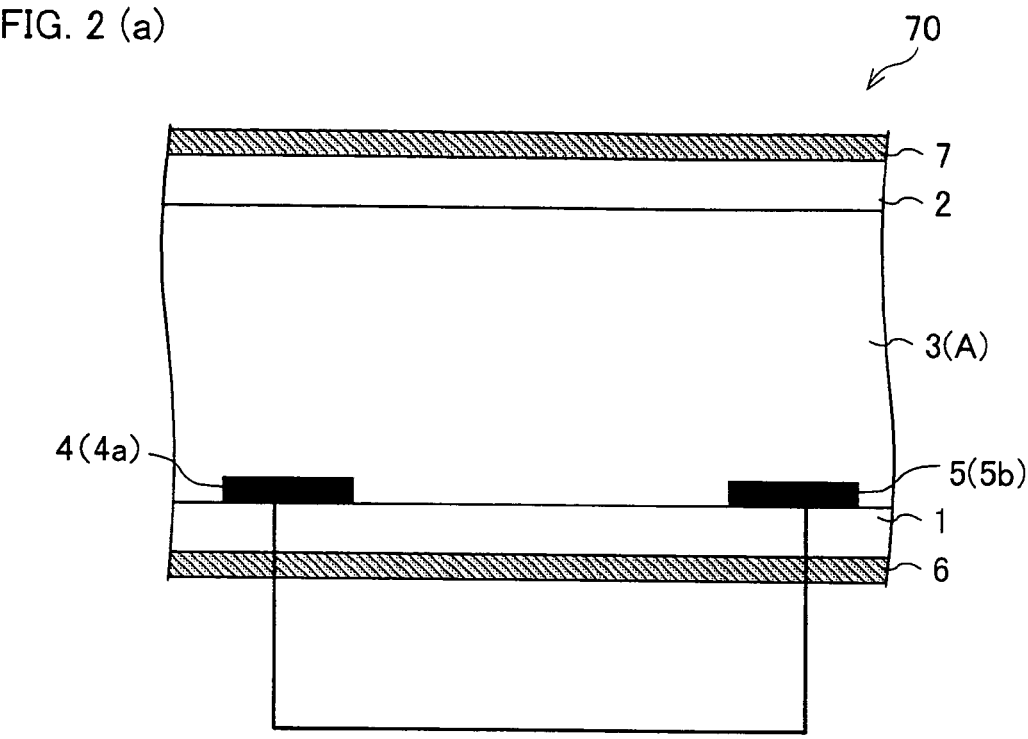
FIG. 2(a) is a cross sectional view schematically illustrating essential parts of the display element when no electric field is applied thereon.
FIG. 2(b) is a cross sectional view schematically illustrating the essential parts of the display element when an electric field is applied thereon.
Figure 2:
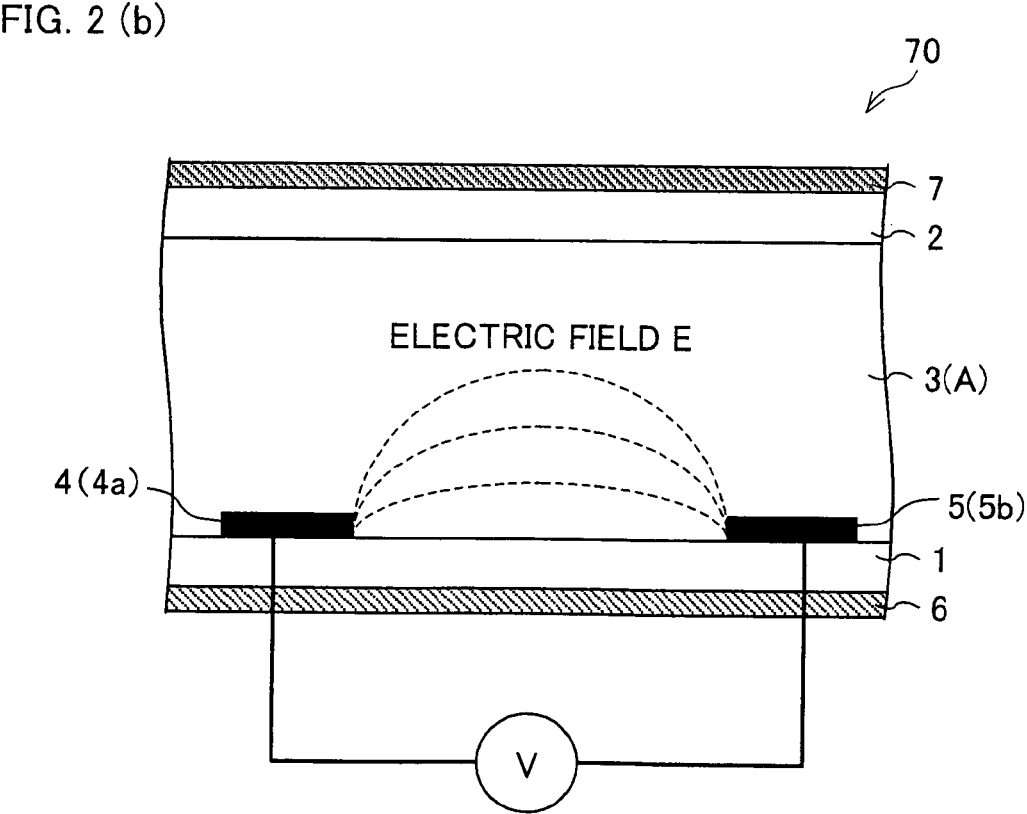
Figure 3:
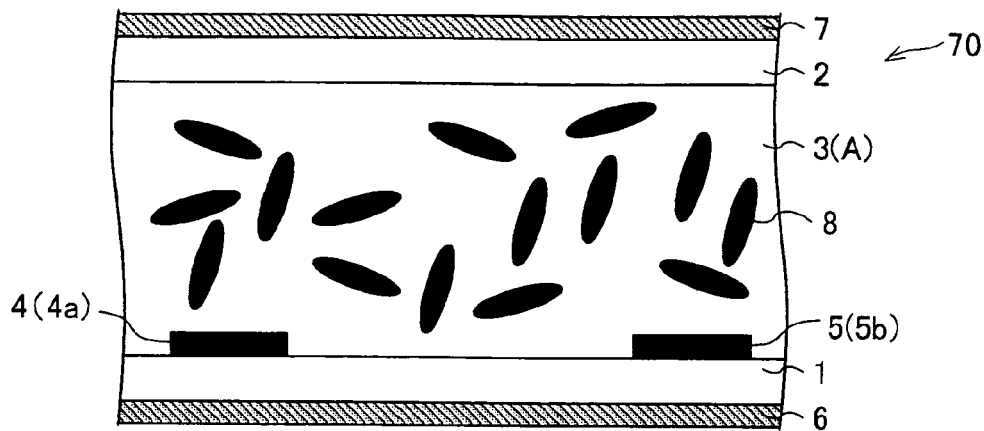
FIG. 3(a) is a cross sectional view schematically illustrating a medium of the display element when no electric field is applied thereon.
FIG. 3(b) is cross sectional view schematically illustrating the medium of the display element when a electric field is applied thereon.
Figure 3:
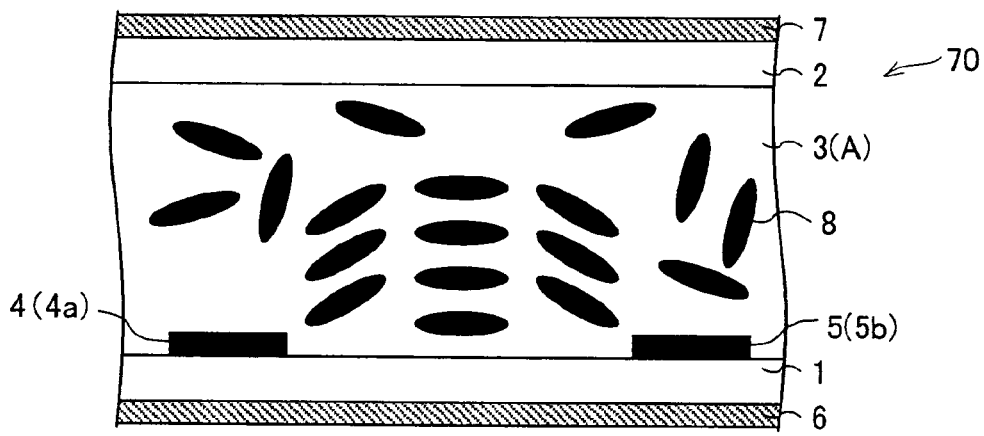

Moreover, for making comparison, a display element was prepared which was, as illustrated in FIG. 2 of Patent Publication 1, provided with interleave electrodes having tooth portions having "L-like (V-like)" shape (chevron shape) when illustrated in a plan view. The display element was observed in the aforementioned manner. In accordance with a configuration illustrated in FIG. 2 of Patent Publication 1, the "L-like" shape of the electrodes had an angle (curving angle (bending angle)) of 35 degrees, that is, it was designed that electric field application directions in adjacent domains made 35 degrees with each other. This electrode configuration had transmissivity smaller than that of Comparison Example 1 (that is, the arrangement with no domain segmentation, see FIG. 10) by 33%. The coloring phenomenon that occurred depending on the viewing angle was not improved significantly but was alleviated compared with that occurred in the arrangement in which no domain segmentation was done.

It should be noted that Patent Publication 1 is different from the present technology, because no domain segmentation is done in Patent Publication 1: even though the "L-shaped (chevron shaped)" electrode (which has the L-shape when viewed as illustrated in a plan view) is used in the display element disclosed in Patent Publication 1 for improving the viewing angle property, the display element disclosed therein is provided with polyimide films as dielectric thin films, on that surface of a substrate on which the electrode is provided and a surface of the other substrate facing that surface, the polyimide films having been subjected to alignment treatment so that the clusters (molecular agglomerations) located on surfaces of the polyimide films will be aligned in one direction (that is, no domain segmentation is carried out).

Note that Patent Publication 1 seems that SIPS (Super In-Plane Switching) mode of the liquid crystal display element is simply applied therein. The inventors of the present technology found out that optimum shape in the SIPS mode is not preferable in the display element in which the display principle totally different from that of the liquid crystal display element is applied, and that if the domain segmented configuration of the SIPS mode was applied in the display element, the object of the present technology could not be attained.

Moreover, intensive studies conducted by the inventors of the present technology showed that, in SIPS mode, which is one of display modes of the liquid crystal display element, an appropriate direction of the optical anisotropy generated by the application of the electric field on each domain is not the angle of 90 degrees, but an angle close to 0 degree. The reason for this is explained blew referring to FIGS. 11(a) and 11(b).

Figure 11:
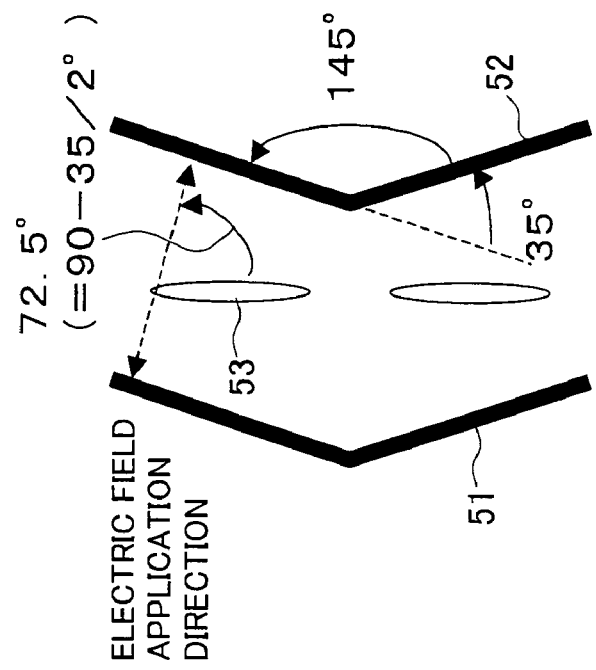
FIG. 11(a) is a view schematically illustrating rotation of liquid crystal molecules in an arrangement in which L-shaped (chevron shaped) electrodes are so provided in conventional SIPS mode that electric field application directions in adjacent domains make 90 degrees with each other.
FIG. 11(b) is a view schematically illustrating rotation of liquid crystal molecules in an arrangement in which L-shaped (chevron shaped) electrodes are so provided in conventional SIPS mode that electric field application directions in adjacent domains make 35 degrees with each other.
Figure 11:
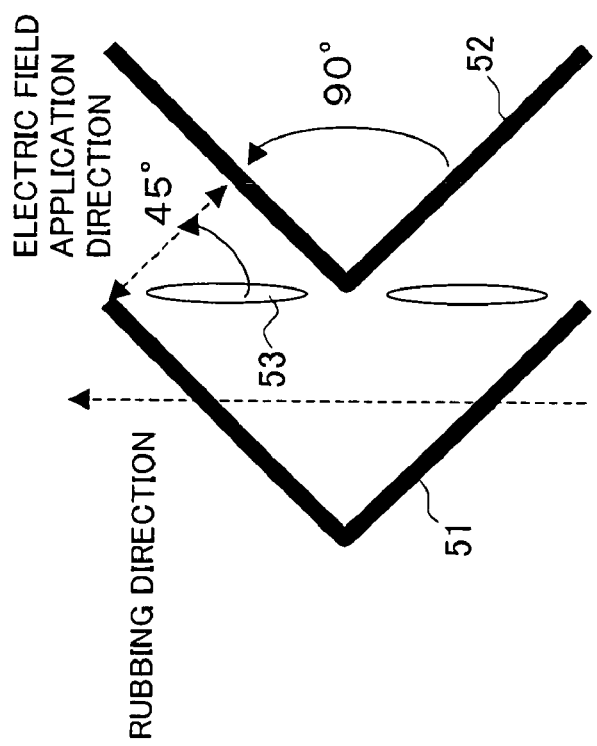

FIG. 11(a) is a view schematically illustrating rotation of liquid crystal molecules 53 in an arrangement in which SIPS mode is applied and the "L-like" shaped electrodes 51 and 52 are provided such that the curving angle (bending angle) is 90 degrees, that is, the electric field application directions of each adjacent domain make 90 degrees with each other. Moreover, FIG. 11(b) is a view schematically illustrating rotation of liquid crystal molecules 53 in an arrangement in which SIPS mode is applied and the "L-like" shaped electrodes 51 and 52 are provided such that the curving angle (bending angle) is 35 degrees, that is, the electric field application directions of each adjacent domain make 35 degrees with each other.

As described above, in order to attain the maximum transmissivity, the liquid crystal molecules 53 in each domain should be rotated 45 degrees by application of the electric field. The liquid crystal molecules 53 are rotated to be along the electric field application direction. In the case illustrated in FIG. 11(a), it is necessary that the direction of the liquid crystal molecules 53 and the electric field application direction be completely parallel to each other. Thus, a large electric field should be applied. On the other hand, in the case illustrated in FIG. 11(b), the rotation to 45 degrees is merely an angle beyond which the liquid crystal molecules 53 are rotated. Thus, a large voltage is unnecessary to rotate the liquid crystal molecules 53 to 45 degrees. That is, in the segmented domains in the SIPS mode of the liquid crystal display element, it is only required that the respective domains in the pixel have different electric field application directions, and it is advantageous that the electric field application directions make an angle close to zero degree. The reason why it is arranged that the orientational direction and the electrodes 51 and 52 make an angle slightly tilted from zero degree is to allow the liquid crystal molecules 53 to rotate in either two ways depending on the applied electric field. Typical arrangement is such that the orientational direction and the electrodes 51 and 52 make an angle in a range of from several degrees to 20 degree.

As described above, in the present embodiment, the display element 70 in which the medium A, a magnitude of whose optical anisotropy is changeable by and according to the application of the electric field is arranged such that, as illustrated in FIG. 1, the interleave electrodes 4 and 5 are formed in the respective two domains (domains $D_M$ and $D_M'$) in each minute region such that electric field application directions in the respective domains cross each other perpendicularly. According to the present embodiment as such, it is possible to provide such a display element in which restraint of the coloring phenomenon with respect to all directions and a wide viewing angle are attained without causing deterioration of the transmissivity. The reason why this arrangement restrains the coloring phenomenon with respect to all viewing angle is still unknown. However, a hypothesis is as follows: the characteristics along the directions of the viewing angles A and C compensates for the characteristics along the directions of the viewing angles B and D, and this results in the restraint of the coloring phenomenon.

As described above, according to the display element 70 according to the present embodiment, it is possible to cause the coloring phenomenon occurred in the two domains (domains $D_M$ and $D_M'$) to cancel out each other, the domains arranged such that the optical anisotropies of different directions occur respectively in the domains. Compared with the arrangement in which each pixel 71 has one domain (for example, domain $D_M$) in which the optical anisotropy occurs in only one direction (that is, the arrangement without the domain segmentation), an arrangement in which at least small population of the pixels 71 have at least two domains (for example, domains $D_M$ and $D_M'$) in which the optical anisotropies occurs in more than one direction, is effective to suppress the coloring phenomenon. In this arrangement, it is preferable as described above that the angle between the directions of the optical anisotropies occurred in the respective domains $D_M$ and $D_M'$ when the electric field is applied is preferably 90 degrees±20 degrees, more preferably 90 degrees±less than 20 degrees, and further preferably 90 degrees±10 degrees.

The following Table 3 shows parameters obtained when a ratio of the domain 1 and domain 2 is changed in the configuration of cell (1) illustrated in FIG. 19 (angle (1)=angle (2)=45 degrees, angle (3)=90 degrees, and angle (4)=135 degrees). The parameters shown in Table 3 are (a) various ratios of "domain 2" in each pixels 71 (that is, a ratio of a domain in which another optical anisotropy occurs, in each pixel 71) (b) chromaticity coordinate (chromaticity coordinate along the x axis direction and chromaticity coordinate along the y axis direction) for (45, 60) and (135, 60), (c) Y values at each of the chromaticity coordinates, and (d) distance between the chromaticity coordinates in the cells of the above ratios.

TABLE 3

| | (45, 60) | | | (135, 60) | | | Distance |
|---|---|---|---|---|---|---|---|
| Ratio | Chromaticity along x axis | Chromaticity along y axis | Y value | Chromaticity along x axis | Chromaticity along y axis | Y value | between coordinates |
| 0.05 | 0.3180 | 0.3303 | 0.3104 | 0.2736 | 0.2642 | 0.2112 | 0.0797 |
| 0.10 | 0.3159 | 0.3271 | 0.3049 | 0.2765 | 0.2684 | 0.2167 | 0.0707 |
| 0.25 | 0.3093 | 0.3174 | 0.2884 | 0.2848 | 0.2808 | 0.2333 | 0.0441 |
| 0.50 | 0.2976 | 0.2999 | 0.2608 | 0.2976 | 0.2999 | 0.2608 | 0.0303 |
| 0.75 | 0.2848 | 0.2808 | 0.2333 | 0.3093 | 0.3174 | 0.2884 | 0.0441 |
| 0.90 | 0.2765 | 0.2684 | 0.2167 | 0.3159 | 0.3271 | 0.3049 | 0.0707 |
| 0.95 | 0.2736 | 0.2642 | 0.2112 | 0.3180 | 0.3303 | 0.3104 | 0.0797 |

As clearly shown from the results in Tables 1 and 3, the chromaticity coordinates and Y values at the chromaticity coordinates for (45, 60) and (135, 60) are such that they become closer to the value of (45, 60) in the cell (2) shown in Table 1 as the ratio of the domain having different optical anisotropy in each pixel 71 is smaller than 0.5. As the ratio approaches 0.5, the brightness approaches to the value of the cell (1) shown in Table 1. When the ratio is 0.5, the chromaticity coordinates and Y values at the chromaticity coordinates for (45, 60) and (135, 60) attain the value same as the cell (1). As the ratio exceeds 0.5 and approaches 1, they approach the value of (135, 60) in the cell (2). Moreover, in this case, the distance between the chromaticity coordinates becomes shorter as the ratio approaches 0.5 (that is, domain 1:domain 2=1:1). Thus, the ratio closer to 0.5 is preferable. Moreover, from the measurement result, it is understood that, for human eyes, a large improvement (compensation) in the coloring phenomenon appear to be attained when the ratio is in a range of 0.1 to 0.9.

Note that the present invention is not limited to the present embodiment in which the transmissive display element 70 is exemplified: the display element 70 may be a reflective display element.

Figure 12:
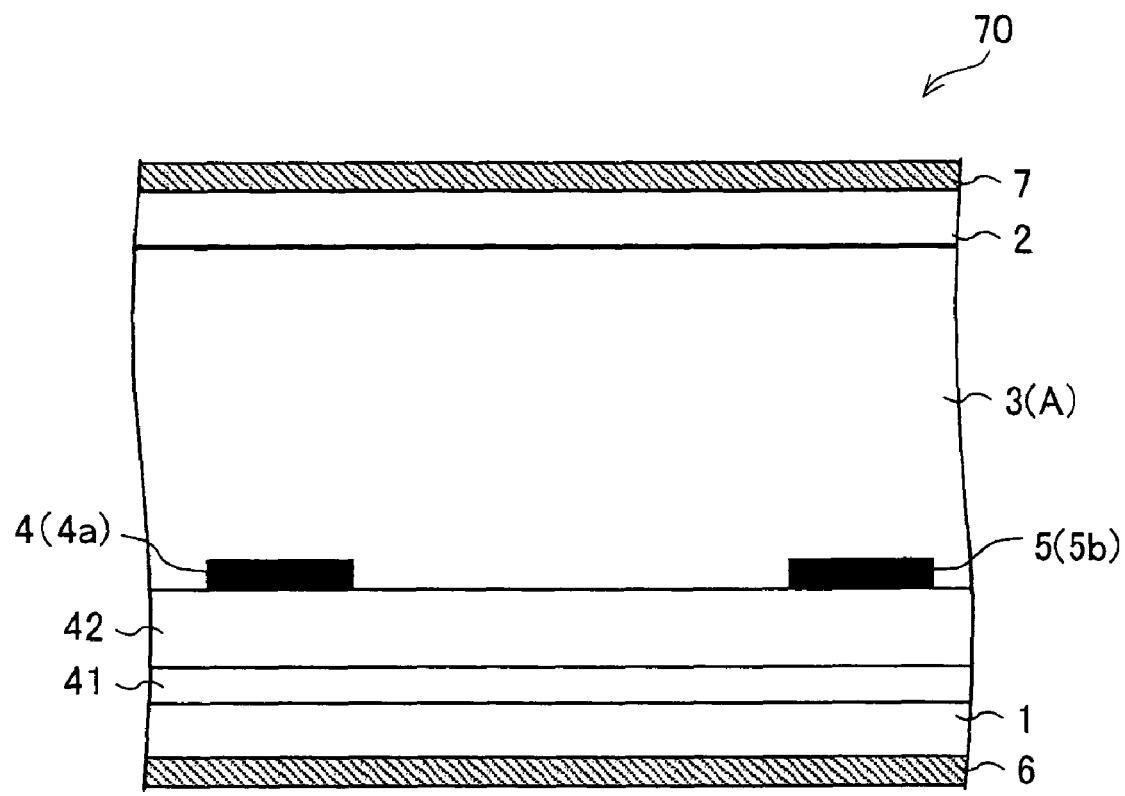
FIG. 12 is a cross sectional view schematically illustrating an example of essential parts of reflection mode display element according to the present embodiment.
Figure 13:
FIG. 13(a) is a cross sectional view schematically illustrating essential part of a display element according to another embodiment when no electric field is applied.
FIG. 13(b) is a cross sectional view schematically illustrating the essential part of the display element according to the another embodiment when a electric field is applied.
Figure 13:
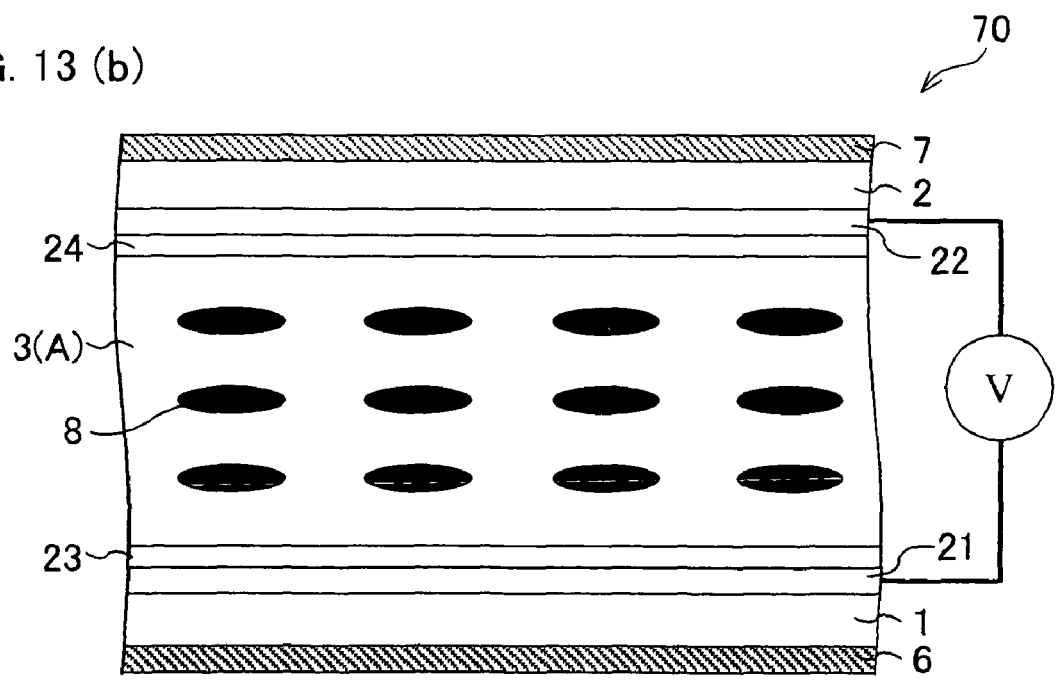

FIG. 12 illustrates an example of a schematic arrangement of a reflective display element as a display element 70 of the present embodiment according to the present technology.

For example, the reflective display element 70 is arranged such that a pair of substrates is provided, one of which is a substrate 1 and is a glass substrate or the like, a reflection layer 41 is provided on the substrate 1, and, for example, interleave electrodes 4 and 5, which are made of ITO or the like, are provided above the reflection layer 41, and an electric insulating layer 42 is interposed between the electrodes and the reflection layer 41. Note that the reflective display element is arranged similarly to the aforementioned display element in terms of the other arrangement. The electric insulating layer 42 may be an organic film made of acrylic group-based resin or the like; an inorganic film made of silicon nitride, silicon oxide, or the like; or the like. Moreover, the reflection layer 41 may be a thin film made of aluminum or silver, or the like. According to the above arrangement, the reflection layer 41 can reflect the incident light from the other substrate 2, which is transparent and is a glass substrate or the like. In this way, this display element functions as a reflective display element.

In case where the display element 70 according to the present embodiment is used as a reflective display element, various materials conventionally known as electrode materials may be used for the interleave electrodes 4 and 5, besides the transparent electrode materials such as ITO and the like. For example, the interleave electrodes 4 and 5 may be made of a metal electrode material such as aluminum or the like. Moreover, there is no particular limitation in terms of a line width and electrode-electrode intervals of the interleave electrodes 4 and 5. For example, the line width and the electrode-electrode intervals may be designed arbitrarily according to a gap between the substrates 1 and 2, or the like.

Further, even though the arrangement in which the substrates 1 and 2 are glass substrates is discussed as an example in the present embodiment, but the present invention is not limited to this. For example, various substrates conventionally known are applicable as one of the substrates 1 and 2, as long as at least one of the substrates 1 and 2 is transparent.

Moreover, the substrates 1 and 2 are not limited to those that have been conventionally used as substrates: for example the substrates 1 and 2 may be in a film-like shape, or may be flexible. As long as one of the substrates 1 and 2 is transparent and it is possible to hold (sandwich) the medium A between the substrates, that is, in a space formed between the substrates, the substrates 1 and 2 may be made of various materials, according to kinds of the medium A, phase states, or the like factors.

Moreover, the present embodiment explains, as a specific example, an arrangement in which the medium A is optically isotropic when no electric field is applied thereon, and becomes optically anisotropic when the electric field is applied thereon. However, the present invention is not limited to this. As mentioned above, in the present invention, the medium A may be such a material that loses its optical anisotropy and becomes optically isotropic by the electric field application.

In the following, a specific example in which the medium A may be such a material that loses optical anisotropy and becomes optically isotropic by the electric field application is explained.

In this specific example, two transparent substrates 1 and 2 are provided, which are glass substrates. On that surface (facing surfaces) of the substrate 1 which faces the substrate 2, transparent electrodes 4 and 5 are provided, which are made of ITO. Further, an alignment film made of polyimide is provided on the facing surface of the substrate 1. Between the substrates 1 and 2, a medium A is sealed in, thereby forming a medium layer 3. The medium A is 4'-n-alkoxy-3'-nitrobiphenyl-4-carboxilic acid (ANBC-22), which is a transparent dielectric material. Thickness of the medium layer 3 is adjusted to 4 μm by scattering plastic beads on facing surfaces of the substrates 1 and 2 in advance.

As in the aforementioned arrangement, polarizers 6 and 7 are provided respectively on outer sides of the substrates 1 and 2 such that respective absorption axes 6a and 7a of the polarizers 6 and 7 cross each other at the right angle and make 45 degrees with a direction along which tooth portions 4a and 5a of the interleave electrodes 4 and 5 are extended. (The outer sides are opposite to the facing surfaces).

While keeping the thus prepared display element 70 at temperatures near smectic C phase-cubic phase transition point by using an external heating device (heating means), a voltage was applied (an alternative electric field of about 50V (greater 0 but less than several hundreds kHz)) on the display element prepared as such. By doing this, transmissivity of the display element could be changed. That is, when no electric field was applied, the display element was in smectic C phase (bright state) which was optically anisotropic. However, when the electric field was applied, the display element was transited to the cubic phase (dark state) which is isotropic.

Moreover, substantially similar effect was obtained in an arrangement in which, as in a later-described embodiment 2, the substrates 1 and 2 were provided with an electrode and an electric field was generated along a normal direction of the substrates. That is, the application of the electric field along the normal direction of the substrates are as substantially effective as the application of the electric field along the in-plane direction of the substrates.

As described above, the medium A used in the display element 70 according to the present embodiment may be such medium that is optically anisotropic when no electric field is applied thereon, but loses its optical anisotropy and becomes optically isotropic when the electric field is applied thereon.

Moreover, the medium A may have positive dielectric anisotropy or negative dielectric anisotropy. In case where the medium A has the positive dielectric anisotropy, it is necessary that an electric field substantially parallel to the substrates 1 and 2 be used for driving. However, the arrangement in which the medium A has the negative dielectric anisotropy is not limited to this. In this arrangement, the driving may be carried out with an electric field diagonal or perpendicular to the substrates 1 and 2, for example. In this case, shapes, materials, and positions of the electrodes are arbitrarily changed. Note that it is advantageous in terms of aperture ratio that the electric field is applied perpendicularly by using a transparent electrode.

Figure 25:
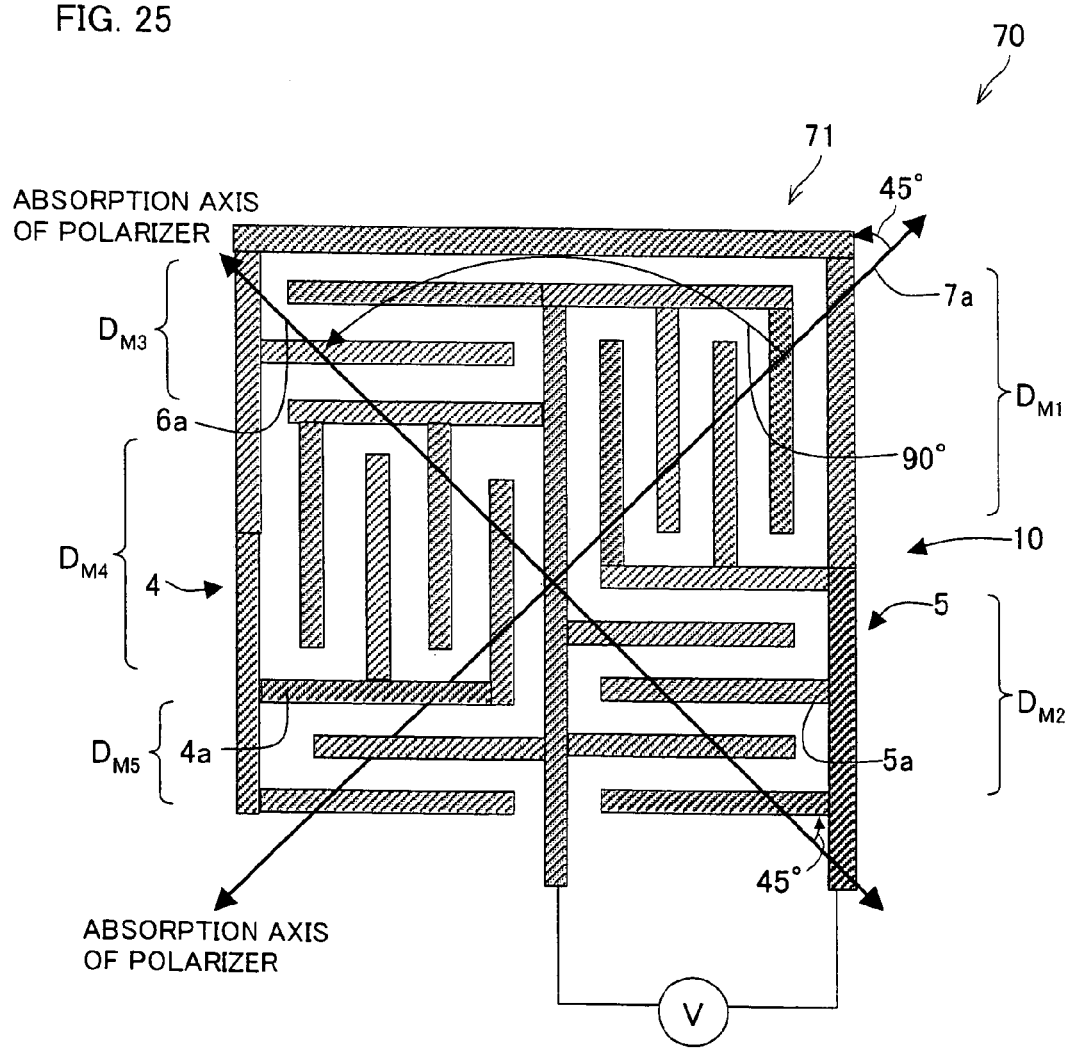
FIG. 25 is a plane view schematically illustrating an electrode configuration of each pixel of the display element illustrated in FIG. 1 according to one example embodiment.

Note that the present embodiment is not limited to the arrangement which the present embodiment mainly discusses, as an example, namely, the arrangement in which each pixel has at least two domains in which the medium shows optical anisotropies of different directions when the electric field is applied. A number of the domains in each pixel 71 may be two or more. For example, the electrode configuration (domain arrangement) as illustrated in FIG. 25 may be adopted. Taking the errors in the human eye into consideration, the respective angles between (a) the directions of the optical anisotropies occurred in the respective domains when the electric field is applied and (b) the absorption axes 6a and 7a of the polarizers 6 and 7 are preferably about 45 degrees (45 degrees±10 degrees, preferably, 45 degrees±less than 10 degrees, and more preferably 45 degrees±5 degrees). Moreover, an angle between the directions of the optical anisotropies occurred in adjacent domains when the electric field is applied is preferably about 90 degrees (90 degrees±20 degrees, preferably, 90 degrees±less than 20 degrees, and more preferably 90 degrees±10 degrees). Alternatively, the optical anisotropies occurred in adjacent domains when the electric field is applied are preferably directed in the substantially same direction (that is, the angle between the directions of the optical anisotropies occurred in adjacent domains when the electric field is applied is preferably about 0 degree (0 degree of ±20 degrees, preferably, 0 degree±less than 20 degrees, and more preferably 0 degree±10 degrees).

That is, according to the present embodiment, the coloring phenomenon occurred in the respective two or more domains are cancelled out with each other because the two or more domains are arranged such that optical anisotropies of different directions occur in the respective domains, the different directions making angles of about 45 degrees with the absorption axes of the polarizers, wherein the different directions preferably make, between themselves, about 90 degrees (90 degrees±20 degrees, preferably, 90 degrees±less than 20 degrees, and more preferably 90 degrees±10 degrees). For this reason, the display element 70 according to the present embodiment is preferably arranged such that, for example, as illustrated in FIG. 25, each pixel 71 has at least one first domain in which optical anisotropy of a direction making about 45 degrees (45 degrees±10 degrees, preferably, 45 degrees±less than 10 degrees, and more preferably 45 degrees±5 degrees) with respect to an absorption axis (for example absorption axis 6a) of one of polarizers, and at least one second domain in which optical anisotropy of a direction making about 45 degrees (45 degrees±10 degrees, preferably, 45 degrees±less than 10 degrees, and more preferably 45 degrees±5 degrees) with respect to an absorption axis (for example absorption axis 7a) of another one of polarizers.

Again in the display element 70 illustrated in FIG. 25, as long as a small population of the pixels 71 has domains (second domains and/or the other domains) in which the optical anisotropy occurs in a different direction from that of the first domain, this arrangement is effective in suppressing the coloring phenomenon, compared with the arrangement in which each pixel 71 has only domain (one domain) in which the optical anisotropy occurs in the same direction (that is, the arrangement without domain segmentation). In this arrangement, it is preferable that the directions of the optical anisotropies occurred in the respective domains when the electric field is applied preferably make, between themselves, 90 degrees±20 degrees, more preferably, 90 degrees±less than 20 degrees, and further preferably 90 degrees±10 degrees).

Moreover, as to the ratio of the respective domains in each pixel 71, as described above, a large improvement (compensation) in the coloring phenomenon appear to be attained for human eyes when the ratio ("domain 1":"domain 2") between the two domains in which the optical anisotropies occur in different directions is in a range of 1:9 to 1:1 (preferably about 1:1) (this ratio is for example a ratio between a domain in which the optical anisotropy occurs in the direction along the x direction, and a domain in which the optical anisotropy occurs in the direction along the y direction that cross the x direction in the same plane (perpendicularly). Therefore, it is preferable that a ratio between a sum of areas of the first domains and a sum of areas of the second domains is in a range of 1:9 to 1:1 (preferably 1:1), where the first domains are domains in which optical anisotropy of a direction making about 45 degrees (45 degrees±10 degrees, preferably, 45 degrees±less than 10 degrees, and more preferably 45 degrees±5 degrees) with respect to an absorption axis (for example absorption axis 6a) of one of polarizers, and the second domains are domains in which optical anisotropy of a direction making about 45 degrees (45 degrees±10 degrees, preferably, 45 degrees less than 10 degrees, and more preferably 45 degrees±5 degrees) with respect to an absorption axis (for example absorption axis 7a) of another one of polarizers. For example, in FIG. 25, the sum of the first domains is $D_{M2}+D_{M3}+D_{M5}$, whereas the sum of the second domains is $D_{M1}+D_{M4}$. Note that the domains whose areas are to be added in the summation may be located far from each other (not adjacently), as long as the optical anisotropy occurs in the same direction in them.

Second Embodiment

The following explains another embodiment of the present technology referring to FIGS. 13(a) and 13(b) to 15. Note that the present embodiment mainly discusses a difference between the present embodiment and the First embodiment, while the same constituent elements having the same functions as these in the first embodiment are labeled in the same manner and their explanation is omitted here.

In the First embodiment, the electric field is applied in the direction parallel to the surface of the substrates. The present embodiment, however, explains an example arrangement in which an electric field is applied along a normal direction of substrates.

Figure 14:
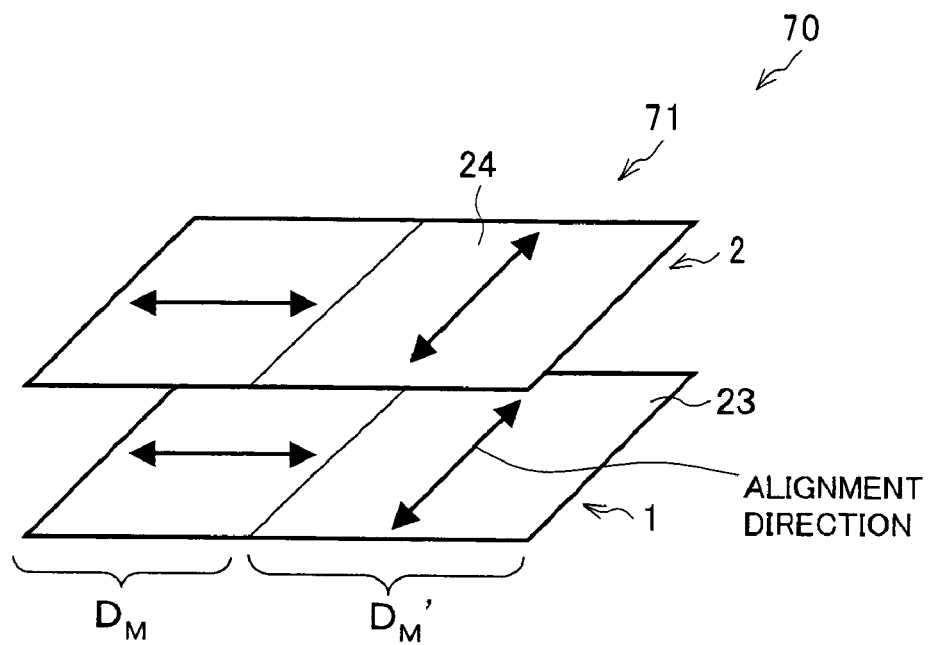
FIG. 14 is a view for explaining alignment directions of respective domains in one pixel in a display element according to still another example embodiment.
Figure 15:
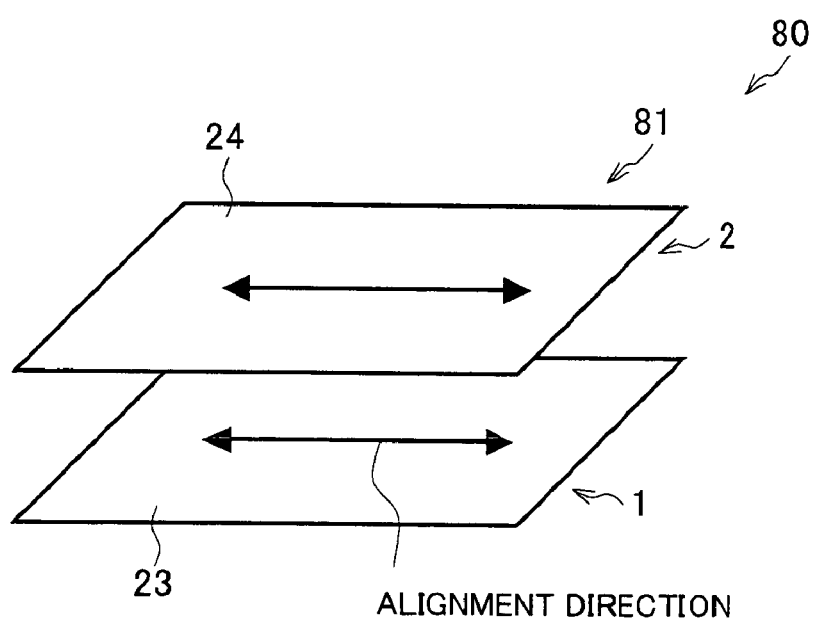
FIG. 15 is a view for explaining aliment directions in respective pixels in a conventional display element.

FIG. 13(a) is a cross sectional view schematically illustrating essential parts of a display element according to the present embodiment when no electric field (voltage) is applied (OFF state), whereas FIG. 13(b) is a cross sectional view schematically illustrating the essential parts of the display element according to the present embodiment when an electric field (voltage) is applied (ON state). Moreover, FIG. 14 is a view for explaining directions of alignment treatment in respective domains in one pixel in the display element according to the present embodiment. FIG. 15 is a view for explaining directions of alignment treatment in each pixel in a conventional display element.

A display element 70 according to the present embodiment is, as illustrated in FIGS. 13(a) and 13(b), provided with transparent electrodes 21 and 22 on facing surfaces of the substrates 1 and 2, in lieu of the interleave electrodes 4 and 5 in the first embodiment.

Again in the display element 70 having such an arrangement, a medium A sealed between the substrates 1 and 2 is in an isotropic phase and is optically isotropic when no electric field (voltage) is applied on the transparent electrodes 21 and 22, as illustrated in FIG. 13(a). Thus, when no electric field is applied, the display element 70 displays in black (the display element 70 is in a black display state).

On the other hand, as illustrated in FIG. 13(b), when a electric field is applied on the transparent electrodes 21 and 22, molecules 8 in the medium A are so oriented that major axial direction of the molecules 8 are directed along a direction perpendicular to an electric field (voltage) applied between the transparent electrodes 21 and 22. Thereby, birefringence phenomenon occurs. Because of the birefringence phenomenon, it is possible to modulate (change) the transmissivity of the display element 70 by and according to the voltage applied between the transparent electrodes 21 and 22.

Similarly to the first embodiment, the display element 70 having this arrangement also needs a large voltage in order to modulate the transmissivity at temperatures sufficiently higher than the phase transition temperature (transition point). However, at temperature right above the transition point, it is possible to attain sufficient modulation of the transmissivity with a voltage of about 0V to 100V in the display element 70 having this arrangement.

Moreover, the display element 70 according to the present embodiment is, as illustrated in FIGS. 13(a) and 13(b), provided with optical alignment films 23 and 24 respectively on the transparent electrodes 21 and 22. The alignment films 23 and 24 contain a photosensitive functional group(s), that is, they are alignment films (photo alignment films) made of a material (compound) having a photosensitive functional group.

The present embodiment is so arranged that the transparent electrodes 21 and 22 made of ITO and the alignment films 23 and 24 made of polyimide are provided respectively on facing surfaces of the transparent substrates 1 and 2, which are glass substrates. Further, the present embodiment is so arranged that, as the medium A, a transparent dielectric liquid is sealed between the substrates 1 and 2, the transparent dielectric liquid containing compounds represented by Structural Formulae (2) to (4) respectively by 30 wt %, 40 wt %, and 30 wt %. It was confirmed that the dielectric liquid shows a negative type nematic liquid crystal phase at temperatures lower than 113° C., and an isotropic phase at temperature not less than 113° C. Moreover, plastic beads are scattered on the facing surfaces of the substrates 1 and 2 in advance in order to adjust thickness of a medium layer 3 of the display element 70 to be 5 μm again in the present embodiment.

The alignment films 23 and 24 have been subjected to alignment treatment in advance. The alignment directions are parallel but in opposite directions. The alignment directions are at 45 degrees with the absorption axes of the polarizers. Moreover, on the outer sides of the substrates 1 and 2, polarizes 6 and 7 are respectively provided as illustrated in FIGS. 13(a) and 13(b). The transmissivity can be changed by applying an electric field (voltage) on the medium in the display element 70 kept at temperatures near above the nematic-isotropic phase transition point by using a heating device (heating means) provided outside.

Moreover, in the present embodiment, the alignment treatment is carried out by radiating polarized ultraviolet rays (which are polarized parallel to each other) from above the alignment films 23 and 24 respectively provided on the substrates 1 and 2. The radiation of the polarized ultraviolet gives the alignment films 23 and 23 orientation regulating force. By this alignment treatment, two domains $D_M$ and $D_M'$ (minute regions) are formed in each pixel 71 as illustrated in FIG. 14. In the respective domains $D_M$ and $D_M'$, orientation regulating directions (alignment directions) are parallel. However, the orientation regulating directions (alignment directions) of the domains $D_M$ and $D_M'$, are perpendicular to each other.

In this way, the display element 70 is prepared, in which (a) each pixel 71 has at least two domains $D_M$ and $D_M'$ (minute regions) in which electric field application causes the medium A to show optical anisotropies in directions making 90 degrees therebetween; and in which (b) the directions of the optical anisotropies caused in the respective domains $D_M$ and $D_M'$ by the electric field application and absorption axes 6a and 7a of the polarizers 6 and 7 make 45 degrees respectively.

The display element 70 thus prepared (that is to have two domains per pixel) according to the present embodiment was observed in terms of colors viewed from a direction of a polar angle of 60 degrees when the electric field is applied. The observation showed that no coloring phenomenon was seen in all viewing angles (viewing angles A', B', C', D', A, B, C, and D).

On the other hand, for making comparison, a display element was prepared in which the alignment films 23 and 24 on the substrates 1 and 2 were aligned in one direction so that the orientation regulating directions (alignment directions) in the respective substrates were parallel and each pixel (pixel 81) had one domain, as illustrated in FIG. 15. The same observation was done for this display element. The observation showed that bluish and yellowish coloring phenomenon occurred when viewed from a direction of 45 degrees with respect to the absorption axes.

As described above, according to the present embodiment, it is possible to attain, without having a special electrode configuration, a display element whose viewing angle is wide and in which the coloring phenomenon is suppressed in all directions but the transmissivity is not sacrificed, the present embodiment being arranged such that (a) each pixel 71 has at least two domains $D_M$ and $D_M'$ in which the medium A shows optical anisotropies of different directions when electric field is applied, that (b) the directions of the optical anisotropies generated in the respective domains $D_M$ and $D_M'$ make an angles of 45 degrees±less than 10 degrees with the absorption axes 6a and 7a of the polarizers 6 and 7 respectively, and that (c) alignment treatment is carried out so as to cause the domains $D_M$ and $D_M'$ to have such optical anisotropy when the electric field is applied thereon that the directions of optical anisotropies in the respective $D_M$ and $D_M'$ make 90 degrees therebetween. More specifically, according to the present embodiment, it is possible to cause each pixel 71 to have regions therein where the orientational directions are different by 90 degrees from each other, the present embodiment arranged such that, as illustrated in FIG. 14, the alignment films 23 and 24 are provided, the alignment films 23 and 24 having been subjected to such alignment treatment that at least two regions (domains $D_M$ and $D_M'$; minute regions) having different orientation regulating directions (alignment direction) that cross each other perpendicularly.

It is only required that at least one of the alignment films 23 and 24 be provided on at least one of the substrates 1 and 2. It is preferable that the alignment film(s) contain a photosensitive functional group for the sake of easy alignment control. However, the present invention is not limited to this arrangement. The photosensitive functional group may be, but not limited to, cinnamate-type, chalcone-type and the like functional groups which cause dimerization, azo-type and the like functional groups which cause isomerization.

Moreover, the present embodiment may be arranged such that each pixel 71 has two or more domains, as in the first embodiment. Moreover, considering the errors in the humans eyes, it should be so arranged that respective angles between (a) the directions of the optical anisotropies generated in the respective domains $D_M$ and $D_M'$ when the electric field is applied, and (b) the absorption axes of the polarizers 6 and 7, are about 45 degrees (preferably 45 degrees±10 degrees, more preferably 45 degrees±less than 10 degrees, and further preferably 45 degrees±5 degrees), and that the directions of the optical anisotropies generated in the respective domains $D_M$ and $D_M'$ when the electric field is applied, make about 90 degrees (preferably 90 degrees±20 degrees, more preferably 90 degrees±less than 20 degrees, and further preferably 90 degrees±10 degrees) with each other.

Moreover, again in this embodiment, a ratio between the respective domains in the pixel 71 is preferably such that a ratio between two domains in which the optical anisotropies of different directions occurs (that is, a ratio between sums of areas of the domains) is 1:9 to 1:1 (preferably 1:1).

Third Embodiment

Still another embodiment according to the present technology is explained below, referring to FIGS. 16 and 17. Note that the present embodiment mainly discusses a difference between the present embodiment and the First embodiment, while the same constituent elements having the same functions as these in the first embodiment are labeled in the same manner and their explanation is omitted here.

Figure 16:
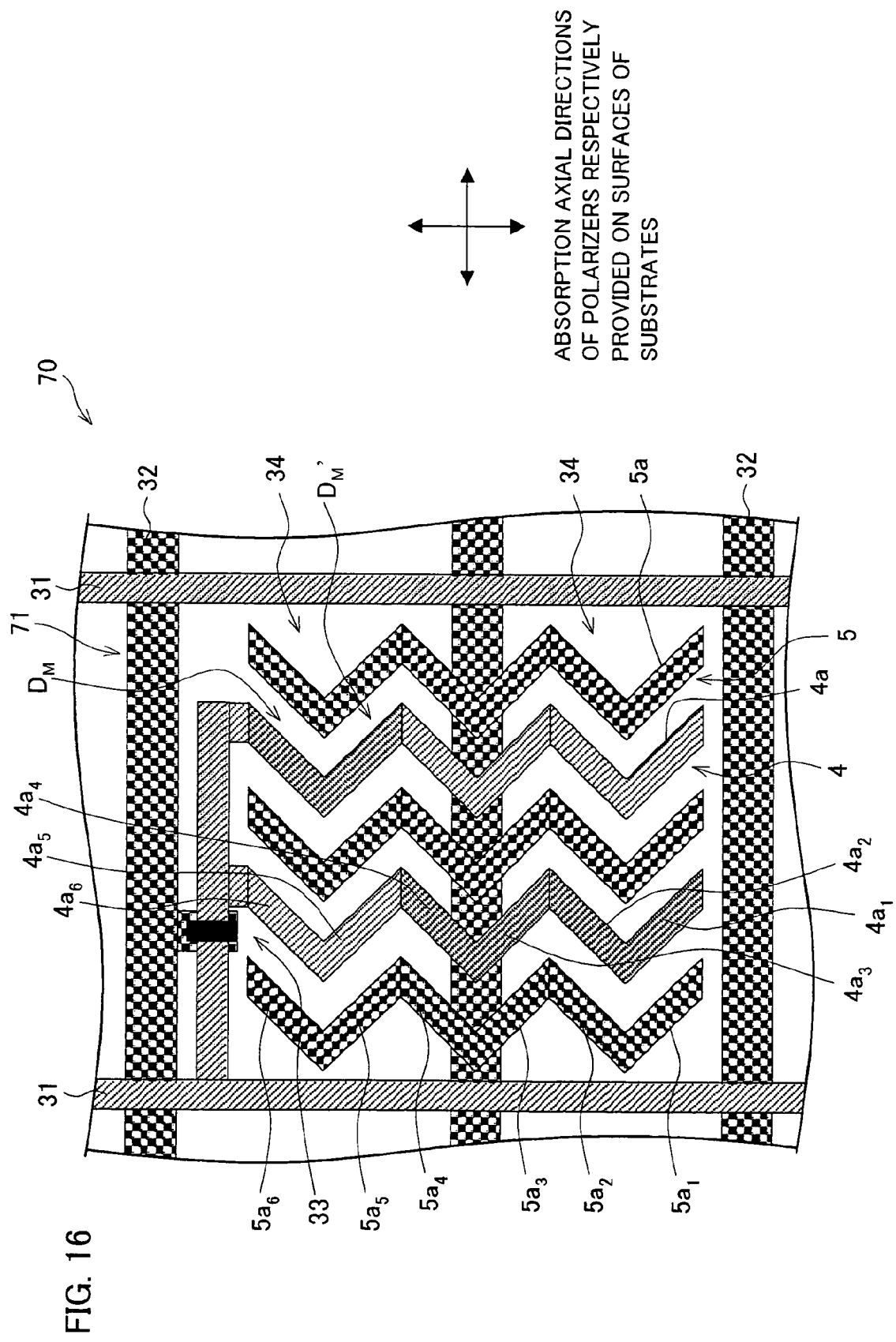
FIG. 16 is a plan view schematically illustrating an example of an electrode configuration of each pixel of a yet another example embodiment.
Figure 17:
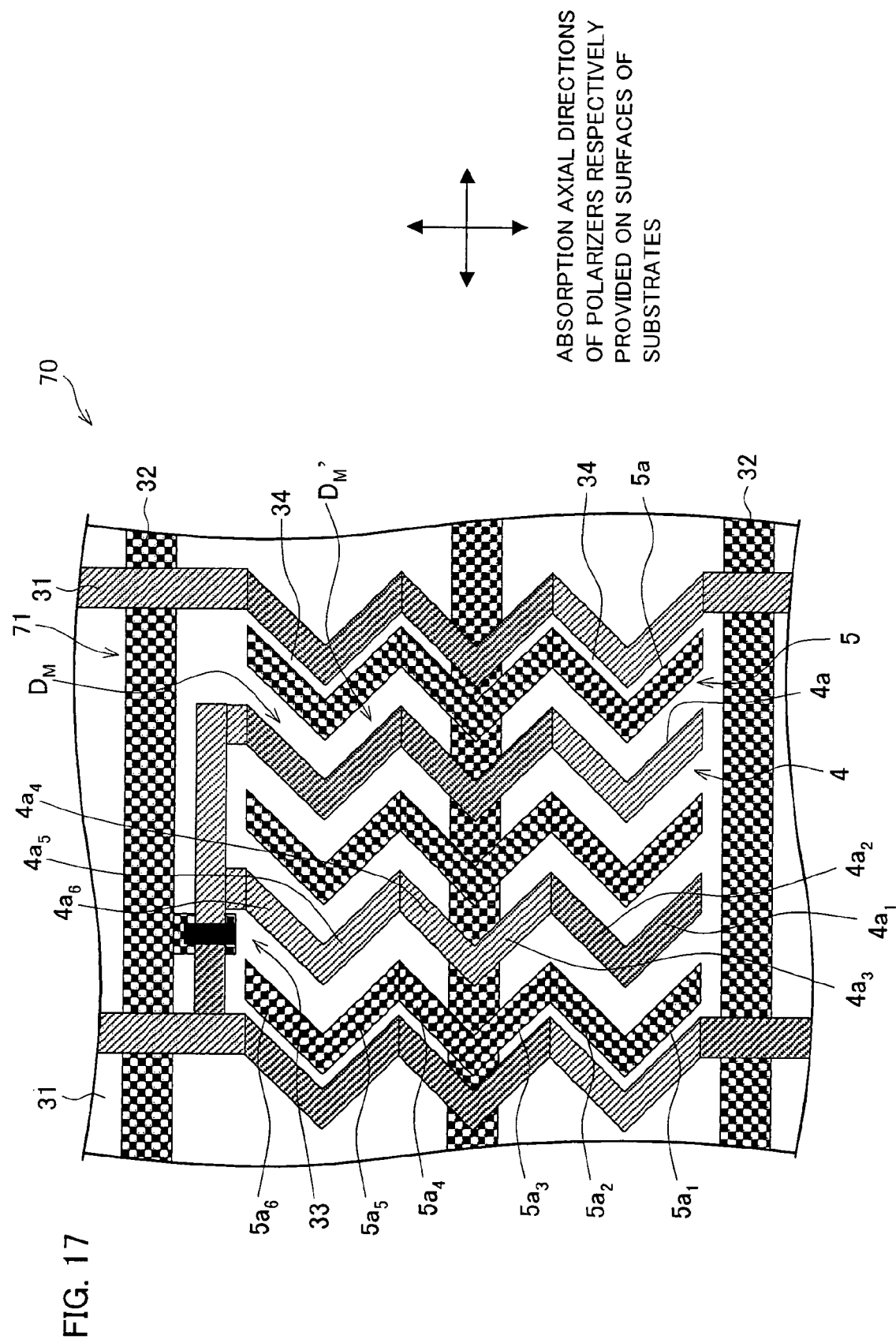
FIG. 17 is another plan view schematically illustrating an electrode configuration of respective pixels in a display element according to a still yet another embodiment.

FIGS. 16 and 17 are plan views schematically illustrating an example of an electrode configuration for each pixel in the display element according to the present embodiment.

In the preset embodiment, the same display element configuration as in the first embodiment is adopted to form the switching element, signal lines, scanning line, and counter electrode lines, thereby forming a pixel array in matrix. More specifically, the present embodiment is arranged as follows: interleave electrodes 4 and 5 made of ITO are used whose line width is 5 μm and electrode-electrode distance is 5 μm; a medium layer 3 has a thickness of 10 μm (that is, a distance between substrates 1 and 2 is 10 μm); a medium A is pentyl-cyanobiphenyl (5CB) represented by Formula (1); 5CB is kept at temperatures near above a nematic-isotropic phase transition point by using a heating device (heating means) provided externally; and display operation is carried out by changing transmissivity of 5CB by and according to electric field application.

The display element 70 according to the present embodiment is so arranged that, as illustrated in FIGS. 16 and 17, data signal lines 31 (SLv) and scanning signal lines 32 (GLw) are provided respectively corresponding to each column and row of a plurality of pixels 71 arranged in matrix, and a pixel electrode (interleave electrode 4) having a comb-like shape and a counter electrode (interleave electrode 5) having a comb-like shape are provided in each pixel 71. More specifically, the display element 70 according to the present embodiment includes: a plurality of data signal lines 31 and a plurality of the scanning signal lines 32, the data signal lines 31 and scanning signal lines 32 arranged in matrix; at least one TFT 33 (switching element) provided corresponding to each intersection between the data signal lines 31 and the scanning signal lines 32; the interleave electrode 4, which is a pixel electrode (i) having a comb-like shape having tooth portions 4a and (ii) connected to the TFT; the interleave electrode 5, which is a counter electrode having a comb-like shape having tooth portions 5a interleaving with the tooth portions 4a, the tooth portions 4a and 5a bent at a curving angle (bending angle) of 90 degrees so as to have a zigzag shape (V-like shape (L-shape, chevron shape)) in planes substantial parallel to the substrates 1 and 2, in order to form, in each pixel 71, at least two domains $D_M$ and $D_M'$ in which electric fields making 90 degrees with each other are respectively applied by the interleave electrodes 4 and 5.

In the first embodiment, each pixel is provided with at least two electrode pairs 10, each of which consists of the interleave electrodes 4 and 5 having the tooth portions 4a or 5a wherein the tooth portions 4a and 5a are so arranged that they make 90 degrees with tooth portions 4a and 5a of adjacent electrode pair 10 in the same pixel. With this arrangement, the electrode pairs 10 apply electric fields on the at least two domains $D_M$ and $D_M'$ the electric fields having directions substantially perpendicular to each other. In the present embodiment, on the other hand, the tooth portions 4a and 5a are respectively bent at 90 degrees and interleave with each other. With this arrangement, each pixel includes at least two domains $D_M$ and $D_M'$ (minute regions) in which the electric fields having directions crossing each other perpendicularly are to be applied between the tooth portions 4a and 5a.

Specifically speaking, the display element 70 according to the present embodiment is so arranged that each tooth portion 4a and 5a has segment portions $4a_1, 4a_2, \ldots 4a_r$ or $5a_1, 5a_2, \ldots 5a_r$ (r is an arbitrary integer for a number of optical anisotropy generated by the application of the electric field). The segment portions $4a_1, 4a_2 \ldots 4a_r$ or $5a_1, 5a_2 \ldots 5a_r$ make 90 degrees with their adjacent segment portions as illustrated in FIGS. 16 and 17. Further, in each pixel, there are at least two domains $D_M$ and $D_M'$ in which segment portions make substantially 90 degrees with adjacent segment portions respectively. For example, in some domains $D_M$ and $D_M'$, there are at least two domains $D_M$ and $D_M'$ in which segment portions $4a_1$ and $5a_1$ make substantially 90 degrees with adjacent segment portions $4a_2$ and $5a_2$ respectively.

Note that the display element 70 according to the present embodiment is also arranged such that polarizers 6 and 7 are so provided respectively on outer sides of the substrates 1 and 2 that their absorption axes of, that is, absorption axial direction cross each other perpendicularly. The absorption axes 6a and 7a of the polarizers 6 and 7 make 45 degrees with directions in which the tooth portions 4a and 5a of the interleave electrodes 4 and 5 are extended, that is, directions in which the segment portions are stretched out. With this arrangement, the polarizers 6 and 7 are so arranged that their absorption axes 6a and 7a respectively make 45 degrees with respect to a direction in which the segment portions apply the electric fields.

The inventors of the present technology found that this arrangement also allows to attain a display element 70 in which a wide view angle is attained and the coloring phenomenon is suppressed in all directions, without deteriorating the transmissivity.

In the electrode configuration illustrated in FIG. 16, there is a large non-display contributing region 34 (which does not contributes to the display) between the data signal line 31 and the counter electrode in the pixel 71, that is, between the data signal line 31 and the interleave electrode 5 adjacent the data signal line 31.

In view of this, in the arrangement illustrated in FIG. 17, the data signal line 31 is not linear, but is bended parallel to the zigzag shape of the interleave electrodes 4 and 5 located in the pixel 71. The non-display contributing region 34 is significantly reduced.

In the configuration of FIG. 16, the display contributing region (which contributes to the display) is about 30%. However, the display contributing region is improved to 40% in the configuration illustrated in FIG. 17.

Note that the present invention is not limited to the configuration in which the tooth portions 4a and 5a of the interleave electrodes 4 and 5 are provided along the data signal lines 31 and the data signal lines 31 have the zigzag shape along the shape of the tooth portions 4a and 5a: the tooth portions 4a and 5a may be extended along the scanning signal lines 32; and it is only required that at least data signal lines 31 or the scanning lines 32 have the zigzag shape.

Moreover, in the present embodiment, as in the first and second embodiments, it is preferable that the directions of the optical anisotropies occurred in the respective domains $D_M$ and $D_M{}'$ when the electric field is applied make about 45 degrees (preferably 45 degrees±10 degrees, more preferably 45 degrees±less than 10 degrees, and further preferably 45 degrees±5 degrees) with the absorption axes of the polarizers 6 and 7. Further, it is preferable that the directions of the optical anisotropies occurred in the respective domains $D_M$ and $D_M{}'$ when the electric field is applied make, therebetween, about 90 degrees (preferably 90 degrees±20 degrees, more preferably 90 degrees±less than 20 degrees, and further preferably 90 degrees±10 degrees).

Further, again in this embodiment, a ratio between the respective domains in the pixel 71 is preferably such that a ratio between two domains in which the optical anisotropies of different directions occurs (that is, a ratio between sums of areas of the domains) is 1:9 to 1:1 (preferably 1:1).

Moreover, it should be noted that the present invention is not limited to the arrangement which is mainly discussed above as an example and in which the optical anisotropy occurred in the respective domains DM and DM' when the electric field is applied. As described above, as long as the magnitude of the optical anisotropy is changeable by and according to the applied electric field, the present embodiment may be arranged such that the optical anisotropy occurs when the electric field is applied, or that the optical anisotropy occurs when no electric field is applied. The present embodiment should be arranged such that, when the optical anisotropies occur, the medium A shows the optical anisotropies in different directions respectively in at least two domains of at least some of pixels 71.

Moreover, the present invention is not limited to the arrangement which is mainly discussed above as an example and in which each pixel 71 has two types of domains, and optical anisotropy of the same direction occur respective in each type of domains. The present technology may be arranged such that more than two types of domains are provided and optical anisotropy of the same direction occur respective in each type of domains. More specifically, as described above, it is preferable that the directions of the optical anisotropies occurred in the respective domains when the electric field is applied or when no electric field is applied make about 45 degrees (45 degrees±10 degrees) with respect to the absorption axes 6a and 7a of the polarizers 6 and 7, and that the directions of the optical anisotropies occurred in the respective domains when the electric field is applied or when no electric field is applied make, between themselves, about 90 degrees (90 degrees±20 degrees). However, as described in FIG. 1 for example in FIGS. 20 to 22, the angle may be independently shifted from 45 degrees or 90 degrees. That is, as understood from the above description, the directions of the optical anisotropies of the medium A in the pixels 71 is not limited to two directions. As described above, the present technology should be arranged such that at least small population of the pixels has at least two domains $D_M$ and $D_M{}'$ in which the medium shows the optical anisotropies of different directions when the electric field is applied or when no electric field is applied.

As described above, the present technology is arranged such that: in each pixel 71, there are at least two domains $D_M$ and $D_M{}'$ in which, when the electric field is applied or when no electric field is applied, the medium A shows optical anisotropies having different directions respectively; respective angles between (a) the directions of the optical anisotropies generated in the respective domains $D_M$ and $D_M{}'$ when the electric field is applied thereon or when no electric field is applied thereon and (b) the absorption axes 6a and 7a of the polarizers 6 and 7 are, as described above, 45 degrees±10 degrees, and preferably 45 degrees±less than 10 degrees; and the directions of the optical anisotropies generated in the respective domains $D_M$ and $D_M{}'$ when the electric field is applied thereon or when no electric field is applied thereon make 90 degrees±20 degrees, preferably 90 degrees±less than 20 degrees. With this arrangement, the coloring phenomenon occurred in the respective domains when viewed from an oblique direction cancel out (compensate for) each other. Therefore, it is possible to largely improve the viewing angle property without deteriorating the transmissivity.

The display element according to the present technology is, as described above, a display element in which display operation is carried out by using a medium, a magnitude of whose optical anisotropy is changeable by and according to an electric field applied thereon, and in which each pixel has at least two domains in which, when the electric field is applied or when no electric field is applied, the medium shows optical anisotropies of different directions respectively. With this arrangement, the display element according to the present technology attains wide driving temperature range (operable temperature range), wide viewing angle property and high-speed responding property. Further, in the display element according to the present technology, the coloring phenomenon problem is solved by arranging such that the coloring phenomenon occurred in one domain in one pixel is cancelled out with the coloring phenomenon occurred in the other domain in the same pixel. Because of this, the display element according to the present technology is better in the viewing angle property than the conventional display element.

Moreover, the display element is preferably provided with a polarizer on that surface of at least one of the substrates which is opposite side with respect to that surface (facing surface) of the substrate which faces the medium. It is preferable that respective angles between (a) the directions of optical anisotropies generated in the respective domains when the electric field is applied or when no electric field is applied and (b) the absorption axis of the polarizer be 45 degrees±10 degrees. It is more preferable that respective angles between (a) the directions of optical anisotropies generated in the respective domains when the electric field is applied or when no electric field is applied and (b) the absorption axis of the polarizer be less than 45 degrees±10 degrees.

Specifically, the maximum transmissivity is attained when the angle s of 45 degrees are made between (a) the directions of optical anisotropies generated in the respective domains when the electric field is applied or when no electric field is applied and (b) the absorption axes of the polarizers. Therefore, it is most preferable that the angle s of 45 degrees are made between (a) the directions of optical anisotropies generated in the respective domains when the electric field is applied or when no electric field is applied and (b) the absorption axes of the polarizers. However, supposing that the transmissivity attained when the angles are 45 degrees is 100%, the human eyes sense that the maximum brightness is attained when transmissivity is 90% or more. Therefore, the human eyes sense that substantially maximum brightness or brightness near the maximum brightness is attained, if the angle is 35 degrees≦θ≦55 degrees. In this case, the human eyes sense that maximum brightness is attained, especially if the angle is 35 degrees<θ<55 degrees.

Therefore, this arrangement improves the viewing angle property without deterioration the transmissivity.

Moreover, it is preferable that 90 degrees±20 degrees be made between the directions of optical anisotropies (domain directions) generated in the respective domains in each pixel when the electric field is applied or when no electric field is applied, it is more preferable that 90 degrees±less than 20 degrees be made between the directions of optical anisotropies (domain directions) generated in the respective domains in each pixel when the electric field is applied or when no electric field is applied.

With this arrangement, it is possible to suppress the reduction in the transmissivity. Further, this arrangement improves the viewing angle without deteriorating, for example, the display quality attained where polar angle is ±60 degrees.

The display element according to the present technology is especially preferably arranged such that the respective angles between (a) the directions of the optical anisotropies generated in the respective domains when the electric field is applied or when no electric field is applied and (b) the absorption axes of the polarizers are 45 degrees±10 degrees, preferably 45 degrees±less than 10 degrees; and that the angle between the directions of the optical anisotropies generated in the respective domains is 90 degrees±20 degrees, and preferably 90 degrees±less than 20 degrees. With this arrangement, for example, it is possible (a) to sufficiently suppress the color change in the display within the polar angle of ±60 degrees, (b) to surely perform compensation of the coloring phenomenon for the diagonal viewing direction, and to perform bright display in which the substantially maximum brightness is sustained. Therefore, it is possible to provide a display element in which no reduction in the transmissivity is sensed and the viewing angle property is further improved dramatically.

Moreover, in the present technology, an electric field is one of means for forming at least two domains in which the medium shows the optical anisotropies of different directions respectively (that is means for the domain segmentation).

Therefore, the display element may be so arranged as to include electric field applying means for applying an electric field, in each pixel, onto the medium, the electric field being substantially parallel to the substrate. The electric field application means may be arranged such that it applies electric fields of different directions respectively in different portions of each pixel.

Moreover, the display element is preferably arranged such that the display element includes an electric pair group in each pixel, the electric pair group having at least two electrode pairs for applying, onto the medium, electric fields substantially parallel to the substrates in such a manner that the electrode pairs wherein the electric field generated by the electrode pair make 90 degrees±20 degrees and 90 degrees±20 degrees with the electric field generated in the adjacent electrode pairs in the same pixel.

Further, the electrode pairs compose of a pair of electrodes respectively having a comb-like shape having tooth portions interleaving with each other, each electrode pair arranged such that the tooth portions of the electrode pairs thereof make 90 degrees±20 degrees and preferably of 90 degrees±less than 20 degrees with the tooth portions of the adjacent electrode pairs.

Moreover, the display element preferably includes: a plurality of data signal lines and a plurality of the scanning signal lines, the data signal lines and scanning signal lines arranged in matrix; in each pixel, a pixel electrode and a counter electrode which apply, onto the medium, electric fields substantially parallel to the substrates, the pixel electrode and counter electrode having a comb-like shape having tooth portions having a zigzag shape in a plane substantially parallel to the substrate, the zigzag shape bent at 90 degrees±20 degrees, preferably of 90 degrees±less than 20 degrees.

With the respective arrangements, it is possible to easily generate, in the respective domains, optical anisotropies of different directions when the electric field is applied or when no electric field is applied, the directions making, therebetween, 90 degrees±20 degrees, and preferably of 90 degrees±less than 20 degrees. Thus, the coloring phenomenon occurring at diagonal viewing angles in each domain can be cancelled out (compensated for) between each other. As a result, it is possible to improve the viewing angle property dramatically without deteriorating the transmissivity.

Further, the display element is preferably arranged such that the data signal lines and/or the scanning signal lines have a zigzag shape being bended at 90 degrees±20 degrees, preferably of 90 degrees±less than 20 degrees, and being substantially parallel to a plane of the substrates and extended along the shape of the pixel electrode and the counter electrode.

With the arrangement in which the data signal lines and/or the scanning signal lines have a zigzag shape being bended at 90 degrees±20 degrees, preferably of 90 degrees±less than 20 degrees, and being substantially parallel to a plane of the substrates and extended along the shape of the pixel electrode and the counter electrode, it is possible to dramatically reduce the non-display contributing region, which is caused between (a) the tooth portions of the pixel electrode and the counter electrode and (b) the data signal lines and/or the scanning signal lines, thereby attaining a larger display region.

Moreover, one of means for forming at least two domains in which the medium shows the optical anisotropies of different directions respectively is alignment treatment to give the substrates an aligned surface.

Therefore, the display element may be arranged such that each pixel has at least two regions which respectively have different alignment directions.

In this case, the display element is preferably arranged such that each pixel has regions which respectively have different alignment directions making 90 degrees±less than 20 degrees therebetween.

It is preferable that the different alignment directions make 90 degrees±20 degrees therebetween, whereas it is more preferable that the different alignment directions make 90 degrees±less than 20 degrees therebetween.

Moreover, the display element preferably has such a feature that the polarizer has an absorption axis that makes 45 degrees±10 degrees, preferably, of less than 45 degrees±10 degrees, with the directions of the optical anisotropies generated in the respective domains by the electric field application, and such a feature that each pixel has at least two regions (domains) which respectively have different alignment directions making 90 degrees±20 degrees, preferably of 90 degrees±less than 20 degrees therebetween, and that directions of optical anisotropies generated in the respective regions (domains) make 90 degrees±20 degrees, preferably of 90 degrees±less than 20 degrees therebetween.

Further, it is preferable that an alignment film be provided on at least one of the substrates, the alignment film containing a photosensitive functional group and being processed to form the above regions (domains) in each pixel.

With any of these arrangements, it is possible to easily attain the angle of 90 degrees±20 degrees, preferably of ±less than 20 degrees between the directions of the optical anisotropies generated in the respective regions (domains) when the electric field is applied or when no electric field is applied. Thus, the coloring phenomenon for the diagonal viewing angle in the respective domains can be compensated for each other. As a result, it is possible to give the display element a much better viewing angle property without deteriorating the transmissivity.

Moreover, the medium maybe such a medium that is optically isotropic when no electric field is applied, and becomes optically anisotropic when the electric field is applied. In this case, the shape of the refractive index ellipsoid is spherical when no electric field is applied, and becomes ellipsoidal when the electric field is applied. Moreover, the medium maybe such a medium that is optically anisotropic when no electric field is applied, and becomes optically isotropic when the electric field is applied. In this case, the shape of the refractive index ellipsoid is ellipsoidal when no electric field is applied, and becomes spherical when the electric field is applied. Furthermore, the medium may be such a medium that is optical anisotropic when no electric field is applied thereon, and that the magnitude of its optical anisotropy, which has been already existed, is changed by and according to the electric field applied thereon. In this case the ratio of the major axial length over the minor axial length of the refractive index ellipsoid is changed between before and after the electric field application (the shape of the refractive index ellipsoid may be substantially spherical).

With any of these arrangements, it is possible to change the shape of the refractive index ellipsoid depending on whether or not the electric field is applied. Thus, it is possible to perform the display operation by changing the magnitude of the optical anisotropy (orientational order parameter, refractive index, and/or the like), even though the direction of the optical anisotropy is constant. Therefore, with any of these arrangements, it is possible to realize a display element whose display state is changeable between when the electric field is applied and when no electric field is applied, and which has a wide driving (operable) temperature range, a wide viewing angle, and high-responding capability.

Moreover, it is preferable that the medium be such a medium that have an orientational order when the electric field is applied or when no electric field is applied, the orientational order being smaller than the wavelength of the visible light. That is, it is preferable that, when the electric field is applied or when no electric field is applied, the medium is not in isotropic liquid phase, but in a phase which has an order (orderly structure, orientational order) in a scale smaller than the wavelength of the visible light. When the orderly structure is smaller than the wavelength of the visible light, the medium is optically isotropic. Therefore, by using the medium in which the orientational order becomes smaller than the wavelength of the visible light when the electric field is applied or when no electric field is applied, it is possible to surely change the display state between when the electric field is applied and when no electric field is applied.

The medium may have an orderly structure having a cubic symmetry.

the medium may be a material that shows cubic phase or smectic D phase.

The medium may be a liquid crystal micro emulsion.

The medium may be a lyotropic liquid crystal that shows a micelle phase, a reverse micelle phase, a sponge phase or a cubic phase.

The medium may be a liquid-crystal-particulate-dispersed system that shows a micelle phase, a reverse micelle phase, a sponge phase or a cubic phase.

The medium may be a dendrimer.

The medium may be a material that shows a cholesteric blue phase.

The medium may be a material that shows a smectic blue phase.

In any one of the materials listed above, optical anisotropy whose magnitude is changeable by and according to an electric field applied thereon. Thus, any one of the materials can be used as the medium.

Moreover, the display device according to the present technology is provided with the display element according to the present technology, as described above. Therefore, the display device of the present technology has a wide driving (operable) temperature range, a wide viewing angle, and high-speed responding capability. Further, in the display device, it is possible to compensate the color phenomenon for the diagonal viewing angle occurred in the respective domains in the pixel can be compensated for each other. Thus, it is possible to improve the viewing angle property than in the conventional display devices.

As described above, the display element according to the present technology is such an excellent display element in which the wide viewing angle property and fast responding property are attained (the viewing angle is wide and the responding speed is fast), and the coloring phenomenon is suppressed in any directions without deteriorating the transmissivity. The display element is applicable, for example, in image display apparatus (display device) such as televisions, monitors and the like; OA apparatus such as word processors, personal computers, and the like; and image display apparatus (display device) for use in video cameras, digital cameras, information terminals such as portable phones. Moreover, the display element according to the present invention is applicable in display devices having a large screen or displaying moving pictures, because the display element according to the present technology, as described above, has the wide viewing angle property and the fast responding property. Moreover, the fast responding property of the display element allows the use of display element, for example, in a display device of field sequential color mode.

Note that the present technology is not limited to the present embodiments which mainly discuss the arrangements in which the electric field application is the means for changing the magnitude of the optical anisotropy of the medium A. In lieu of the electric field application, a magnetic field application may be used in order to change the magnitude of the optical anisotropy depending on whether or the magnetic field is applied.

That is, the magnetic field as well as the electric field is also applicable as the force to apply. In order to change the magnitude of the optical anisotropy of the medium A by the magnetic field application, magnetic anisotropy of the medium A is utilized. Therefore, in this case, a material having a larger anisotropy in terms of the magnetic susceptibility is preferable as the medium A. In the case of organic molecules, the magnetic susceptibility is mainly due to diamagnetism. Thus, in case where the π electrons can be moved along a ring in a molecules according to the change in the magnetic field, an absolute value of the magnetic susceptibility becomes largest. Therefore, for example, in case where the molecule has an aromatic ring, the absolute value of the magnetic susceptibility becomes largest when the aromatic ring (a sequence of aromatic ring, a chain containing aromatic rings) is directed perpendicular to a direction along which the magnetic field is applied. In this case, the magnetic susceptibility observed along a direction to which the aromatic ring is parallel, is relatively smaller in absolute value than along a direction to which the aromatic ring is perpendicular. Thus, the anisotropy of the magnetic susceptibility is larger along the direction to which the aromatic ring is parallel. Therefore, a material having a ring structure such as a six-membered ring (for example, a benzene ring) is preferable as the medium A. Moreover, in order to increase the anisotropy of the magnetic susceptibility, it is also preferable to orientate electron spin in the medium A. By introducing an electron spin in a free radical (radical) of N, O, NO, or the like, it is possible to give the molecules a stable spin. In this case, for example, it is possible to orientate the spin parallel by piling conjugate molecules on the plane. In this case, for example, a discotic liquid crystal is preferable as the medium A. In the discotic liquid crystal, core portions located at a center of the molecules are piled into columns.

In this case where the magnetic field is used as the force to apply, the display element may have such an arrangement, for example, that a magnetic field generating member (such as an electromagnet or the like) or the like is provided outside of the cell, for example, on an outer side of the display element 70, in lieu of the electric field applying members such as the electrodes 4 and 5, or the like. By applying the magnetic field, in lieu of the electric field, on the medium, it is possible to perform the same driving (addressing) as above.

Moreover, the force to apply may be light. There is no particular limit in terms of the wavelength of the light. For example, the magnitude of the optical anisotropy can be changed by and according to radiating, on the medium A, light of 532 nm generated by an Nd (Neodymium): YAG (Yttrium Aluminum Garnet) laser.

The medium A to be used in this arrangement is not particularly limited. In this arrangement, a medium in which the magnitude of the optical anisotropy is changeable by and according to the light radiation, because the Kerr effect due to light is utilized in this arrangement. Note that the medium A in this arrangement may be media similar to the media used in the arrangement in which the electric field is used, more specifically, the media mentioned in the first embodiment.

Note that it is preferable that the medium A contain a little amount of dye in the case where the light is used as the force to apply. By this arrangement in which the medium A contains a little amount of dye, the magnitude of the optical anisotropy becomes more changeable than without the dye. Dye content in the medium A is preferably 0.01 wt % or more, and less than 5 wt %. If the dye content was less than 0.01 wt %, the amount of the dye is too little to attain sufficient effect. On the other hand, if the dye content was 5 wt % or more, the dye absorbs exitation light.

In this arrangement, the medium A may be, for example, the compound (liquid crystalline material) represented by Formula (1). The liquid crystalline material itself may be used as the medium A, or a mixture of the liquid crystalline material and a dye may be used as the medium A.

There is no particular limit in the dye, but dye having absorption band within the wavelength of the exitation light. For example, the dye may be a compound (1-amino-anthraquinone (hereinafter, referred to as "1AAQ"; made by Aldrich) represented by the following formula (8):

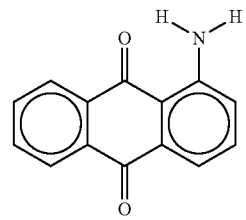

(8)

By adding "1AAQ" in a compound ("5CB" (pentylcyanobiphenyl)) represented by Formula (1) so that the content of "1AAQ" in the medium A consisted of 5CB and 1AAQ is 0.03 wt %, the medium A becomes about 10 times more changeable in the magnitude of the optical anisotropy compared with the medium containing no "1AAQ".

That is, the display element according to the present technology may be so arranged as to include a pair of substrates, at least one of which is transparent, and a medium, between the substrates, the medium being changeable in an optical anisotropy magnitude by and according to a force applied thereon, pixels having at least two domains in which the medium shows optical anisotropies of different directions when the force is applied or when no force is applied.

In order to generate the optical anisotropies in the respective domains in the display element, use of electric field, magnetic field, light or the like, or the like may be adopted, for example. Among them, the use of the electric field is preferable for the sake of easy designing and driving control of the display element.

Therefore, the display element may be provided with, for example, electric field applying means (such as an electrode or the like), magnetic field applying means (such as an electromagnet or the like), or the like as means for applying a force. For the sake of easy designing and driving control of the display element, the electric field applying means is preferable.

Note that the present invention is not particularly limited in terms of the means for applying the force, provided that the means for applying the force is capable of changing the magnitude of the optical anisotropy of the medium depending on whether or not the force is applied (and by and according to the force applied thereby). Besides the electric field applying means (such as an electrode or the like) and magnetic field applying means (such as an electromagnet or the like), a laser device, light radiating means (excitation light generating means) such as the above-mentioned Nd: YAG laser and the like are applicable as the means for applying the force.

That is, the present technology requires the display element to have an arrangement that allows the pixel to have at least two domains in which the medium shows optical anisotropies of different directions when the force is applied or when no force is applied. On example of such arrangement is alignment treatment for domain segmentation. The present technology is not limited to the arrangement in which the display element comprises the means for applying the force.

Therefore, the present invention may be arranged such that the present element comprises the means for applying the force, or such that the means for applying the force is provided in addition to the display element. That is, a display device according to the present technology may be so arranged as to comprise the display element including the means for applying the force, or to comprise the display element and the means for applying the force. In other words, the display device may have such an arrangement that it comprises (a) the display element has the arrangement that allows the pixel to have at least two domains in which the medium shows optical anisotropies of different directions when the force is applied or when no force is applied, and (b) means for applying a force on medium in the display element.

The present invention is not limited to the embodiments discussed above and may be modified in various ways within the scope of the claims. Modifications attained by appropriate combination of technical means disclosed respectively in the different embodiments also fall into the scope of the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A display element comprising:
   a pair of substrates, at least one of which is transparent;
   a medium, between the substrates, the medium being optically isotropic when no electric field is applied thereon but becomes optically anisotropic when an electric field is applied thereon; and
   pixels having at least two domains in which the medium shows optical anisotropies of different directions when an electric field is applied,
   at least one of the substrates having an electrode pair group provided thereon is such a way as to be in each pixel, the electrode pair group including at least two electrode pairs for applying electric fields onto the medium, the electric fields being parallel to the substrates,
   the at least two electrode pairs are parallel to each other and bent in a zigzag shape.

2. A display element as set forth in claim 1, comprising:
   a pair of polarizers on a surface of at least one of the substrates, the surface being opposite the medium,
   the at least two electrode pairs being neither parallel nor perpendicular to an absorption axis of the pair of polarizers.

3. A display element as set forth in claim 1, comprising:
   data signal lines respectively along columns of the pixels; and
   scanning signal lines respectively along rows of the pixels,
   the data signal lines are bent in such a way as to be parallel to the at least two electrode pairs.

4. A display element as set forth in claim 1, comprising:
   the pair of polarizers making 45 degrees±10 degrees with the directs of the optical anisotropies of the medium when an electric field is applied.

* * * * *